(12) United States Patent
Cheong et al.

(10) Patent No.: US 10,534,534 B2
(45) Date of Patent: Jan. 14, 2020

(54) METHOD FOR CONTROLLING DISPLAY, STORAGE MEDIUM, AND ELECTRONIC DEVICE

(71) Applicant: Samsung Electronics Co., Ltd., Suwon-si, Gyeonggi-do (KR)

(72) Inventors: Yu-Sun Cheong, Seongnam-si (KR); Byung Jin Kang, Seoul (KR); Yong-Jin Kwon, Suwon-si (KR); Gae-Youn Kim, Seongnam-si (KR); Dae-Myung Kim, Hwaseong-si (KR); Kwon-Ho Song, Seongnam-si (KR); Dong-Oh Lee, Seongnam-si (KR); Suk-Jae Lee, Seoul (KR); Kwang-Hyun Cho, Suwon-si (KR); Byeng-Seok Choi, Yongin-si (KR); Ju-Yeong Lee, Seoul (KR); Hyun-Ju Hong, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 15/667,081

(22) Filed: Aug. 2, 2017

(65) Prior Publication Data
US 2018/0039408 A1 Feb. 8, 2018

(30) Foreign Application Priority Data
Aug. 3, 2016 (KR) .......................... 10-2016-0099178

(51) Int. Cl.
*G06F 3/0488* (2013.01)
*G06F 3/0485* (2013.01)
(Continued)

(52) U.S. Cl.
CPC ........ *G06F 3/04886* (2013.01); *G06F 1/1616* (2013.01); *G06F 1/1652* (2013.01);
(Continued)

(58) Field of Classification Search
CPC .......... G06F 1/16; G06F 3/044; G06F 1/1616; G06F 3/0488; G06F 3/0482;
(Continued)

(56) References Cited

U.S. PATENT DOCUMENTS 8,855,727 B2 10/2014 Vartanian
9,412,341 B2 * 8/2016 Lin .......................... G09G 5/14
(Continued)

FOREIGN PATENT DOCUMENTS

| KR | 10-2013-0080536 A | 7/2013 |
|---|---|---|
| KR | 10-2014-0016082 A | 2/2014 |

(Continued)

*Primary Examiner* — Toan H Vu
(74) *Attorney, Agent, or Firm* — Jefferson IP Law, LLP

(57) ABSTRACT

An electronic device is provided. The electronic device includes a display and a processor operatively connected to the display and configured to control the display to display a window related to context recognition on the display according to a predefined first layout corresponding to a first event related to screen splitting and control the display to display at least two windows split with respect to a folded portion of the display according to a predefined second layout corresponding to a second event related to the screen splitting.

19 Claims, 57 Drawing Sheets

(51) Int. Cl.
*G06F 1/16* (2006.01)
*G06F 3/0481* (2013.01)
*G06F 3/0484* (2013.01)

(52) U.S. Cl.
CPC .......... *G06F 1/1677* (2013.01); *G06F 3/0481* (2013.01); *G06F 3/0484* (2013.01); *G06F 3/0485* (2013.01); *G06F 3/0488* (2013.01); *G06F 2203/04102* (2013.01); *G06F 2203/04803* (2013.01)

(58) Field of Classification Search
CPC .... G06F 3/0487; G06F 1/1652; H04M 15/00; H04N 7/15; G09G 5/14
See application file for complete search history.

(56) References Cited

U.S. PATENT DOCUMENTS

| | | | | |
|---|---|---|---|---|
| 9,661,271 | B1* | 5/2017 | Rakshit | H04N 7/15 |
| 10,180,704 | B1* | 1/2019 | Stewart | G06F 1/1652 |
| 2009/0030940 | A1* | 1/2009 | Brezina | H04M 15/00 |
| 2014/0028596 | A1* | 1/2014 | Seo | G06F 3/0487 |
| | | | | 345/173 |
| 2014/0049464 | A1 | 2/2014 | Kwak et al. | |
| 2014/0101576 | A1* | 4/2014 | Kwak | G06F 3/0482 |
| | | | | 715/761 |
| 2014/0328041 | A1 | 11/2014 | Rothkopf et al. | |
| 2015/0015511 | A1 | 1/2015 | Kwak et al. | |
| 2015/0116920 | A1 | 4/2015 | Franklin et al. | |
| 2015/0325216 | A1* | 11/2015 | Park | G06F 1/16 |
| | | | | 345/634 |
| 2016/0179236 | A1* | 6/2016 | Shin | G06F 1/1616 |
| | | | | 345/173 |
| 2016/0349851 | A1* | 12/2016 | Eskolin | G06F 3/044 |
| 2017/0017313 | A1* | 1/2017 | Rakshit | G06F 3/0488 |

FOREIGN PATENT DOCUMENTS

| | | |
|---|---|---|
| KR | 10-2014-0024145 A | 2/2014 |
| KR | 10-2015-0007925 A | 1/2015 |
| KR | 10-2015-0064621 A | 6/2015 |
| KR | 10-2015-0094492 A | 8/2015 |
| KR | 10-2016-0088764 A | 7/2016 |

* cited by examiner

METHOD FOR CONTROLLING DISPLAY, STORAGE MEDIUM, AND ELECTRONIC DEVICE

CROSS-REFERENCE TO RELATED APPLICATION(S)

This application claims the benefit under 35 U.S.C. § 119(a) of a Korean patent application filed on Aug. 3, 2016 in the Korean Intellectual Property Office and assigned Serial number 10-2016-0099178, the entire disclosure of which is hereby incorporated by reference.

TECHNICAL FIELD

The present disclosure relates to flexible electronic devices and methods for controlling the display of the electronic devices.

BACKGROUND

The growth of electronic technology led to the development of various types of flexible electronic devices. In particular, electronic devices, such as televisions (TVs), personal computers (PCs), laptop computers, tablet PCs, mobile phones, or Moving Picture Experts Group phase 1 or phase 2 (MPEG-1 or MPEG-2) audio layer 3 (MP3) players, are so commonplace as to be used in most households.

Recently, an ongoing effort is made to develop newer types of electronic devices so as to meet needs of users who desire newer various functions.

Flexible electronic devices mean a type of electronic device that is transformable as if paper does. Users may transform their flexible electronic devices by applying a force thereto. Flexible electronic devices may be provided in a foldable type.

The above information is presented as background information only to assist with an understanding of the present disclosure. No determination has been made, and no assertion is made, as to whether any of the above might be applicable as prior art with regard to the present disclosure.

SUMMARY

Foldable flexible electronic devices are longer than ones and may thus provide a roomy screen in their lengthwise direction according to the related art.

This leads to the need for a method for efficiently using one screen in various ratios and sizes in a foldable flexible electronic device.

Also required is a method for intuitively dividing the screen to be suitable for each operational property in the foldable flexible electronic device.

One more thing required is a method for allowing the user to intuitively divide and use one screen in a foldable flexible electronic device.

A need also exists for a method for providing various user interfaces by reflecting the user's intention about the act of bending a flexible electronic device.

Aspects of the present disclosure are to address at least the above-mentioned problems and/or disadvantages and to provide at least the advantages described below. In accordance with an aspect of the present disclosure, an electronic device is provided. The electronic device includes a display and a processor operatively connected to the display and configured to control the display to display a window related to context recognition on the display according to a predefined first layout corresponding to a first event related to screen splitting, and control the display to display at least two windows split with respect to a folded portion of the display according to a predefined second layout corresponding to a second event related to the screen splitting.

In accordance with an aspect of the present disclosure, a method for controlling a display by an electronic device is provided. The method includes displaying a first window occupying a whole area of the display, detecting a folding event of the display, and displaying a second window related to context recognition on the first window according to a predefined first layout if a folded angle does not reach a first threshold angle, corresponding to the folding event.

In accordance with another aspect of the present disclosure, a non-transitory computer-readable storage medium having instructions thereon, when executed, cause a processor to display a first window occupying a whole area of the display, detect an event related to splitting a screen of the display, display a window related to context recognition on the display according to a predefined first layout corresponding to a first event related to the screen splitting, and display at least two windows split with respect to a folded portion of the display according to a predefined second layout corresponding to a second event related to the screen splitting.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
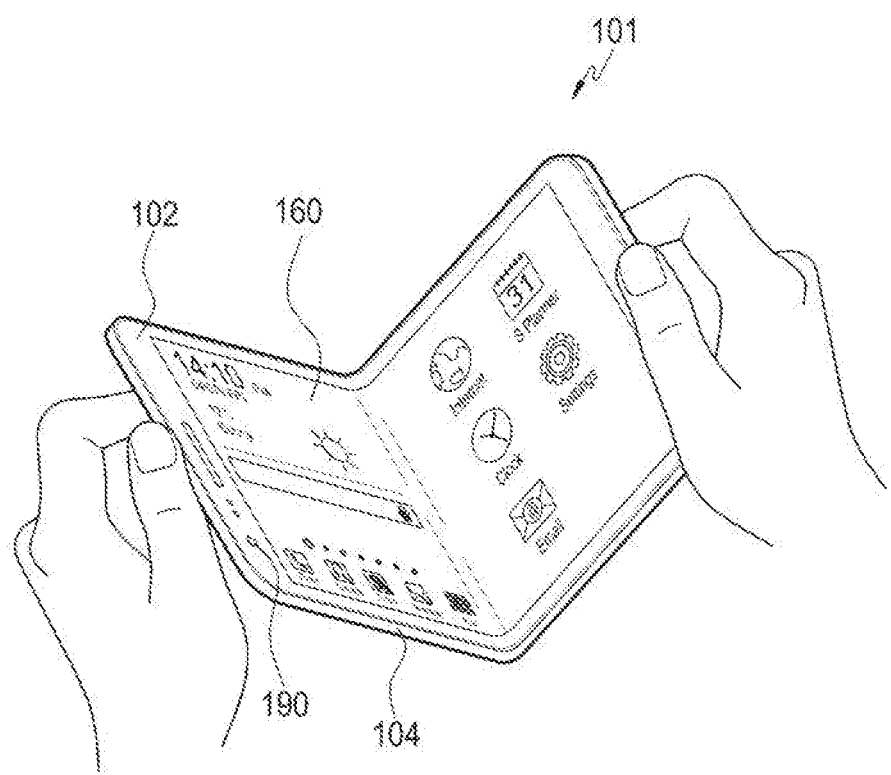
FIGS. 1A, 1B, and 1C are views illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. As used herein, the terms "A or B," "A/B," or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital versatile disc (DVD) player, an audio player, a refrigerator, an air conditioner, a cleaner, an oven, a microwave oven, a washer, a dryer, an air cleaner, a set-top box, a home automation control panel, a security control panel, a television (TV) box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present disclosure, the electronic device may be flexible or may be a combination of the above-enumerated electronic devices. According to an embodiment of the present disclosure, the electronic device is not limited to the above-listed embodiments. As used herein, the term "user" may denote a human or another device (e.g., an artificial intelligent electronic device) using the electronic device.

In various embodiments described below, the term "folding interaction" means a folding operation or unfolding operation that reflects a user's intention when the user grabs a flexible electronic device. For example, the folding interaction may include the user's operation to forcibly bend either or both of his hands or an operation to unfold the flexible electronic device, but embodiments of the present disclosure are not limited thereto.

Figure 1B:
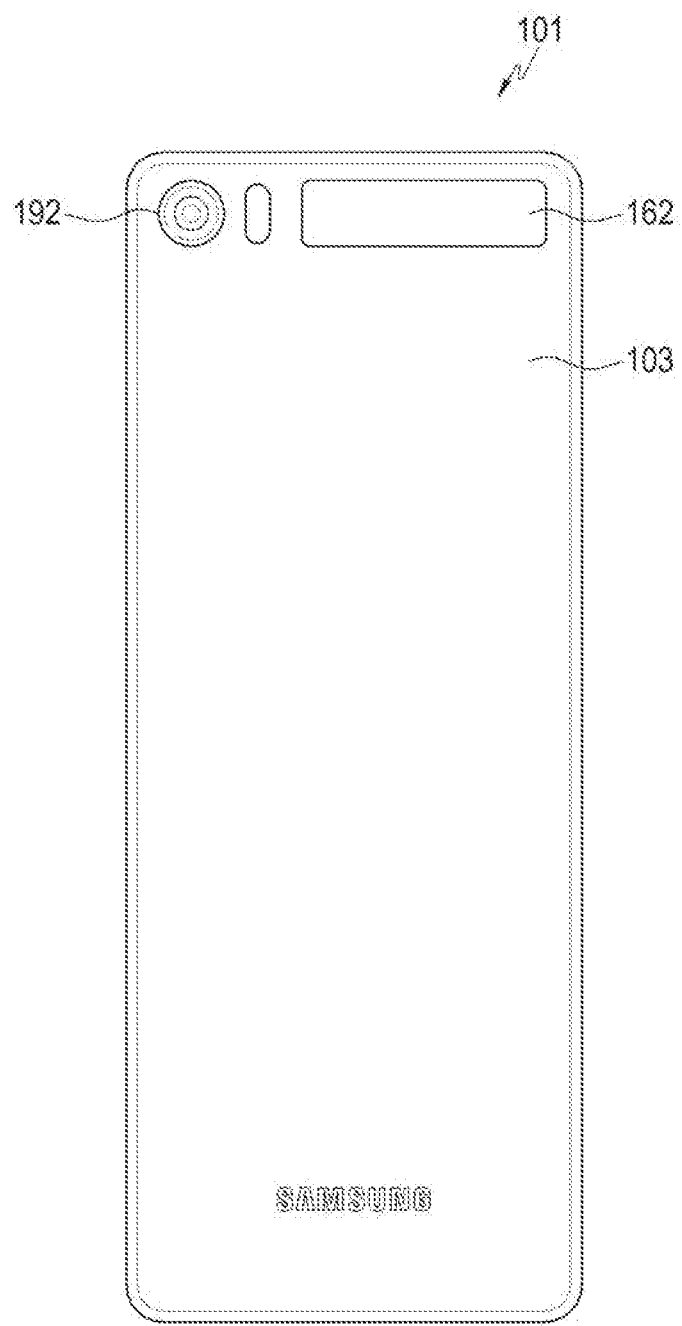
Figure 1C:
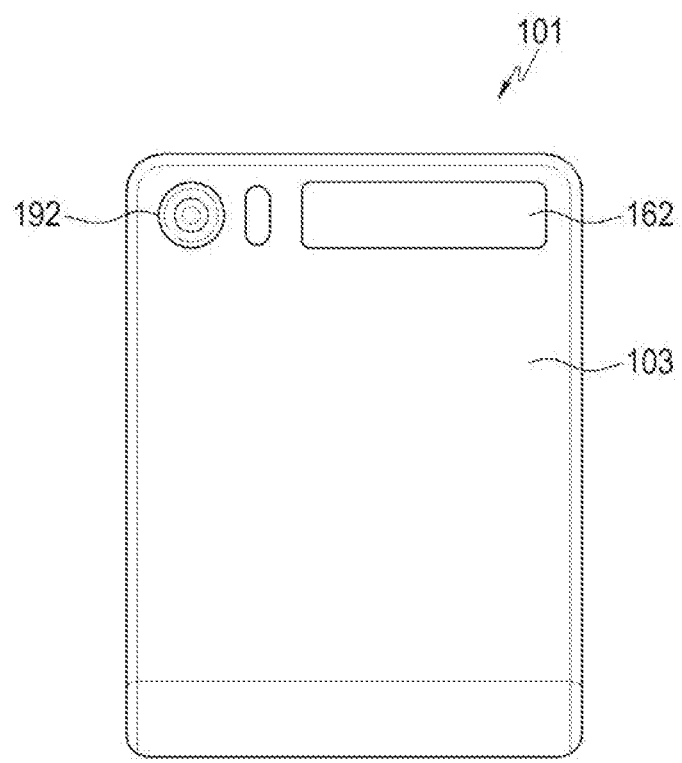

FIGS. 1A to 1C are views illustrating an electronic device according to an embodiment of the present disclosure.

FIG. 1A is a view illustrating a front surface of an unfolded electronic device.

FIG. 1B is a view illustrating a rear surface of an unfolded electronic device.

FIG. 1C is a view illustrating a rear surface of a folded electronic device.

A display 160 may be positioned on the front surface 102 of the electronic device 101. The display 160 may be formed in a large size to occupy a majority of the front surface 102 of the electronic device 101. For example, a main home screen may be displayed on the display 160. The main home screen may be a first screen or graphical user interface (GUI) that enables a user interaction that is displayed on the display 160 when the electronic device 101 powers on. At least one of short key icons for running frequent applications, a go-to-main menu key, time, and weather may be displayed on the home screen. When the user chooses the go-to-main menu key, a menu screen may be displayed on the display 160.

A status bar may be displayed on an upper end of the display 160 to display the status of at least one status of the electronic device 101, such as a battery charging status, the strength of received signals, or the current time.

A home button, a menu button, and/or a go-back button may be formed on an edge (also referred to as a bezel or casing portion of the periphery of the display 160) of the front surface 102 of the electronic device 101 which is positioned at a lower portion of the display 160.

The home button may be used to display the main home screen on the display 160. The home button may also be used to display applications that have recently been used or a task manager on the display 160. The menu button may be used to provide a connection menu that may be displayed on the display 160. The connection menu may include at least one of an add widget menu, a change background menu, a search menu, an edit menu, and a setting menu. The go-back button may be used to display the screen displayed immediately before the screen currently in execution or terminate the latest application used.

A first camera 190 and/or at least one of, e.g., a distance sensor, illumination sensor, and proximity sensor may be placed at an edge on the front surface 102 of the electronic device 101 which is positioned at an upper portion of the display 160.

A sub display 162, a second camera 192, a flash, a speaker, and/or at least one sensor, e.g., a distance sensor, may be placed on the rear surface 103 of the electronic device 101.

In the folding state of the electronic device 101, such a setting may be made that a graphic element/interface/information of a preset condition/type (e.g., message reception/transmission information or status information of the electronic device) is displayed on the sub display 162. The sub display 162 may be configured to detect a pressure (e.g., the user's tap/knock). For example, where the user knocks, e.g., double-knocks or taps, on the sub display 162, the electronic device 101 may be configured to display a graphic element/interface/information on the sub display 162. The sub display 162 may be configured to detect fingerprint information.

At least one of, e.g., a power/lock button, volume buttons including a volume-up button and a volume-down button, a terrestrial digital multimedia broadcasting (DMB) antenna for receiving broadcasts, and at least one microphone may be placed on a side surface 104 of the electronic device 101.

Figure 2A:
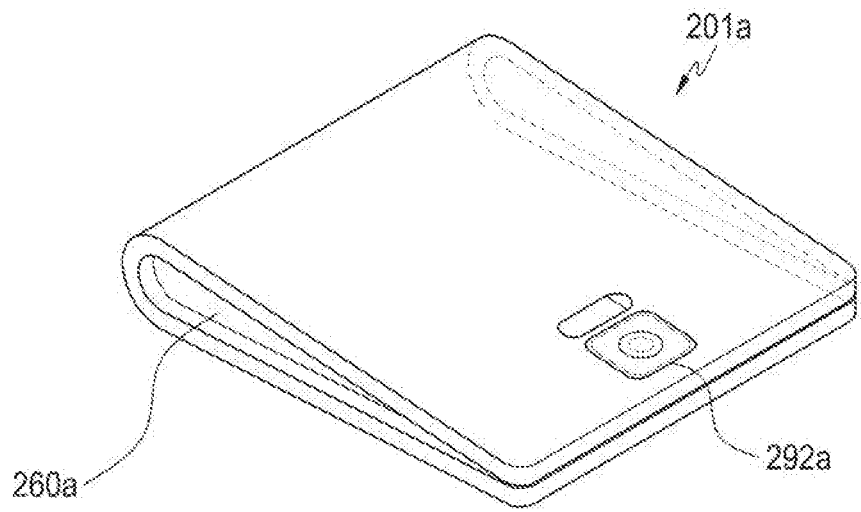
FIGS. 2A and 2B are views illustrating electronic devices according to an embodiment of the present disclosure.
Figure 2B:
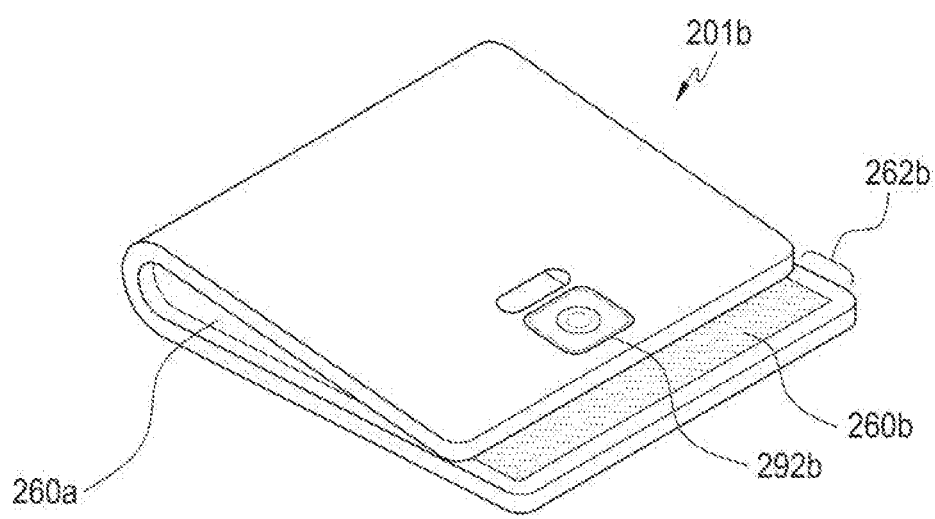

FIGS. 2A and 2B are views illustrating electronic devices according to an embodiment of the present disclosure.

Referring to FIG. 2A, an electronic device 201a may include a second camera 292a. The electronic device 201a may be configured to prevent a display 260a from being externally exposed at an end in a lengthwise direction of the electronic device 201a in a folding state (e.g., a state where lengthwise ends of the electronic device 201a contact each other or are positioned closest to each other).

Referring to FIG. 2B, an electronic device 201b may include a second camera 292b. The electronic device 201b may be configured so that a portion 262b of the display 260b, as a sub display, is externally exposed in a folding state of the electronic device 201b.

Figure 3A:
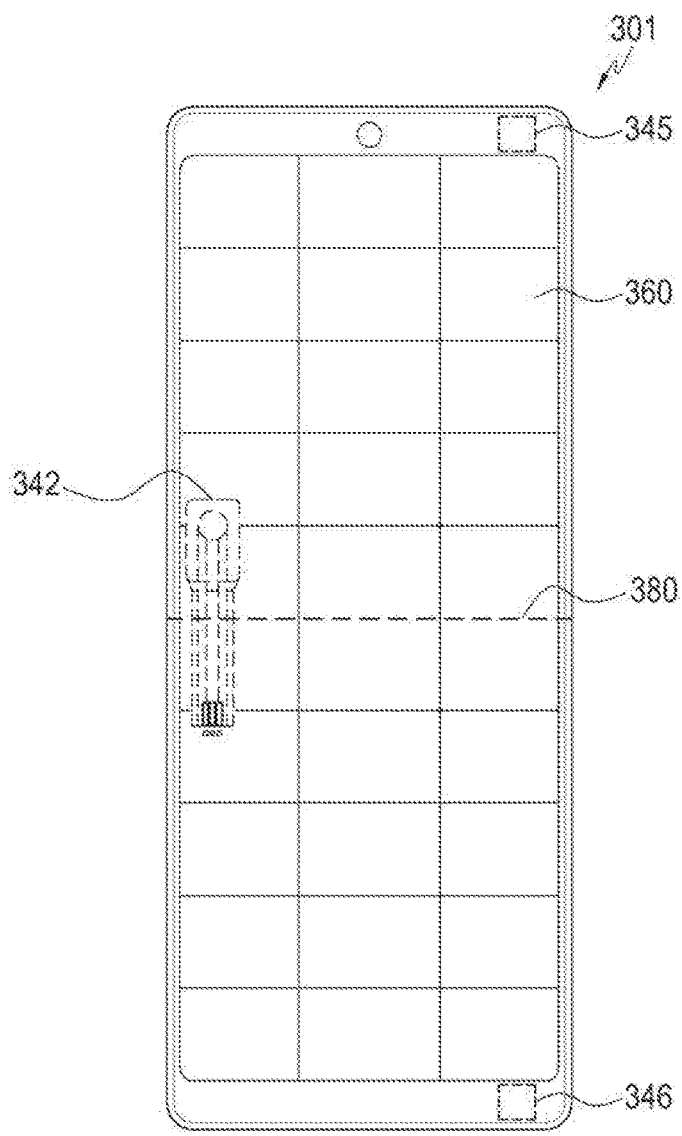
FIGS. 3A and 3B are views illustrating an electronic device according to an embodiment of the present disclosure.
Figure 3B:
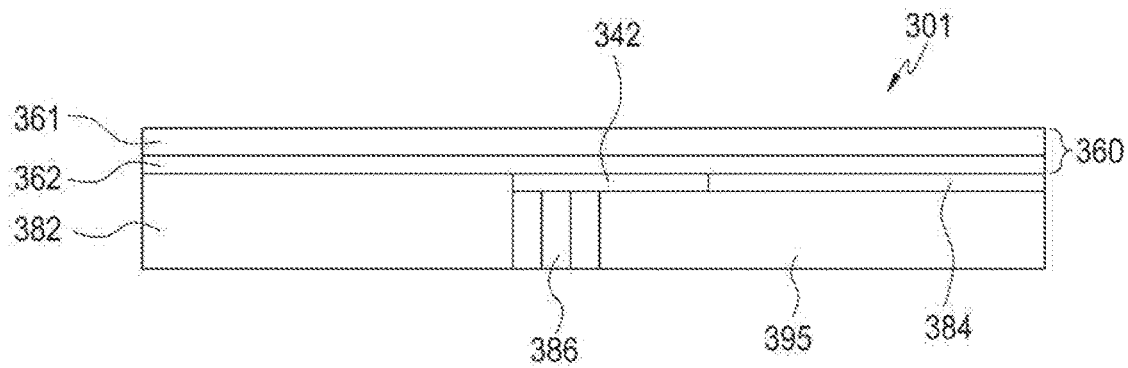

FIGS. 3A and 3B are views illustrating an electronic device according to an embodiment of the present disclosure.

FIG. 3A is a view illustrating a front surface of an unfolded electronic device.

FIG. 3B is a view illustrating a cross section taken lengthwise of an electronic device.

The electronic device 301 may include a strain sensor 342 (e.g., a strain gauge), a first sensor 345, a second sensor 346, a display 360, a hinge 386, an upper printed circuit board (PCB) 382, a lower PCB 384, and a battery 395.

The strain sensor 342 may be disposed at a position 380 where the electronic device 301 is folded. The strain sensor 342 may output a strain value that is used to measure a folded angle of the electronic device 301.

An angle sensor may be disposed at a position 380 where the electronic device 301 is folded. The angle sensor may measure a folded angle of the electronic device 301 or hinge 386.

The first sensor 345 may be disposed at an edge on the front surface of the electronic device 301 which is positioned at an upper portion of the display 360. The second sensor 346 may be disposed at an edge on the front surface of the electronic device 301 which is positioned at a lower portion of the display 160. The first and second sensor 345 and 346 may detect a variation in the folding state of the electronic device 301. For example, the first sensor 345 and the second sensor 346 each may include at least one of a distance sensor and a gyroscope sensor. The first sensor 345 may be a sensor for detecting a magnetic force, and the second sensor 346 may be a magnetic force applier. For example, the distance between the first sensor 345, which is a magnetic force sensor, and the second sensor 346, which is a magnetic force applier, may become closer to each other in response to the operation of bending the electronic device 301, and the magnetic force sensor may thus detect the magnetic force that the magnetic applier applies. As such, since the strength of the magnetic force is varied as the distance between the magnetic force sensor and the magnetic force applier decreases, the electronic device 301 may calculate, e.g., the folded angle based on the magnetic force.

The display 360 may include a flexible panel 361 for displaying images and a third sensor 362 for detecting at least one of, e.g., a pressure and a fingerprint.

The upper PCB 382 and the lower PCB 384 may be separated from each other with the hinge 386 positioned therebetween and may electrically be connected with each other via a flexible connector.

The hinge 386 (e.g., a free-stop hinge) may keep the electronic device 301 in the folding state at various angles.

Figure 4A:
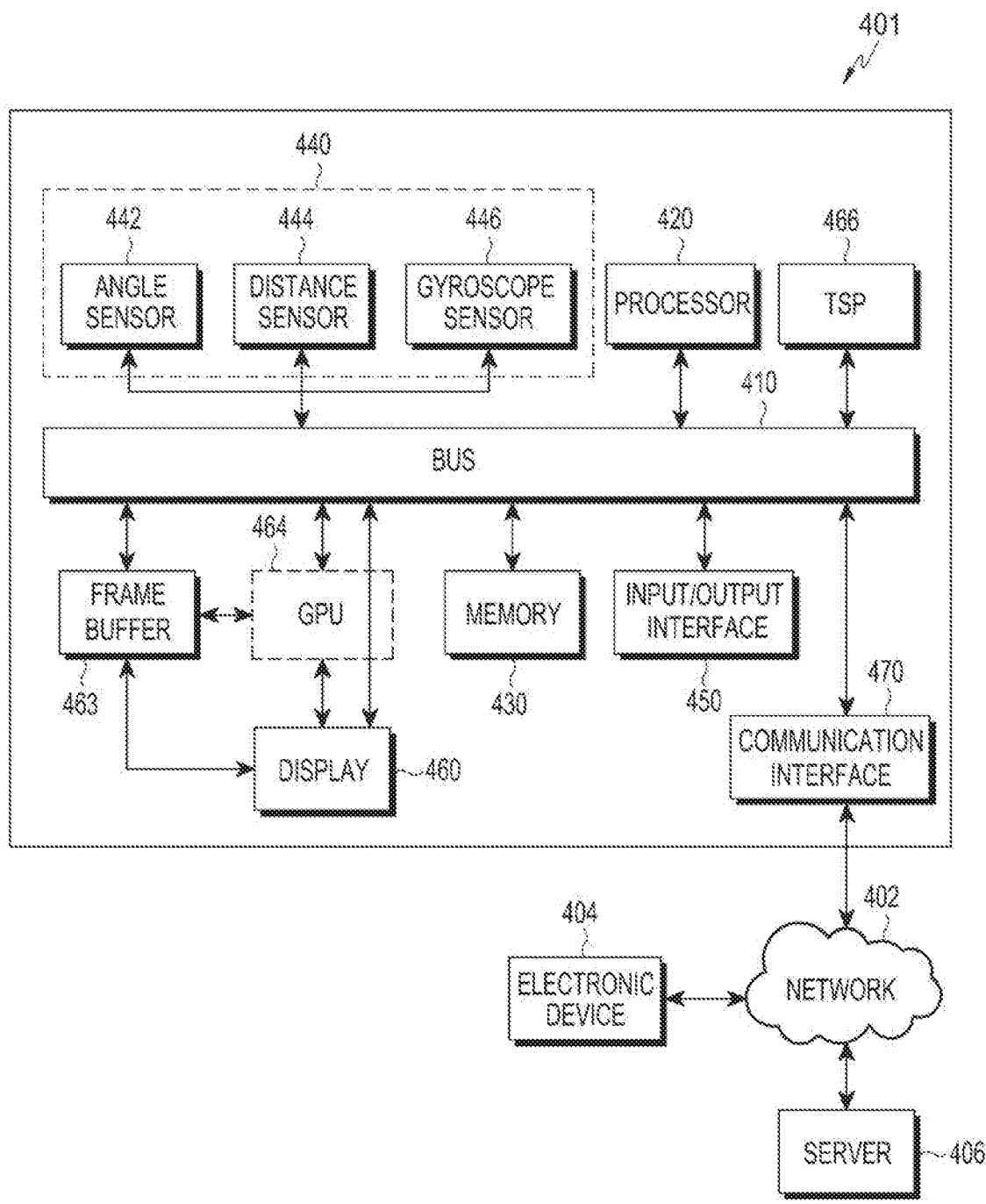
FIG. 4A is a view illustrating an electronic device in a network environment according to an embodiment of the present disclosure.

FIG. 4A is a view illustrating an electronic device in a network environment according to an embodiment of the present disclosure.

Referring to FIG. 4A, according to an embodiment of the present disclosure, an electronic device 401 is included in a network environment. The electronic device 401 (e.g., the electronic device 101) may include a bus 410, a processor 420, a memory 430, a sensor module 440, an input/output interface 450, a display 460 (e.g., the display 160), and a communication interface 470. In some embodiments, the electronic device 401 may exclude at least one of the components or may add another component. For example, the electronic device 401 may further include at least one of frame buffer 463, a graphic processing unit (GPU) 464, and a touchscreen panel (TSP) 466 (also called a touch panel).

The bus 410 may include a circuit for connecting the components 410 to 470 with one another and transferring communications (e.g., control messages or data) between the components. The processing module 420 may include one or more of a CPU, an AP, or a communication processor (CP). The processor 420 may perform control on at least one of the other components of the electronic device 401, and/or perform an operation or data processing relating to communication.

The memory 430 may include a volatile and/or non-volatile memory. For example, the memory 430 may store commands or data related to at least one other component of the electronic device 401. According to an embodiment of the present disclosure, the memory 430 may store software and/or a program. The program may include, e.g., a kernel, middleware, an application programming interface (API), and/or an application program (or an application). At least a portion of the kernel, middleware, or API may be denoted an operating system (OS). For example, the kernel may control or manage system resources (e.g., the bus 410, processor 420, or memory 430) used to perform operations or functions implemented in other programs (e.g., the middleware, API, or application program). The kernel may also provide an interface that allows for access from the middleware, API or application program to individual components of the electronic device 401 to control or manage the system resources.

For example, the middleware may function as a relay to allow the API or application program to communicate data with the kernel. Further, the middleware may process one or more task requests received from the application program in order of priority. For example, the middleware may assign a priority of using system resources (e.g., bus 410, processor 420, or memory 430) of the electronic device 401 to at least one of the application programs and process one or more task requests. The API is an interface allowing the application to control functions provided from the kernel or the middleware. For example, the API may include at least one interface or function (e.g., a command) for file control, window control, image processing or text control.

For example, the sensor module 440 may measure a physical quantity or detect a motion state of the electronic device 401, and the sensor module 240 may convert the measured or detected information into an electrical signal. The sensor module 440 may include at least one of, e.g., an angle sensor 442, a distance sensor 444, and a gyroscope sensor 446. The sensor module 440 may include at least one of, e.g., a gesture sensor, a gyro sensor, an atmospheric pressure sensor, a magnetic sensor, an acceleration sensor, a grip sensor, a proximity sensor, a color sensor, such as a red-green-blue (RGB) sensor, a bio sensor, a temperature/humidity sensor, an illumination sensor, or an Ultra Violet (UV) sensor. Additionally or alternatively, the sensing module 440 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 440 may further include a control circuit for controlling at least one or more of the sensors included in the sensing module. According to an embodiment of the present disclosure, the electronic device 401 may further include a processor configured to control the sensor module 440 as part of the processor 410 or separately from the processor 410, and the electronic device 201 may control the sensor module 440 while the processor 210 is in a sleep mode.

For example, the input/output interface 450 may transfer commands or data input from the user or other external device to other component(s) of the electronic device 401 or may output commands or data received from other component(s) of the electronic device 401 to the user or other external devices. The input/output interface 450 may include at least one of, e.g., a speaker, a receiver, an earphone, and a microphone.

The display 460 may include at least one of, e.g., a liquid crystal display (LCD), a light emitting diode (LED) display, an organic light emitting diode (OLED) display, a microelectromechanical systems (MEMS) display, an electronic paper display, and a projector. The display 460 may display, e.g., various contents (e.g., text, images, videos, icons, or symbols) to the user.

The frame buffer 463 may store pixel values or pixel color values that are to be outputted to the display 460. The frame buffer 463 may be implemented to be a memory, a memory in the GPU 464, display 460, or display controller, or a virtual device, e.g., a linux frame buffer device.

The GPU 464 may generate a screen including various objects, such as items, images, or text. The GPU 464 may calculate an attribute value of at least one of, e.g., coordinates at which each object is to be display, type, size, and color as per the layout of the screen and generate various layouts of screens including objects based on the calculated attribute value. The term "screen" or "application screen" as used herein may denote the whole or part of an image that is shown on a surface (or a display are) of the display 460. For example, application screen may also be referred to as a graphic interface, GUI, application window, or application area.

The touchscreen panel 466 (also denoted a touch panel) may receive a touch, gesture, proximity, or hovering input using an electronic pen or the user's body portion. For example, the touchscreen panel 466 may be included in the display 460. The touchscreen panel 466 may use at least one of, e.g., capacitive, resistive, infrared, or ultrasonic methods to detect a touch/hovering. The touchscreen panel 466 may further include a control circuit. The touchscreen panel 466 may further include a tactile layer and may provide a user with a tactile reaction.

The communication interface 470 may establish communication between the electronic device 401 and an external electronic device (e.g., the external electronic device 404 or the server 406). For example, the communication interface 470 may be connected with the network 402 through wireless or wired communication to communicate with the external device (e.g., the second external electronic device 404 or the server 406).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the present disclosure, the wireless communication may include at least one of, e.g., Wi-Fi, Bluetooth, Bluetooth low power (BLE), Zigbee, near field communication (NFC), magnetic secure transmission (MST), radio frequency, or body area network (BAN). According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 402 may include at least one of telecommunication networks, e.g., a computer network (e.g., local area network (LAN) or wide area network (WAN)), Internet, or a telephone network.

The external electronic device 404 may be of the same or different type of the electronic device 401. According to an embodiment of the present disclosure, all or some of operations executed on the electronic device 401 may be executed on another or multiple other electronic devices (e.g., the external electronic device 404 or server 406). According to an embodiment of the present disclosure, when the electronic device 401 should perform some function or service automatically or at a request, the electronic device 401, instead of executing the function or service on its own or additionally, may request another device (e.g., electronic device 404 or server 406) to perform at least some functions associated therewith. The other electronic device (e.g., electronic device 404 or server 406) may execute the requested functions or additional functions and transfer a result of the execution to the electronic device 401. The electronic device 401 may provide a requested function or service by processing the received result as it is or additionally. To that end, a cloud computing, distributed computing, or client-server computing technique may be used, for example.

Figure 4B:
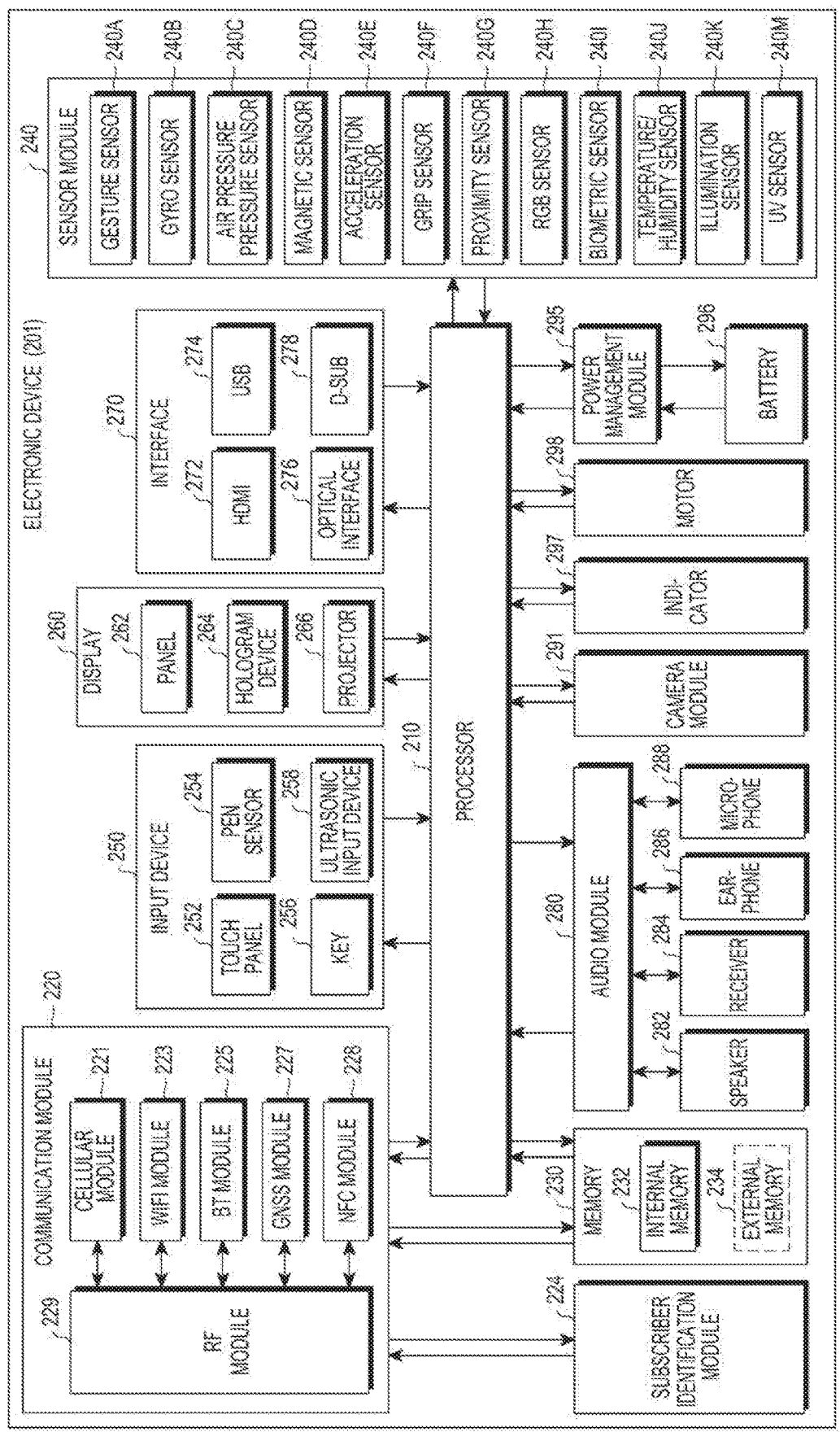
FIG. 4B is a block diagram illustrating an electronic device according to an embodiment of the present disclosure.

FIG. 4B is a block diagram illustrating an electronic device 201 according to an embodiment of the present disclosure. The electronic device 201 may include the whole or part of the configuration of, e.g., the electronic device 401 shown in FIG. 4A. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a GPU and/or an image signal processor. The processor 210 may include at least some (e.g., the cellular module 221) of the components shown in FIG. 4B. The processor 210 may load a command or data received from at least one of other components (e.g., a non-volatile memory) on a volatile memory, process the command or data, and store resultant data in the non-volatile memory.

The communication module 220 (e.g., the communication interface 470) may include, e.g., a cellular module 221, a Wi-Fi module 223, a Bluetooth (BT) module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a CP. According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (IC-CID) or subscriber information (e.g., an international mobile subscriber identity (IMSI)).

The memory 230 (e.g., the memory 430) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multimedia card (MMC), or a Memory Stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a RGB sensor, a bio sensor 240I, a temperature/humidity sensor 240J, an illumination sensor 240K, or an UV sensor 240M. Additionally or alternatively, the sensing module 240 may include, e.g., an e-nose sensor, an EMG sensor, an EEG sensor, an ECG sensor, an IR sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 201 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 460) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a HDMI 272, a USB 274, an optical interface 276, or a D-subminiature (D-sub) 278. The interface 270 may be included in e.g., the communication interface 470 shown in FIG. 4A. Additionally or alternatively, the interface 270 may include a mobile high-definition link (MHL) interface, a SD card/MMC interface, or infrared data association (IrDA) standard interface.

The audio module 280 may converting, e.g., a sound signal into an electrical signal and vice versa. At least a part of the audio module 280 may be included in e.g., the input/output interface 450 as shown in FIG. 4A. The audio module 280 may process sound information input or output through e.g., a speaker 282, a receiver 284, an earphone 286, or a microphone 288. For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp. The power manager module 295 may manage power of the electronic device 201, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., DMB, digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

FIGS. 5A to 5G are views illustrating program modules according to an embodiment of the present disclosure.

Figure 5A:
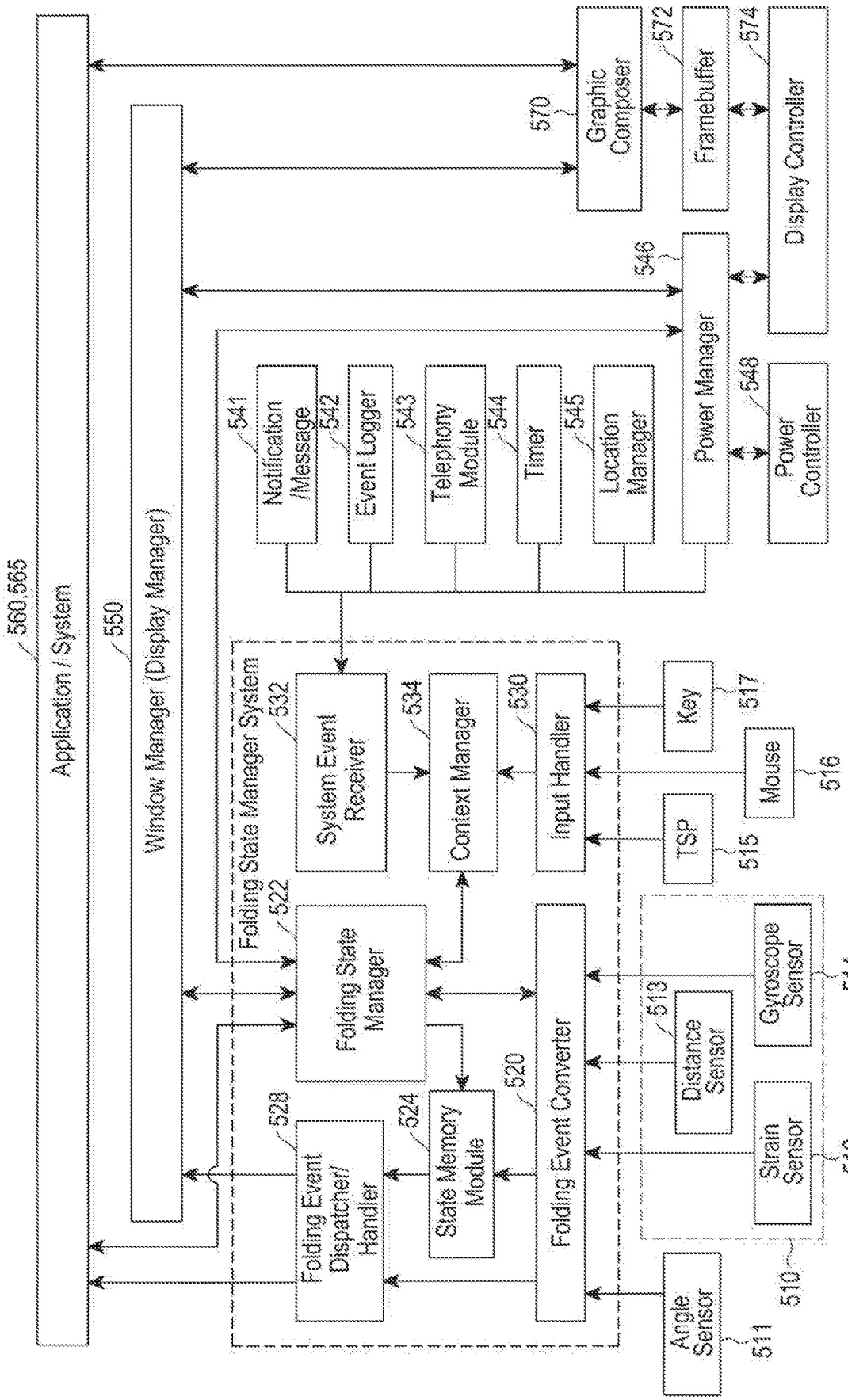
FIGS. 5A, 5B, 5C, 5D, 5E, 5F, and 5G are views illustrating program modules according to an embodiment of the present disclosure.

Referring to FIG. 5A is a block diagram illustrating a program module according to an embodiment of the present disclosure. According to an embodiment of the present disclosure, the program module may include an operating system for controlling resources related to the electronic device (e.g., the electronic devices 101, 201a, 201b, 301, and 401) and/or various applications running on the operating system). The operating system may include, e.g., Android™, iOS™, Windows™, Symbian™ Tizen™, or Bada™. At least a part of the program module may be preloaded on the electronic device or may be downloaded from an external electronic device (e.g., the electronic device 404 or server 406).

A folding event converter 520, also simply referred to as an event converter, may analyze raw data received from a sensor 510 (e.g., a strain sensor 512, a distance sensor 513, or a gyroscope sensor 514) and calculate a folding state. Here, the term "folding" may also be referred to as bending, and the term "folding event" may also be referred to as a folding gesture.

A folding event dispatcher/handler (also referred to as an event handler) 528 may transfer a folding state/event to a system 565 or application 560.

A folding state manager 522 may transfer the folding state to a corresponding module.

A state memory module 524 may store the folding state.

The notification/message manager 541 may provide an event, e.g., arrival message, appointment, or proximity alert, to the user.

An event logger 542 may record events and display events in order of time.

A telephony module 543 may manage voice/video call functions of the electronic device.

A timer 544 may provide a timer function.

The location manager 545 may manage, e.g., locational information on the electronic device.

The power manager 546 may interwork with, e.g., a power controller 548 to manage, e.g., the battery capability or power and provide power information necessary for the operation of the electronic device.

A system event receiver 532 may receive an event from the notification/message manager 541, the event logger 542, the telephony module 543, the timer 544, or the power manager 546 and transfer the event to a context manager 534.

An input handler 530 may receive an input from a TSP 515, a mouse 516, or a key 517 and transfer the input to the context manager 534.

The context manager 534 may manage system services based on, e.g., the input, system event, or folding state.

A display controller 574 may control the screen on/off.

A frame buffer 572 may store pixel values or pixel color values that are to be outputted to the display.

A graphic composer G570 may generate a screen including various objects, such as items, images, or text.

The window manager 550 may manage GUI resources used on the screen.

The application 560 may include an application that may provide, e.g., a home, a dialer, an short message service (SMS)/multimedia messaging service (MMS), an instant message (IM), a browser, a camera, an alarm, a contact, a voice dial, an email, a calendar, a media player, an album, or a clock, a health-care (e.g., measuring the degree of workout or blood sugar), or provision of environmental information (e.g., provision of air pressure, moisture, or temperature information).

At least a portion of the program module may be implemented (e.g., executed) in software, firmware, hardware (e.g., the processor), or a combination of at least two or more thereof and may include a module, program, routine, command set, or process for performing one or more functions.

Figure 5B:
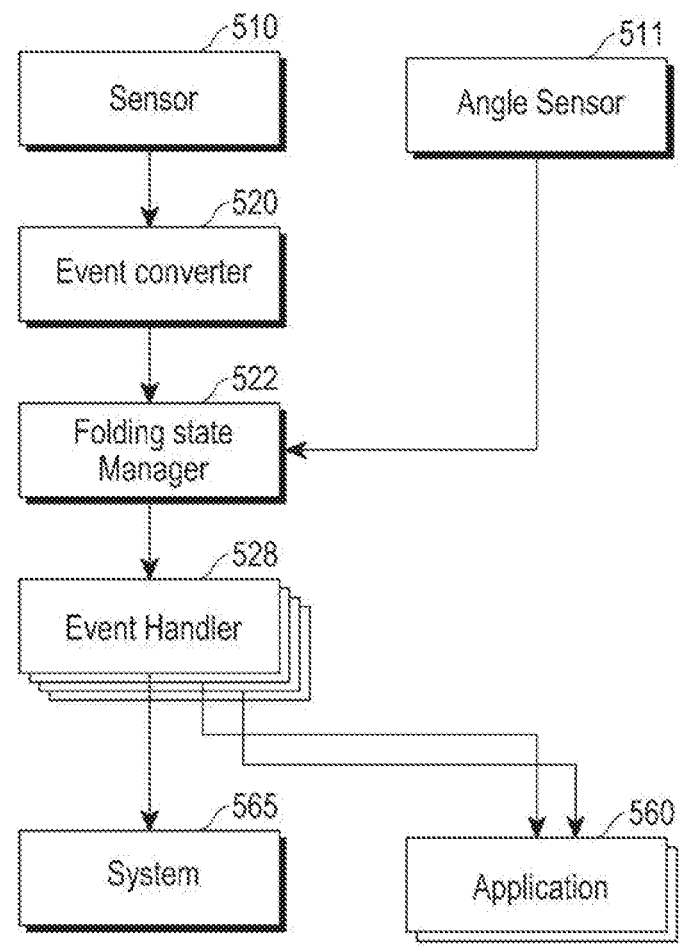

Referring to FIGS. 3A and 5B, the event converter 520 may analyze the raw data from the sensor 510 and calculate a folding state. For example, where the first sensor 345 and the second sensor 346 each include a gyroscope sensor, the event converter 520 may calculate a folded angle of the electronic device 301 by comparing an angle between the ground and an axis of the first sensor 345, which is measured by the first sensor 345, with the angle between the ground and an axis of the second sensor 346, which is measured by the second sensor 346.

Where the first sensor 345 includes a magnetic force sensor, and the second sensor 346 includes a magnetic force applier, the electronic device 301 may detect a magnetic force, which the magnetic force applier applies, in response to the operation of bending the electronic device 301.

In such case, since the strength of the detected magnetic force is proportional to the folded angle—i.e., as the electronic device 301 is folded, the strength of the magnetic force increases, the event converter 520 may calculate the folded angle of the electronic device 301 based on the strength of the magnetic force.

A folding state may be measured directly by the angle sensor 511 or may be determined by the calculation of the event converter 520. A folding state may be represented in an angle, a state corresponding to a predetermined angle range, or in a trend of the angle increasing or decreasing.

The folding state manager 522 may transfer the folding state/event to the event handler 528. The folding event may be processed by the event handler 528 registered. The event handler 528 may be registered by various modules, e.g., the system 565, application 560, or background service, and the registered event handler 528 may process the folding event in order of priority. For example, the order of priority may be determined to be the order of the system 565, a visible (or activated) application, an application that is running but is not directly visible to the user, and a background service having no visible UI. For example, where a folding event is not processed by an event handler with a higher priority, the folding event may be processed by an event handler with a next priority.

The sequential processing of the folding event may provide the following effects.

Where the electronic device is folded at a preset angle or less, the system 565 may display an alpha screen or gadget. For example, the alpha screen may be configured in a window that may freely be moved and display at least one of, e.g., multimedia content, user-customized information, and real-time information. Under a particular circumstance, e.g., in a horizontal mode, the system 565 might not process the folding event, and where a next-priority event handler 528 is registered in a video application, the video application may stop or start the playback of video according to a folding/unfolding event.

Figure 5C:
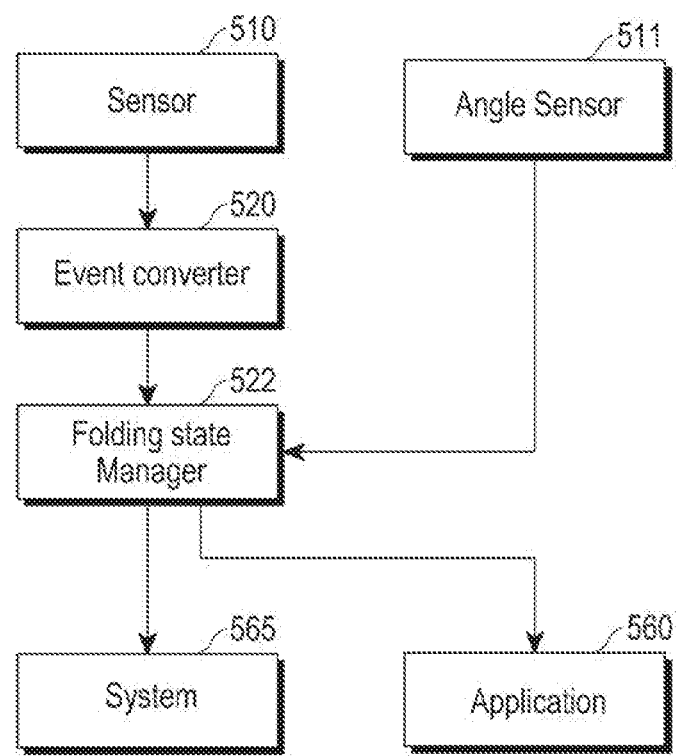

Referring to FIG. 5C, the folding state manager 522 may transfer the folding state/event to the system 565 or application 560 directly but without passing through the event handler. For example, the folding state manager 522 may determine whether or which to deliver the folding event to based on context information about the electronic device which is obtained from the context manager 534.

Figure 5D:
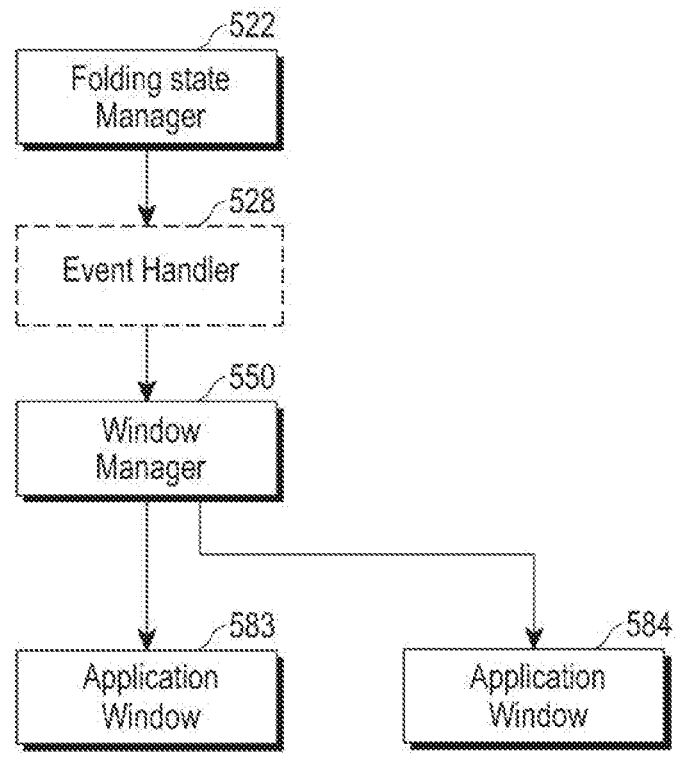
Figure 5E:
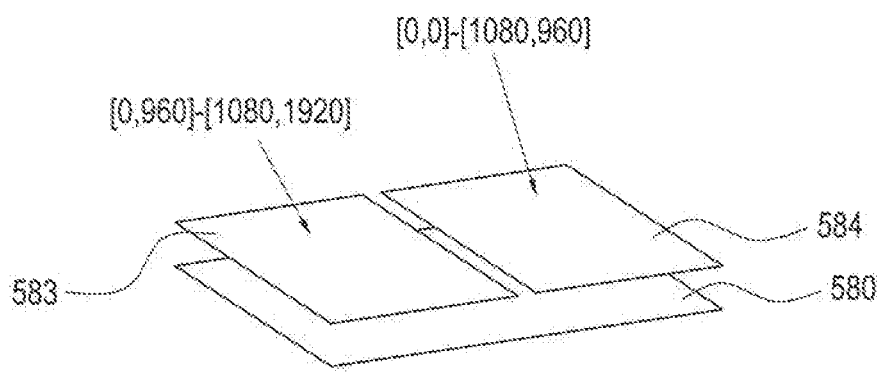

Referring to FIGS. 5D and 5E, in a screen splitting scheme where the display 580 is not virtually split but the screen of the display 580 is split into a plurality of areas, the coordinates on the display 580 for the same point on the application windows differ depending on the position of the application windows 583 and 584. Thus, the window manager 550 may adjust the application windows 583 and 584 to comply with the split areas.

Figure 5F:
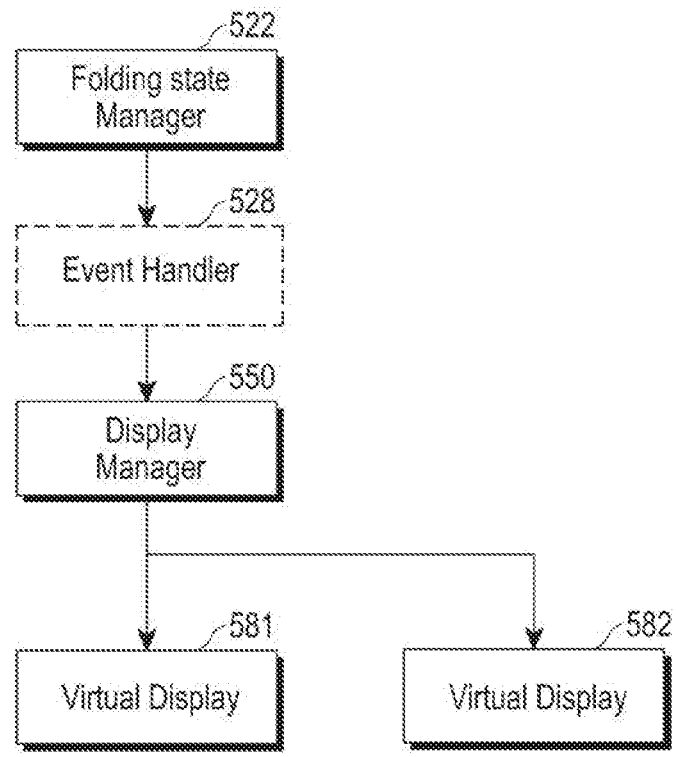
Figure 5G:
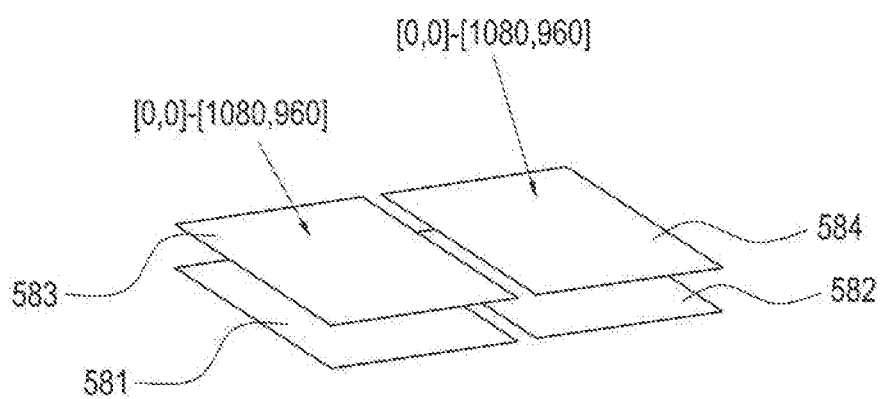

Referring to FIGS. 5F and 5G, in a screen splitting scheme where the display is split into virtual displays 581 and 582, the plurality of virtual displays 581 and 582 respectively correspond to the plurality of application windows 583 and 584 in a one-to-one correspondence manner. Although the application windows 583 and 584 have different positions, the coordinates on the corresponding display for the same point on the application windows are the same. Thus, the display manager 550 may adjust the virtual displays 581 and 582 to comply with the split areas.

Figure 6A:
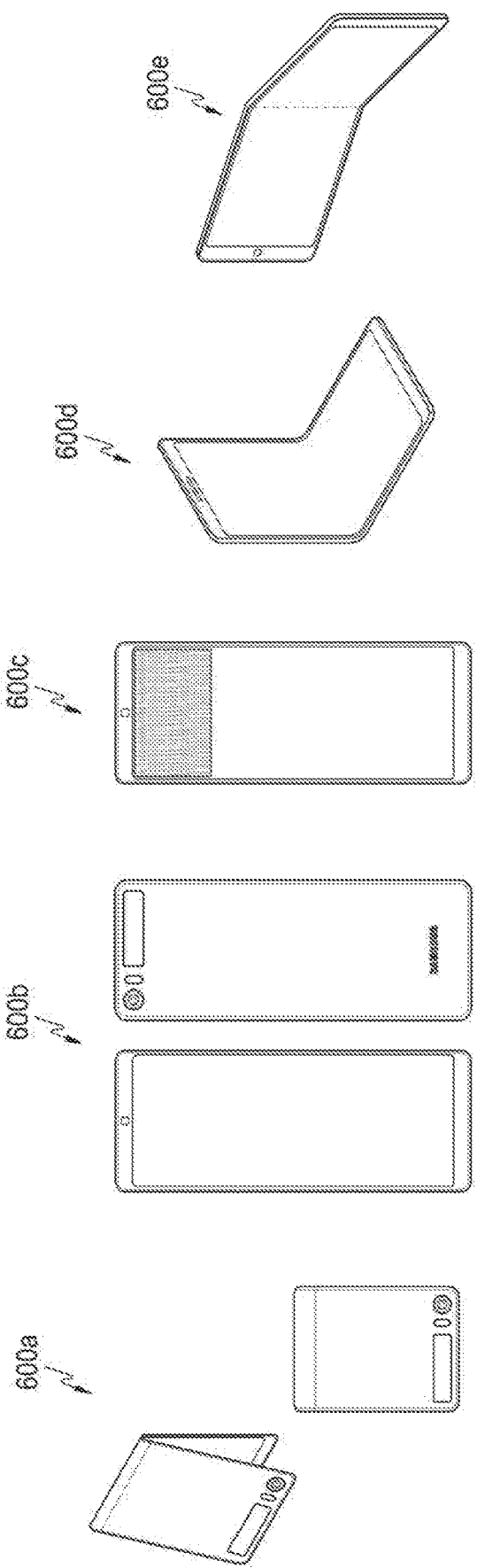
FIG. 6A is a perspective view illustrating various states of an electronic device according to an embodiment of the present disclosure.

FIG. 6A is a perspective view illustrating various states of an electronic device according to an embodiment of the present disclosure.

A flexible electronic device may have various folding or unfolding states as shown in FIG. 6A. The flexible electronic device may have at least one state of a folding state 600a in which the flexible electronic device is in a fully folded state so that both ends of the electronic device meet each other or are positioned closest to each other, an unfolding state 600b in which the electronic device is in a fully unfolded state, a state 600c in which an overlay-type window is displayed when the electronic device is bent at a preset angle or more with respect to an axis, a state 600d in which the electronic device stands folded inward in half, e.g., like a compact does, and a state 600e in which the electronic device is folded in a horizontal mode. In the state 600c where the overlay-type window is displayed and the state 600d where the electronic device stands folded inward in half, the ratio of folding may be implemented so that the electronic device is folded in half with respect to a center of the electronic device or implemented to differ with respect to the axis.

As such, the flexible electronic device may be folded or bent with respect to one axis. Here, the axis may be a preset or arbitrary axis. When the axis is a preset one, it may mean that only a particular area (e.g., a portion including the axis) of the display in the flexible electronic device is bendable. When the axis is an arbitrary one, it may mean that the whole area of the display in the flexible electronic device is bendable. Although FIG. 6A illustrates that the electronic device is folded in half with respect to the axis passing through the center of the electronic device, it may be apparent to one of ordinary skill in the art that the position of the axis is not particularly limited.

Figure 6B:
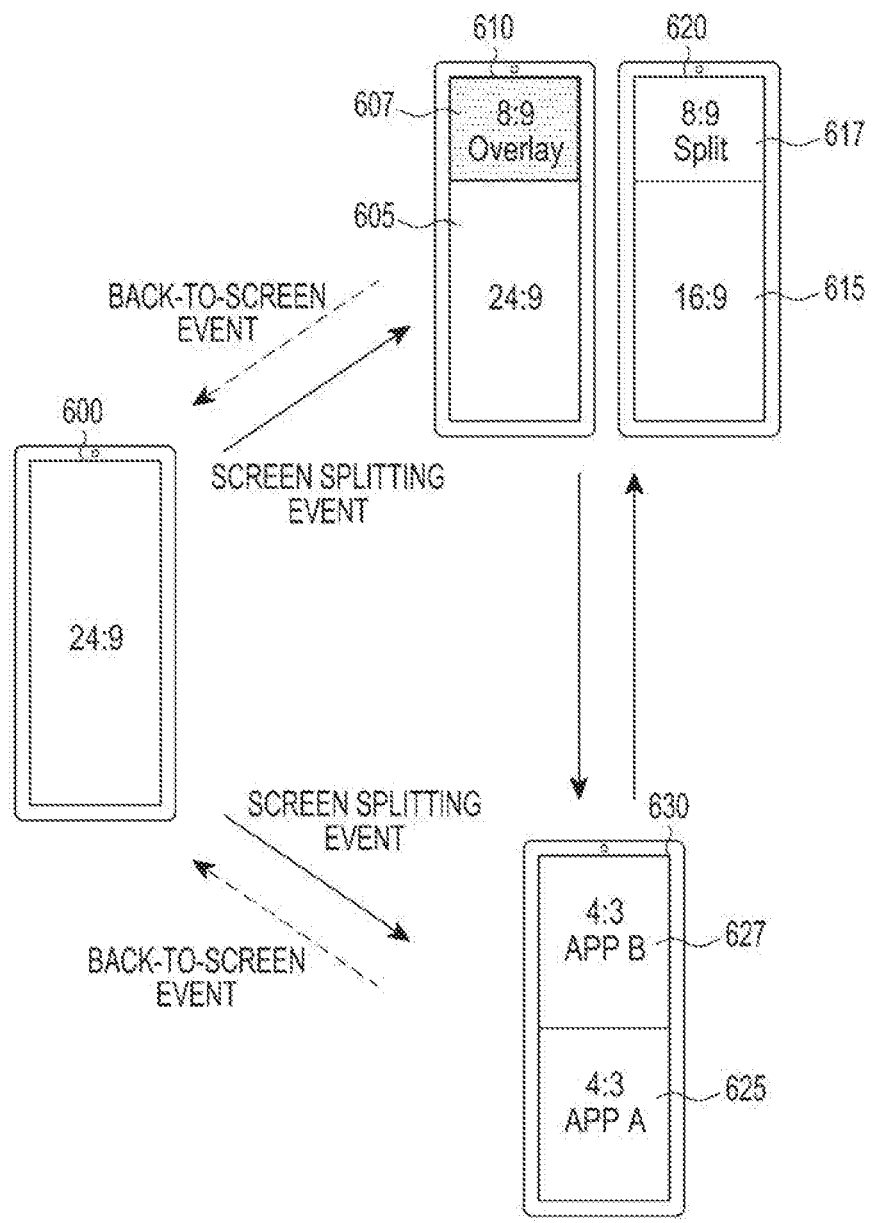
FIG. 6B is a view illustrating a ratio as per splitting a screen in an electronic device according to an embodiment of the present disclosure.

FIG. 6B is a view illustrating a ratio as per splitting a screen in an electronic device according to an embodiment of the present disclosure.

Referring to FIG. 6B, according to an embodiment of the present disclosure, in an unfolding state of the electronic device, the basic screen (or the whole screen) 600 of the display 460 may have a screen ratio of 24:9. For example, the ratio of the basis screen 600 may be varied. It may also be appreciated that the first window 605 occupying a majority of the whole display area has a ratio of 24:9.

The basic screen 600 is a screen of the unfolded display and may switch into screens 610, 620, and 630 with other various ratios, corresponding to an event for screen splitting.

According to an embodiment of the present disclosure, corresponding to the type of a screen splitting-related event while the basic screen 600 is displayed, the basic screen 600 may switch into a first screen 610 in which the second window 607 having a ratio of 8:9 is displayed overlaid on the first window 605 having a ratio of 24:9. At this time, in a split mode, not the overlay type, the first window 615 is shrunken in a ratio of 16:9, and a second screen 620 may thus be displayed in which the second window 617 having a ratio of 8:9 shares a common boundary with the first window 615. For example, corresponding to a folding interaction in the state of the basic screen 600 being displayed, the second window (e.g., an alpha screen) 607, which is overlaid and displayed, is invoked, and corresponding to an unfolding interaction, the second window (e.g., an alpha screen) 607 may be hidden. Corresponding to a lining input traversing the screen in the state of the second window (e.g., an alpha screen) 607 is overlaid and displayed, a fixed window (e.g., an alpha screen) 617, like the second screen 620, may be displayed. On the contrary, corresponding to a lining input traversing the screen in an opposite direction, the second window (e.g., an alpha screen) 617 may be released, allowing it to switch back to the state where the basic screen 600 is displayed.

According to an embodiment of the present disclosure, corresponding to the type of a screen splitting-related event in a state where the basic screen 600 is displayed, a third screen 630 where at least two windows 625 and 627 each having a ratio of 4:3 with respect to the folded portion of the display are arranged may be displayed.

According to an embodiment of the present disclosure, the switch from the basic screen 600 to the first screen 610 or the second screen 620 and the switch from the basic screen 600 to the third screen 630 may be performed with respect to an event for screen splitting. Examples of the event for screen splitting may include, e.g., varying the folding state, an input (or touch/hovering/swipe input), at least partially, traversing in a direction on the display 460, an input of moving from a first end of the display 460 in a width direction or its proximate position to a second end, which is positioned opposite the first end, or its proximate position, the position where the touch input occurs, a touch input that lasts for a predetermined time, varying the strength of the touch, a folding/bending/motion input of folding or bending the electronic device, a voice input, or choosing a software button (or a toggle button) displayed on the display 460.

According to an embodiment of the present disclosure, upon detecting the event, a screen ratio of at least two screens constituting the display 460 may be set in response to the detection of the event. For example, whenever the button displayed on the display 460 is selected, at least one of the splitting ratio of the at least two screens constituting the display 460 and the screen display type (e.g., overlay or split) may be varied. For example, the screen splitting ratio of the at least two screens constituting the display 460 or the screen display type may be varied depending on the number of times in which the software button displayed on the display 460 is pressed or whenever the toggle button is chosen.

According to an embodiment of the present disclosure, upon detecting the event, a switch between the first screen 610 or the second screen 620 and the third screen 630 may be made in response to the detection of the event.

A switchback to the basic screen 600 from the first screen 610, second screen 620, or the third screen 630 may be made corresponding to an event for a screen switchback. Examples of the event for screen switchback may include, e.g., an input (or touch/hovering/swipe input), at least partially, traversing in an opposite direction of the one direction on the display 460, an input of moving from the second end of the display 460 in the width direction, which is positioned opposite the first end, to the first end or its proximate position, an unfolding/motion input of unfolding the electronic device, a voice input, or choosing the software button (or toggle button) displayed on the display 460.

Figure 7:
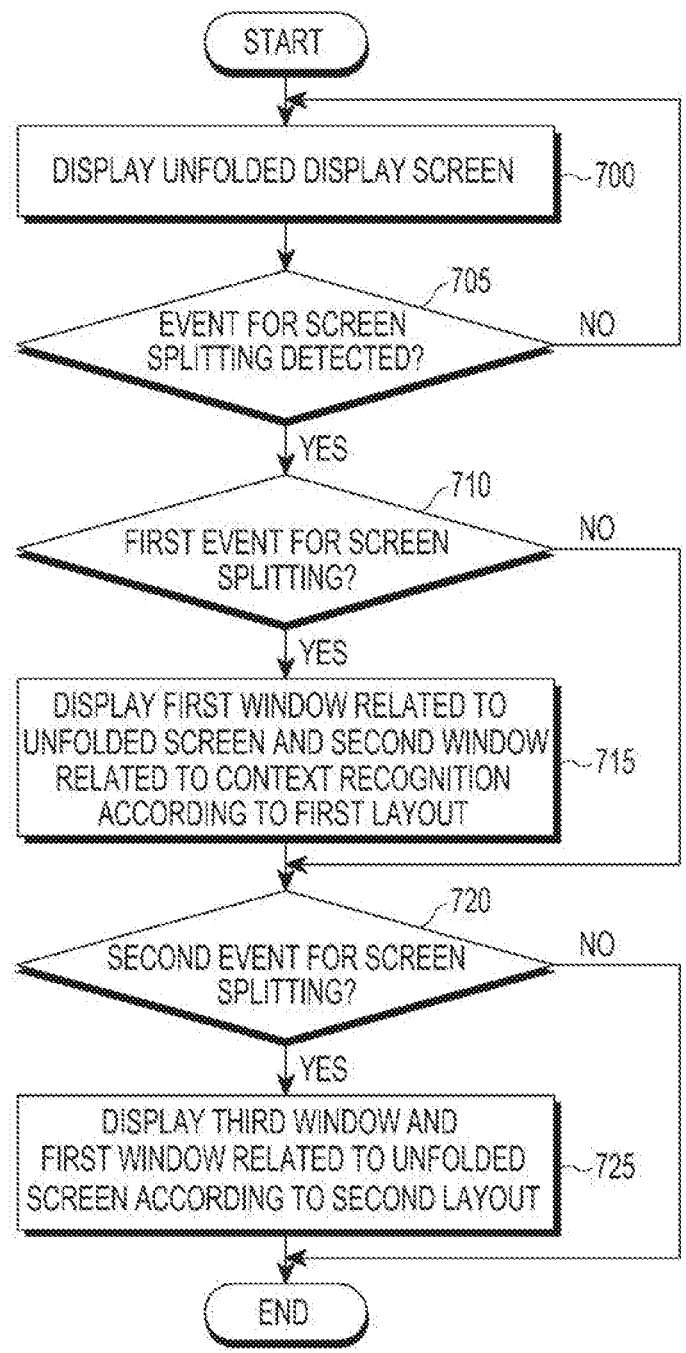
FIG. 7 is a flowchart illustrating a method for controlling a display by an electronic device according to an embodiment of the present disclosure.

FIG. 7 is a flowchart illustrating a method for controlling a display by an electronic device according to an embodiment of the present disclosure. Although the display control method is described below to be performed by an electronic device (e.g., the electronic device 101, 201a, 301, or 401), the display control method may also be performed by a processor (e.g., the processor 210 or 420) or controller in the electronic device.

In operation 700, the electronic device may display an unfolded screen that corresponds to a whole area of a display (e.g., the display 460) functionally connected with the electronic device.

In operation 705, the electronic device may detect an event related to the screen splitting of the display 460.

According to an embodiment of the present disclosure, the screen display scheme may be varied depending on the folding state of the electronic device, e.g., the angle at which the electronic device is folded. In such case, a first event related to the screen splitting may correspond to an angle at which the electronic device is folded within a first threshold angle, and a second event related to the screen splitting may correspond to an angle at which the electronic device is folded within a second threshold angle that exceeds the first threshold angle.

According to an embodiment of the present disclosure, the screen display scheme may be varied depending on, e.g., touch inputs on the display of the electronic device. In such case, the first event related to the screen splitting may correspond to a touch input at least partially traversing in a first direction on a first area of the display, and the second event related to the screen splitting may correspond to a touch input at least partially traversing in the first direction on a second area of the display. In this case, the second area of the display may be a predetermined size of area including a boundary splitting the display in half, and the first area may be the other area than the second area.

In operation 710, upon detecting the event related to the screen splitting, the electronic device may determine whether it corresponds to the first event related to the screen splitting. In operation 715, when it corresponds to the first event related to the screen splitting, the electronic device may display a first window related to the unfolded screen and a second window related to context recognition according to a first layout.

Here, the first window corresponds to a whole area of the display 460 and may be a main screen where one or more applications run, a tray screen where a plurality of applications are arranged, or a home screen that corresponds to a screen first displayed when the electronic device powers on.

The second window, in a case where the predetermined layout is an overlay mode, may be displayed overlaid on the first window. In the overlay mode, the second window overlaid on the first window may be smaller in size than a half of the first window. If the predetermined layout is a split mode, the first window and the second window may be arranged vertically while reducing the size of the first window and sharing a common boundary of the first window and the second window. In the split mode, the whole screen may be constituted of the first window and the second window smaller in size than the first window with respect to the common boundary.

According to an embodiment of the present disclosure, contents displayed on the second window may include one or more gadgets which may be referred to as an alpha screen. The alpha screen may freely be moved and constituted of multimedia content or real-time information, e.g., various objects corresponding to user profile-based customized items recommended in relation to the context recognition. Accordingly, the second window may display recommended items according to the context recognition, e.g., recommended items that are based on, e.g., user profile information or user log information indicating a pattern history of the use of the electronic device by the user. Such an alpha screen may also be displayed that corresponds to a user interface including contents according to the state (e.g., a running application or environment) of the electronic device or the user's environment (e.g., location, weather, or time). The alpha screen may also be used for previously showing application information (e.g., email or message) or may provide other various contents, e.g., by being displayed in the form of a widget (e.g., a weather or news widget) that operates alone without the need for running an application).

In operation 720, as a result of such detection, the electronic device may determine whether it corresponds to the second event related to the screen splitting. In operation 725, when it corresponds to the second event related to the screen splitting, the electronic device may display a first window and a third window related to the unfolded screen according to a second layout. The electronic device may also detect the second event for screen splitting even when the first window and the second window are displayed in operation 715.

According to an embodiment of the present disclosure, the electronic device may display the first window and the third window on the areas, respectively, which are split with respect to the folded portion of the display 460, corresponding to the second event related to the screen splitting on the unfolded screen. Here, the first window may be reduced to the size of the split area and displayed into the split area, and the third window may display different contents depending on running applications.

For example, in a state where no or one application is currently running, the first window may display, e.g., a content corresponding to the unfolded screen—i.e., the latest screen or an application tray screen, and the third screen may display a screen related to the application executed latest.

When a plurality of applications run, e.g., when a second application starts to run while a first application is running, the screen related to the first application, which used to be displayed on the third window, may be moved and displayed on the first window, and the screen related to the second application may be displayed on the third window. At this time, the first window may be positioned on the upper one of the split areas of the display 460, and the third window may be positioned on the lower area.

As described above, the electronic device may perform control to split at least a portion of a whole display area (or a whole screen) of the display into a plurality of areas (e.g., a first area and a second area) and display a first window and a second window on the first area and the second area, respectively.

Figure 8:
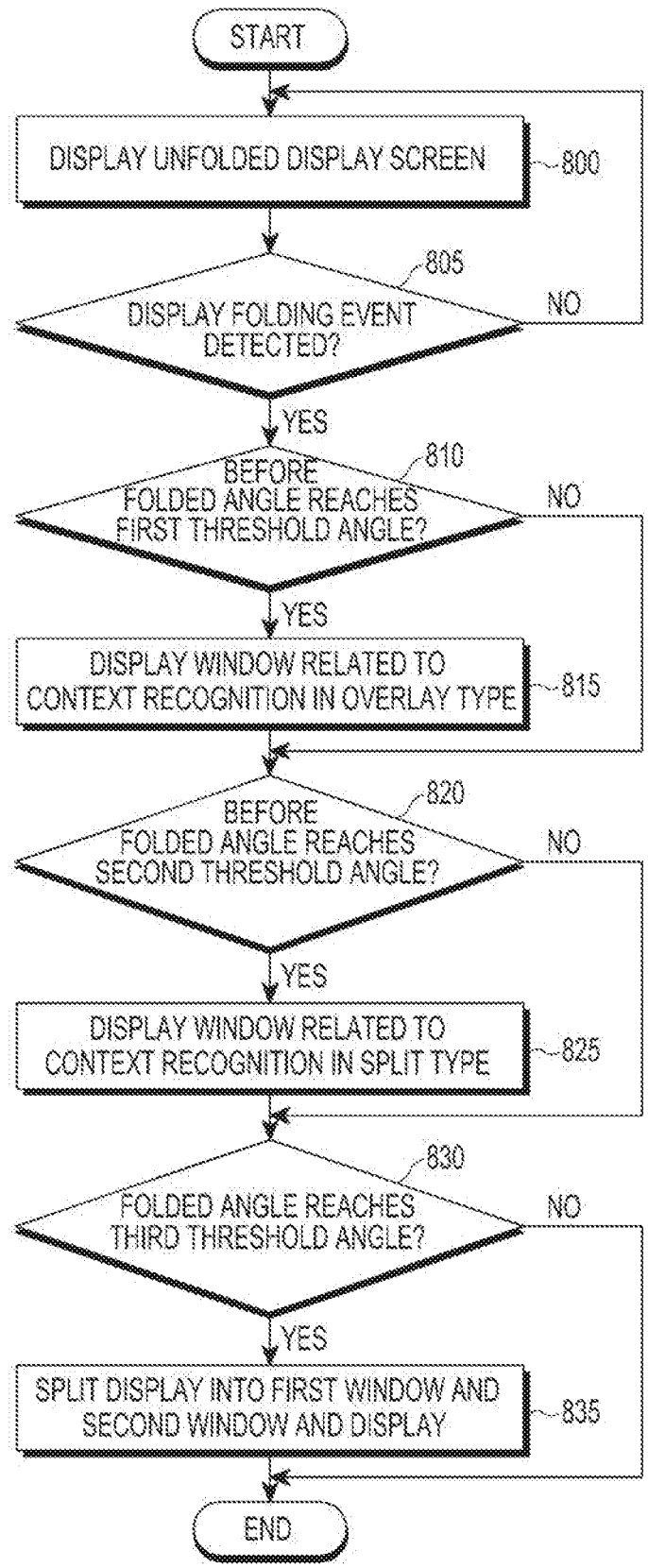
FIG. 8 is a flowchart illustrating a method for controlling a screen as per the folding of an electronic device according to an embodiment of the present disclosure.

FIG. 8 is a flowchart illustrating a method for controlling a screen as per the folding of an electronic device according to an embodiment of the present disclosure. A scheme of varying the screen display depending on the angle at which an electronic device is folded is described with reference to FIGS. 9A to 9D.

In a state where an unfolded display screen is displayed in operation 800, the electronic device may detect whether a display folding event occurs in operation 805.

FIGS. 9A, 9B, 9C, and 9D are perspective views illustrating screen configurations as per angles of bending of an electronic device according to an embodiment of the present disclosure.

Figure 9A:
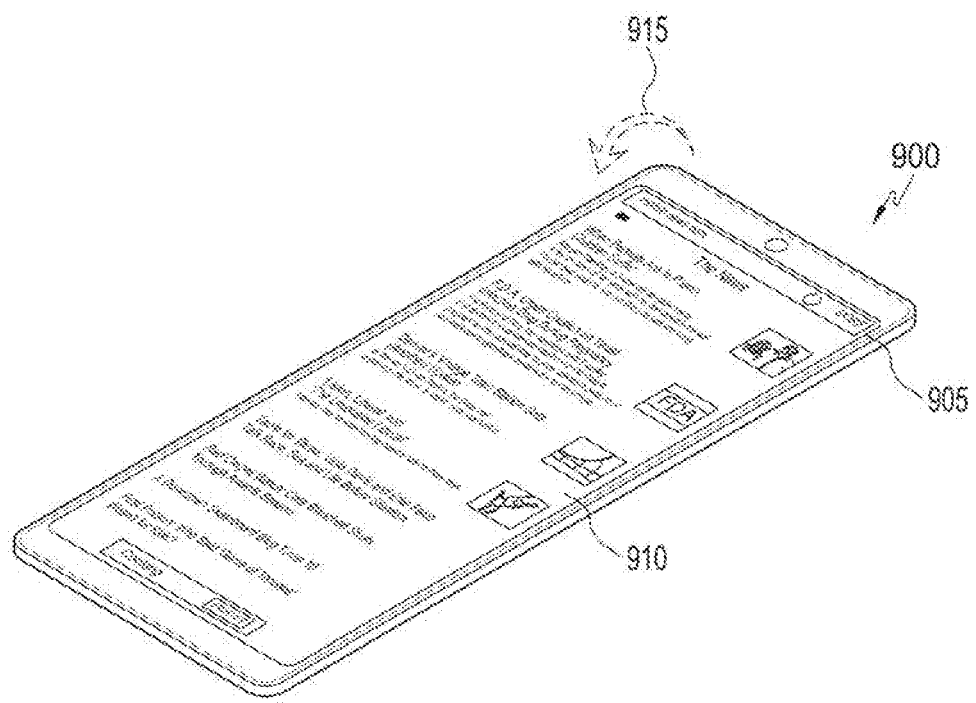
FIGS. 9A, 9B, 9C, and 9D are perspective views illustrating screen configurations as per angles of bending of an electronic device according to an embodiment of the present disclosure.

Referring to FIG. 9A, in a state where the display 905 of the electronic device 900 is in an unfolding state, a screen 910 (e.g., a web document/webpage) related to a first application (e.g., a web browser) may be displayed on at least a portion (or a whole screen) of the display 905. In such state, the user may fold the electronic device 900 in a forward direction 915 with respect to the folded portion of the display 905.

Accordingly, the electronic device may determine whether the folded angle reaches yet a first threshold angle based on, e.g., the folded angle of the hinge, in operation 810. For example, the electronic device may determine whether it is in a first folding state (e.g., a state 600c of FIG. 6A where the electronic device is slightly bent at a preset angle or more) that corresponds to a first angle range. Before the folded angle reaches the first threshold angle, a window (e.g., an alpha screen) related to context recognition may be displayed in an overlay manner in operation 815.

Figure 9B:
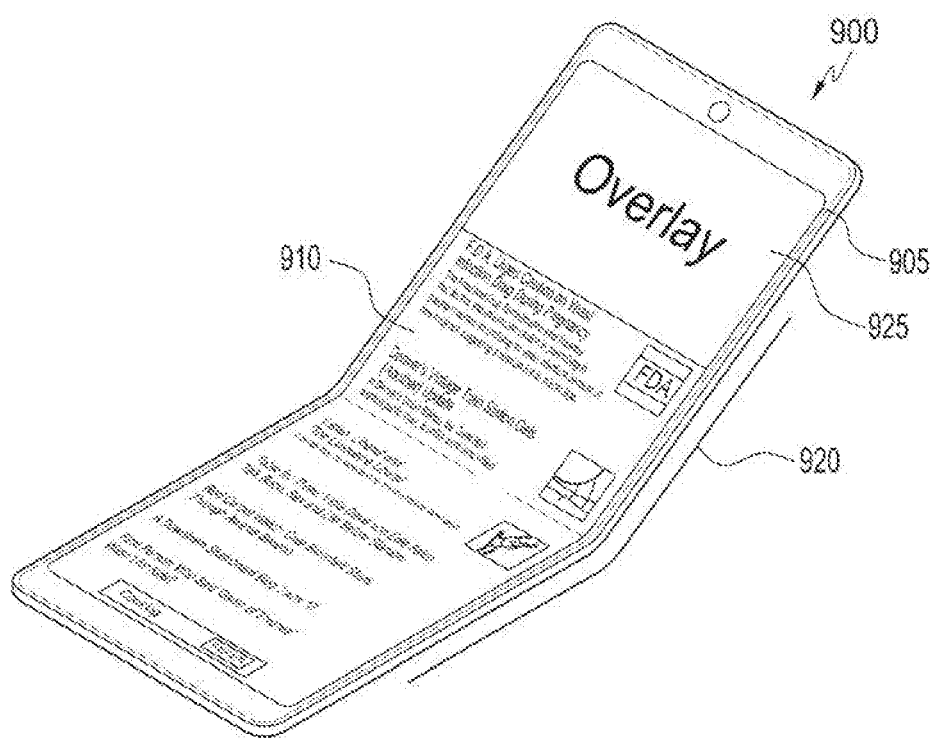

FIG. 9B illustrates an example of an electronic device 900 in the first folding state corresponding to the first angle range. After detecting a folding event that occurs as the user bends the hinge and before the folded angle 920 of the electronic device 900 reaches, e.g., about 160 degrees, a context recognition-related window 925 may be displayed on the display 905. At this time, corresponding to an unfolding input of unfolding the electronic device 900, the electronic device 900 may stop displaying the window 925 in the overlay type and recover a previous screen (e.g., the unfolded screen (or the whole screen) 910). For example, where the user slightly bends the electronic device 900 that is in an unfolding state, an overlay window may be displayed as shown in FIG. 9B, and when the electronic device 900 is back to the unfolding state, the overlay-type window may be stopped from being displayed. Subsequently, the electronic device may determine whether the folded angle exceeds the first threshold angle and reaches a second threshold angle in operation 820. For example, the electronic device may determine whether it is in a second folding state that corresponds to a second angle range.

Figure 9C:
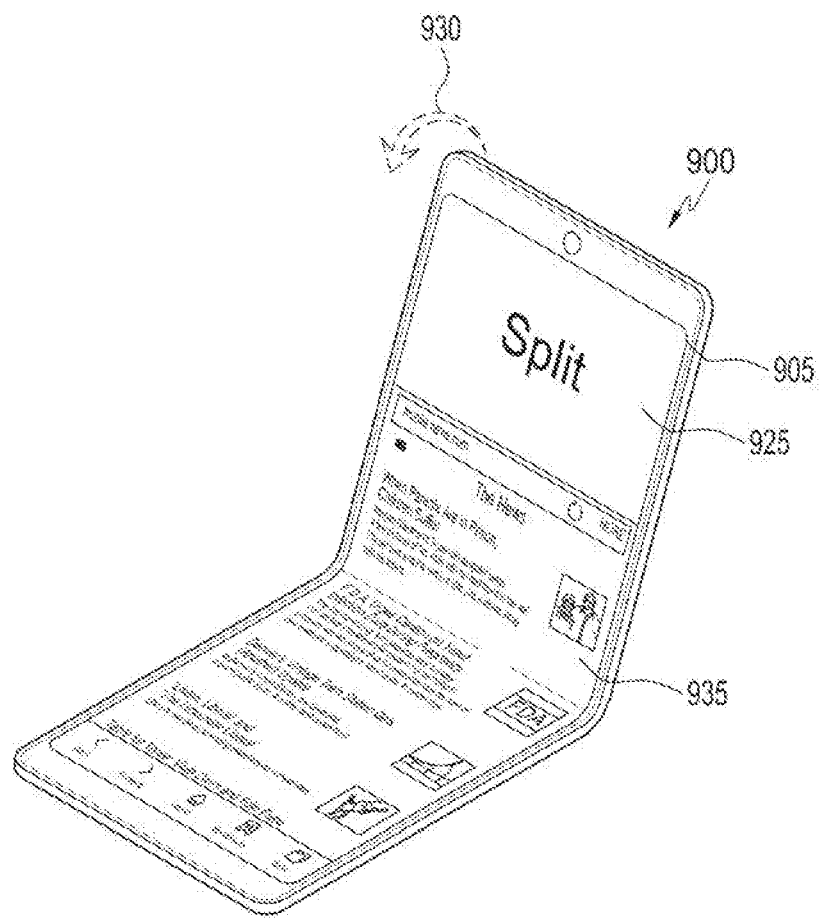

Upon determining that the folded angle exceeds the first threshold angle but does not reach yet the second threshold angle, the electronic device may display a context recognition-related window in a split type as shown in FIG. 9C in operation 825. When the user bends the electronic device 900 in the forward direction 930 at a larger angle than the folded angle of FIG. 9B, the electronic device 900 may be in a second folding state that corresponds to a second angle range. In such case, the first window 935 and the second window 925 may be split and displayed in a split type as shown in FIG. 9C. In this case, the size of the first window 910 of FIG. 9B corresponds to the size of the whole screen. The second window 925 is shown to overlap the first window 910. In the split mode, however, the size of the first window 935 is reduced as compared with the size of the first window 910 as shown in FIG. 9C. Thus, a second window 925 may be displayed that shares a common boundary with the first window 935.

Figure 9D:
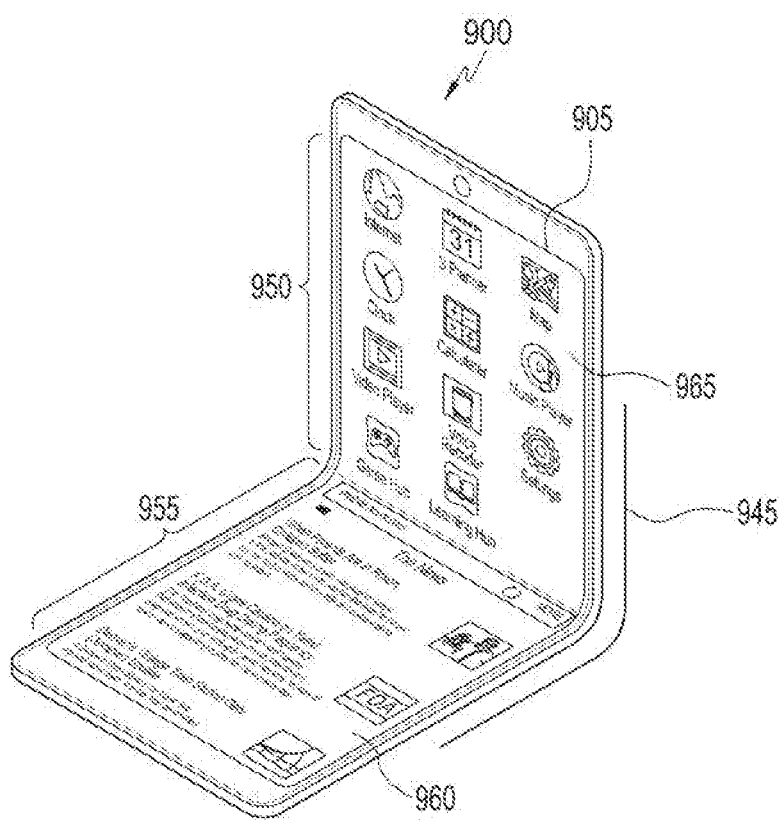

Although an example has been described above in which a state where an overlay-type window is displayed is switched to the split mode where split screens are displayed by further bending the electronic device 900, such switch to the split mode may also be made when the user makes a touch input of, at least partially, traversing in the first direction on an area other than the overlay-type window while the overlay-type window is being displayed. Then, the electronic device may determine whether the folded angle exceeds the second threshold angle and reaches, or not yet, a third threshold angle in operation 830. In a third folding state (e.g., the state 600d of FIG. 6A where the electronic device stands folded inward in half like a compact does) that corresponds to a third angle range exceeding the second threshold angle and before reaching the third threshold angle, the electronic device may split the display 905 into a first window 955 and a second window 950 and display the same as shown in FIG. 9D in operation 835. FIG. 9D illustrates an example in which the electronic device 900 is in a further folded state as compared with the electronic device 900 of FIG. 9C. For example, when the folded angle 945 reaches, e.g., about 110 degrees, the electronic device may display the first window 955 and the second window 950. In this case, the first window 955 may display an unfolded display screen, i.e., a screen shrunken in relation to a first application or a screen 960 related to the application executed latest, and the second window 950 may display an application tray 965 and a screen related to the application executed latest.

FIGS. 10A to 10D are views illustrating a screen configuration that changes as per angles of bending of an electronic device according to an embodiment of the present disclosure.

Figure 10A:
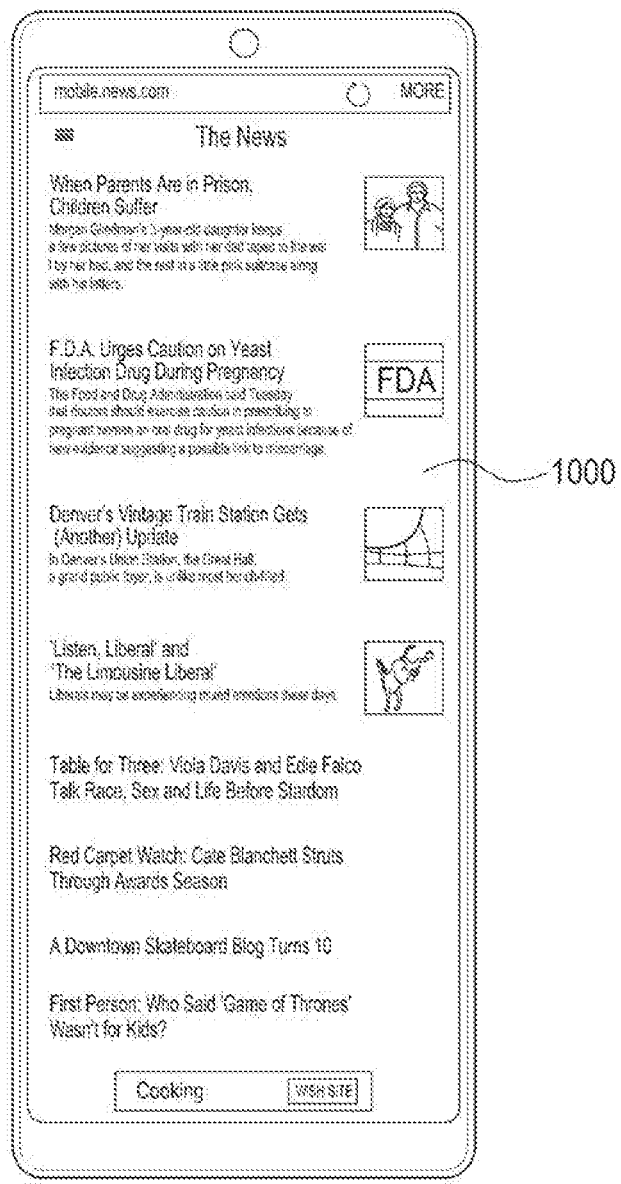
FIGS. 10A, 10B, 10C, and 10D are views illustrating a screen configuration that changes as per angles of bending of an electronic device according to an embodiment of the present disclosure.

Referring to FIG. 10A illustrates an example in which a screen 1000 (e.g., a web document/webpage) related to a first application (e.g., a web browser) is displayed on a whole screen of the display 460 while the electronic device is in an unfolding state.

Figure 10B:
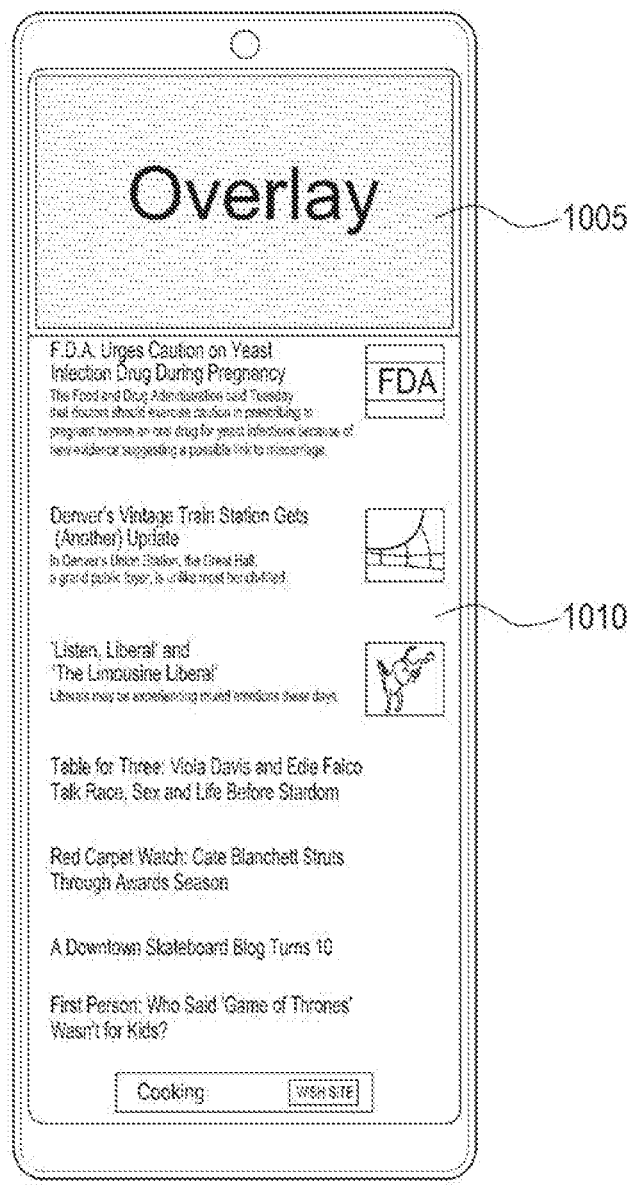

Referring to FIG. 10B illustrates an example in which the electronic device displays, in an overlay type, a window 1005 along with a screen (e.g., a web document/webpage) 1010 related to a first application (e.g., a web browser) in a first folding state that corresponds to the first angle range of FIG. 9B. The window 1005 displayed in the overlay type may include a selectable object. The type of a gadget may be varied depending on a left/right swipe in the window 1005, and the latest or previous screen may be displayed depending on an upper/lower swipe.

Figure 10C:
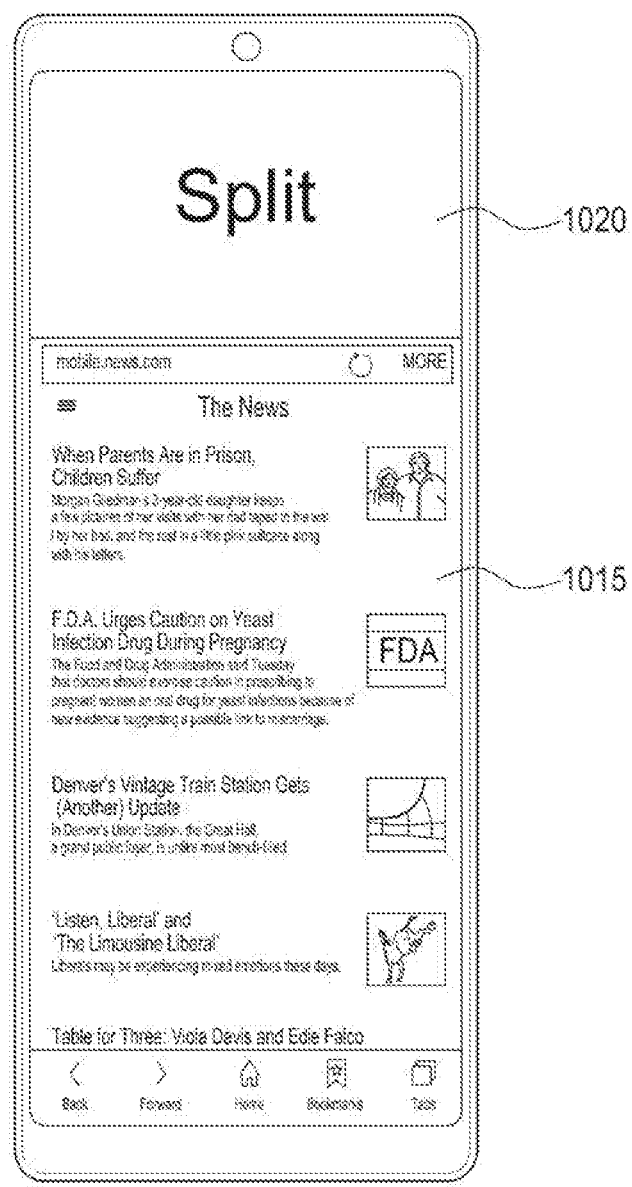

Referring to FIG. 10C illustrates an example in which the electronic device displays, in a split type, a window 1020 along with a screen (e.g., a web document/webpage) 1015 related to a first application (e.g., a web browser) in a second folding state that corresponds to the second angle range of FIG. 9C. The configuration and screen shift of the window 1020 displayed in the split type may be made in the same manner as those described above in connection with FIG. 10B.

Figure 10D:
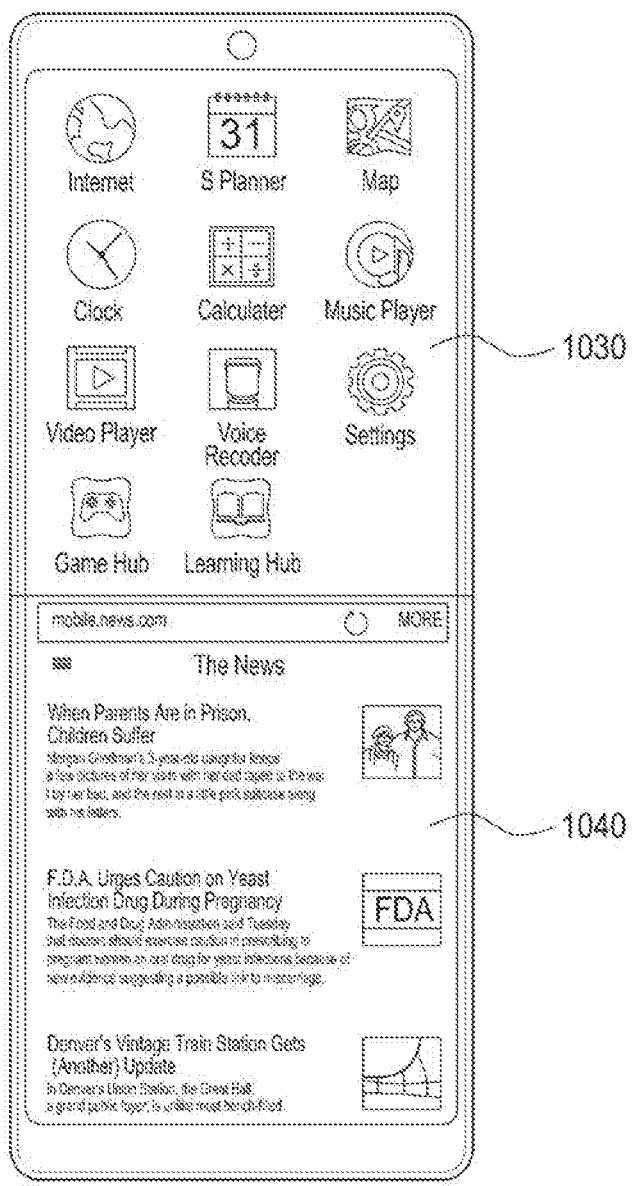

Referring to FIG. 10D illustrates an example in which a screen (e.g., a web document/webpage) 1040 related to a first application (e.g., a web browser) is displayed on the first window 1040 while the second window 1030 is displayed in a split type, with the electronic device remaining in a third folding state that corresponds to the third angle range of FIG. 9D. In this case, as the second window 1030 of FIG. 10D, not an expansion of the context recognition-related window of FIGS. 10B and 10C but a new window that displays, e.g., a screen related to the application executed latest or an application tray screen, may be displayed instead of the context recognition-related window of FIGS. 10B and 10C.

Figure 11A:
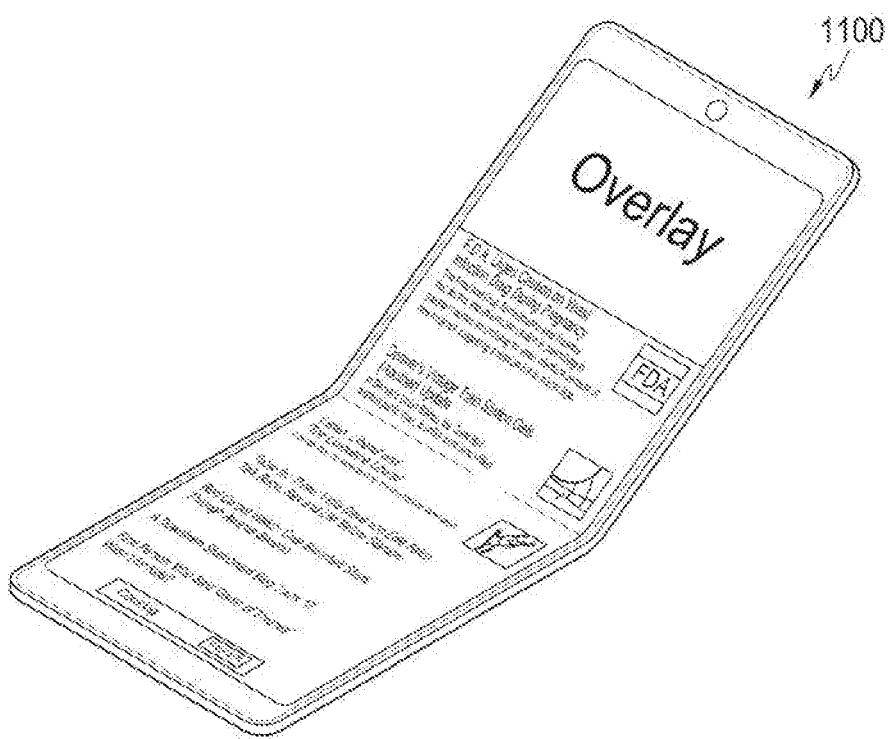
FIGS. 11A, 11B, 11C, and 11D are views illustrating a method for controlling a screen as per angles of bending of an electronic device according to an embodiment of the present disclosure.
Figure 11B:
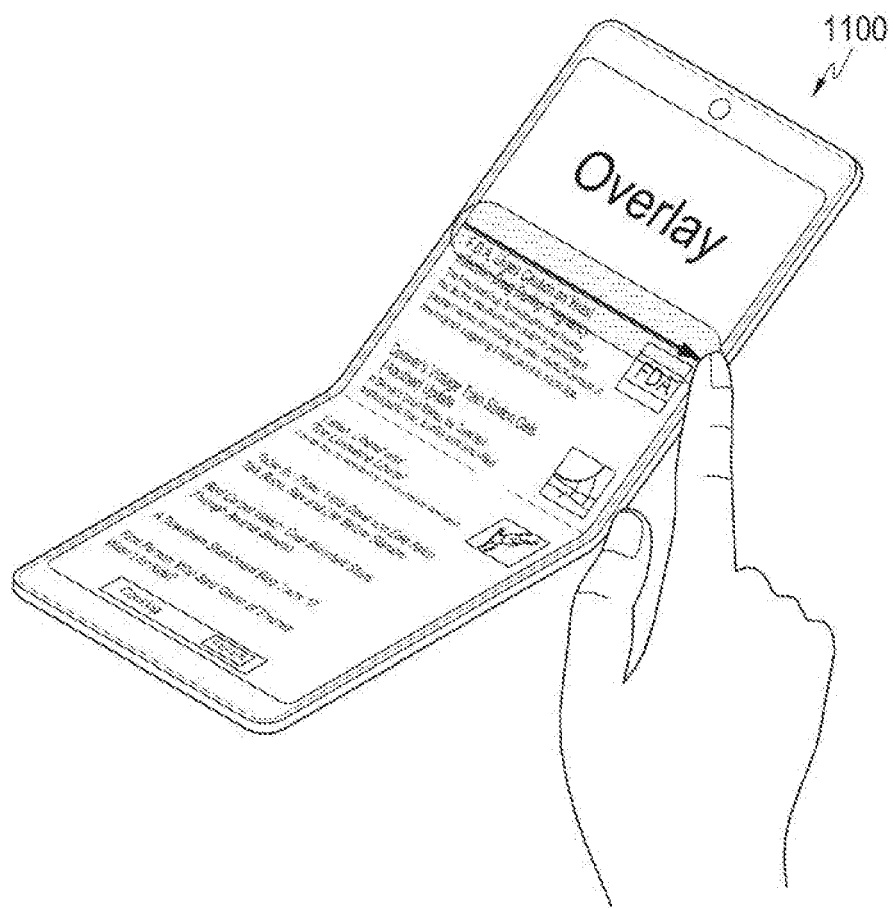
Figure 11C:
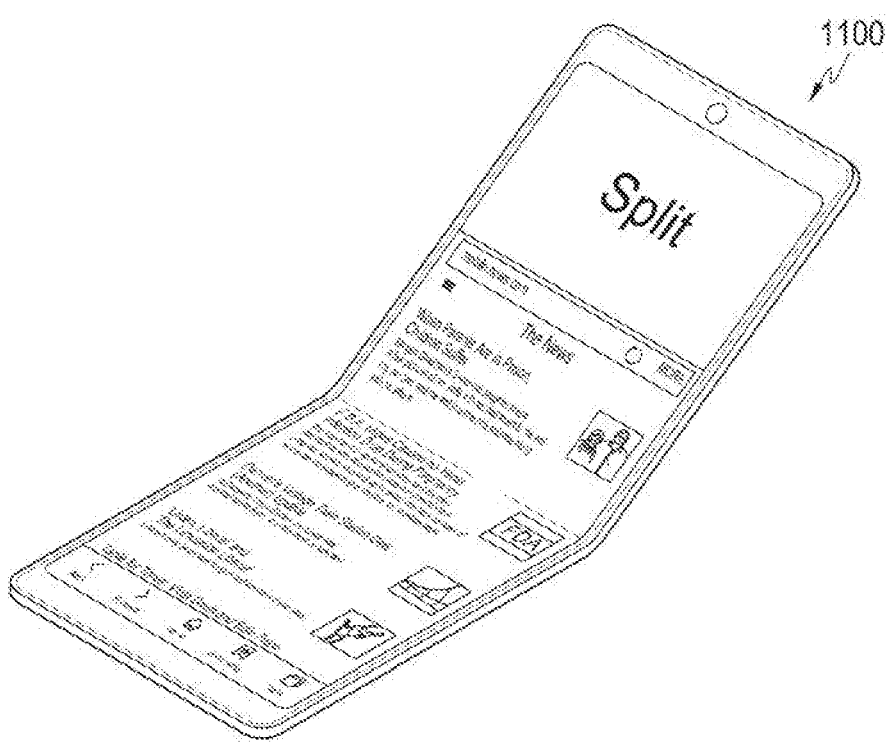
Figure 11D:
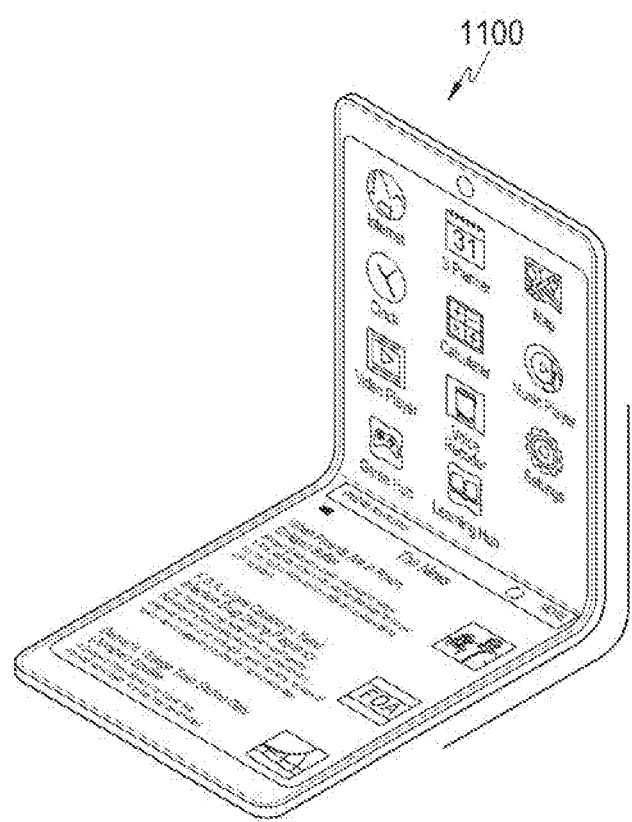

FIGS. 11A to 11D are views illustrating a method for controlling a screen as per angles of bending of an electronic device according to an embodiment of the present disclosure. When the user performs a touch input of at least partially traversing in the first direction on the display as shown in FIG. 11B while the electronic device 1100 is in the first folding state that corresponds to the first angle range as shown in FIG. 11A, the context recognition-related second window may be displayed in a split type while sharing a common boundary with the first window as shown in FIG. 11C. Subsequently, when the electronic device turns in the third folding state that corresponds to the third angle range as shown in FIG. 11D, split screens may be displayed as shown in FIG. 9D.

Figure 12:
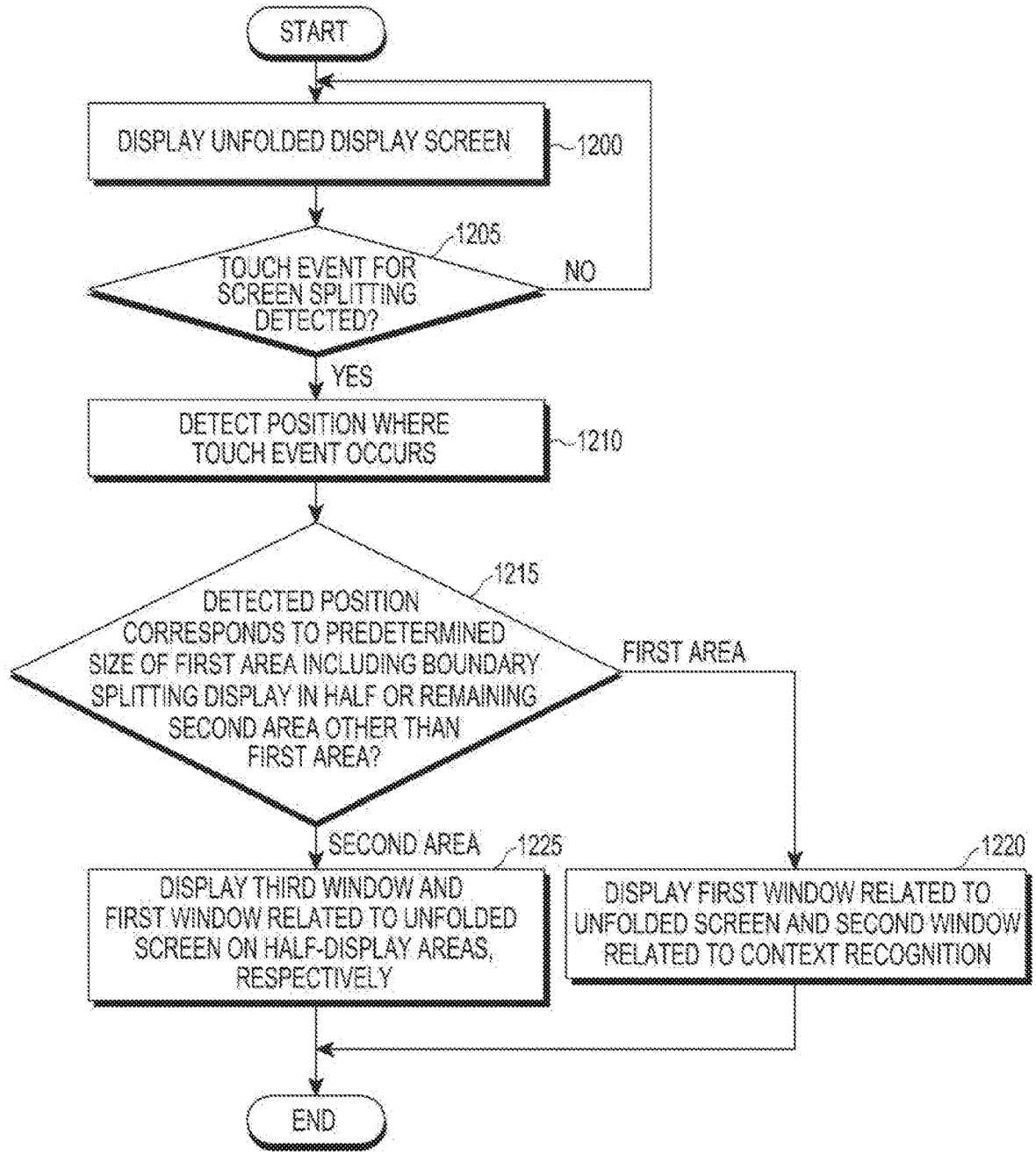
FIG. 12 is a flowchart illustrating a method for controlling a screen as per a touch input on a display of an electronic device according to an embodiment of the present disclosure.

FIG. 12 is a flowchart illustrating a method for controlling a screen as per a touch input on a display of an electronic device according to an embodiment of the present disclosure.

Upon detecting a touch event for screen splitting in operation 1205 while an unfolded display screen is being displayed in operation 1200, the electronic device may detect the position where the touch event occurs in operation 1210.

In operation 1215, the electronic device may determine whether the detected position is in a predetermined size of first area including a boundary splitting in half the display or a second area that is the remainder except for the predetermined size of area.

Where the detected position falls within the second area, the electronic device in operation 1220 may display a first window related to the unfolded screen and a second window related to context recognition.

Figure 13A:
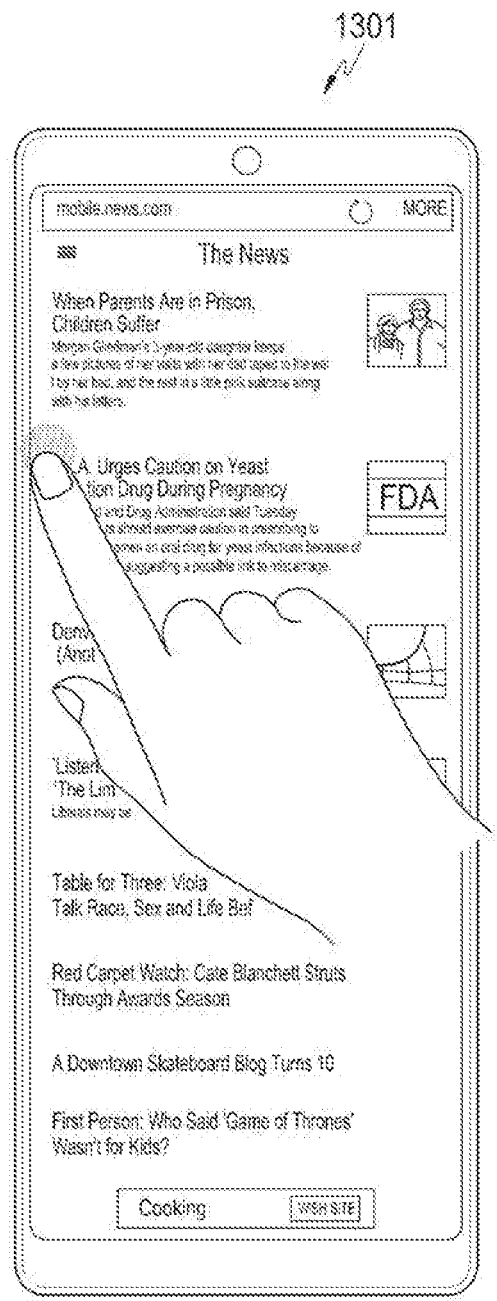
FIGS. 13A, 13B, and 13C are views illustrating an example of a first screen split as per a touch input point on a display according to an embodiment of the present disclosure.
Figure 13B:
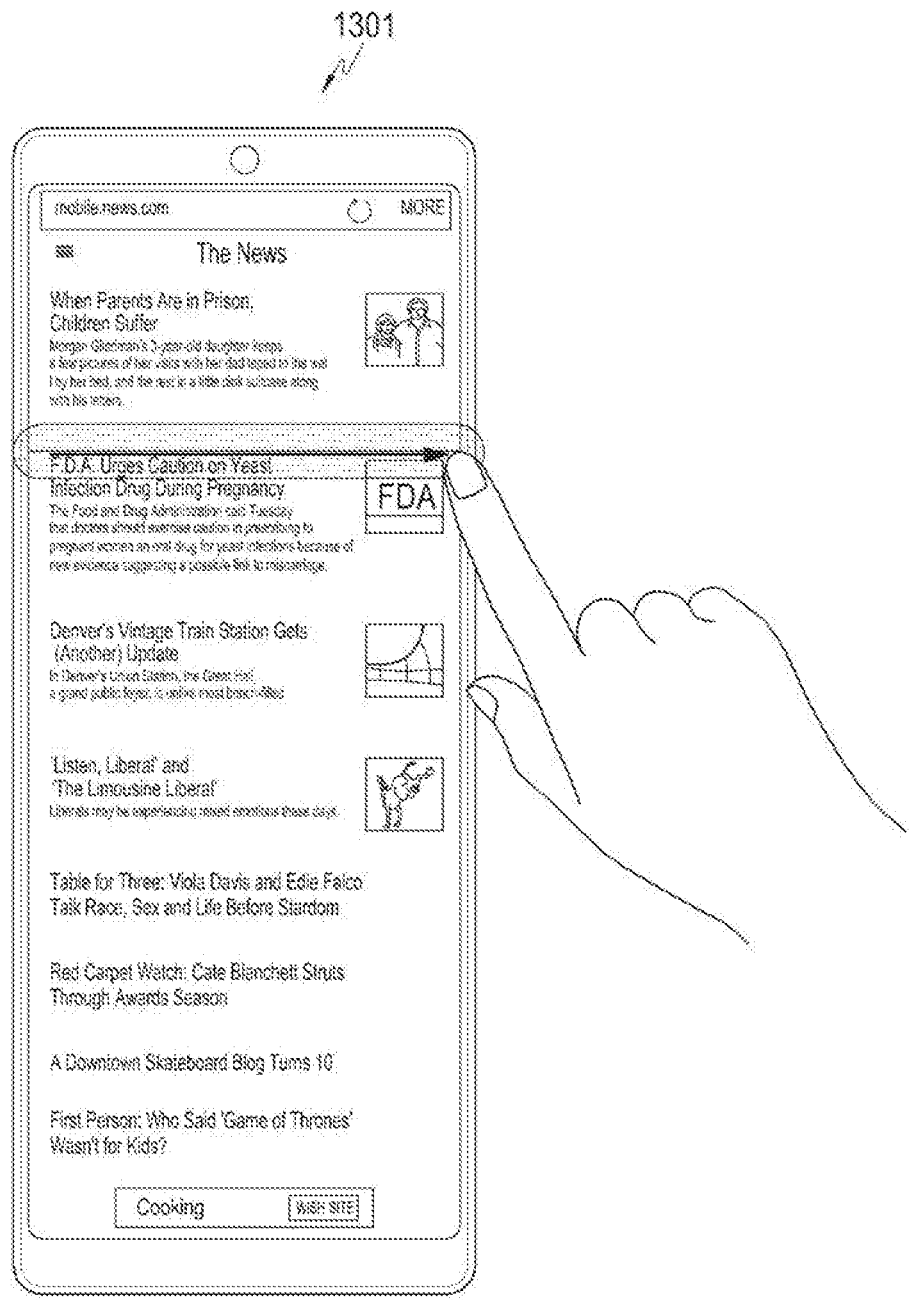
Figure 13C:
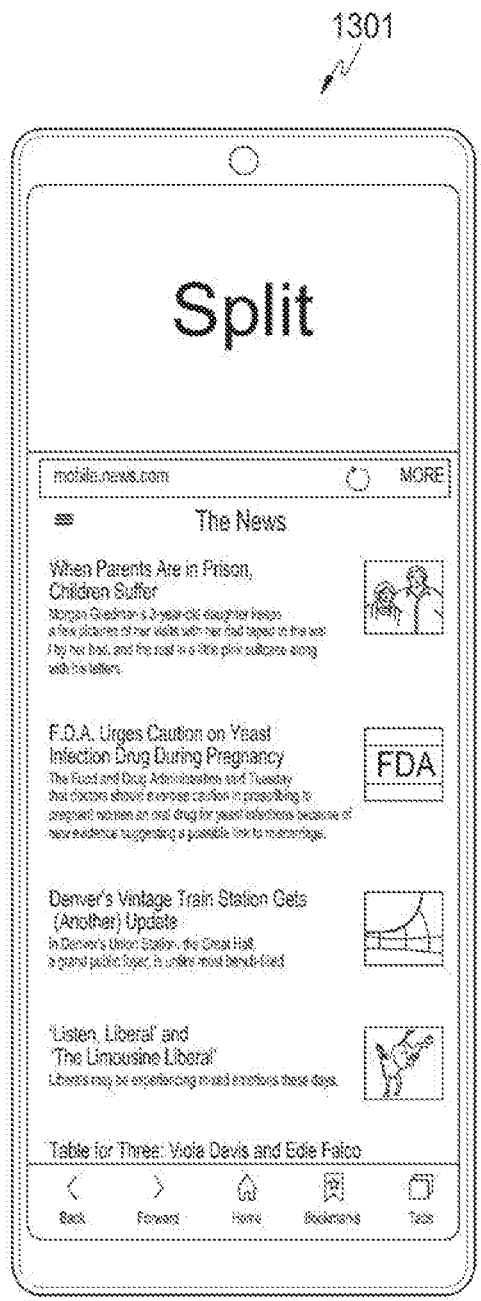

FIGS. 13A, 13B, and 13C are views illustrating an example of a first screen split as per a touch input point on a display according to an embodiment of the present disclosure.

By performing an input (or touch/hovering/swipe input) of at least partially traversing the display as shown in FIG. 13B according to a touch input that starts in the second area of the display, not the predetermined size of first area including the boundary splitting in half the display of the electronic device 1301 as shown in FIG. 13A and moves from a first end of the display in a width direction or its proximate position to a second end which is positioned opposite the first end or its proximate position, screens split in a split type may be displayed as shown in FIG. 13C. At this time, the upper window may display information related to context recognition.

Figure 14A:
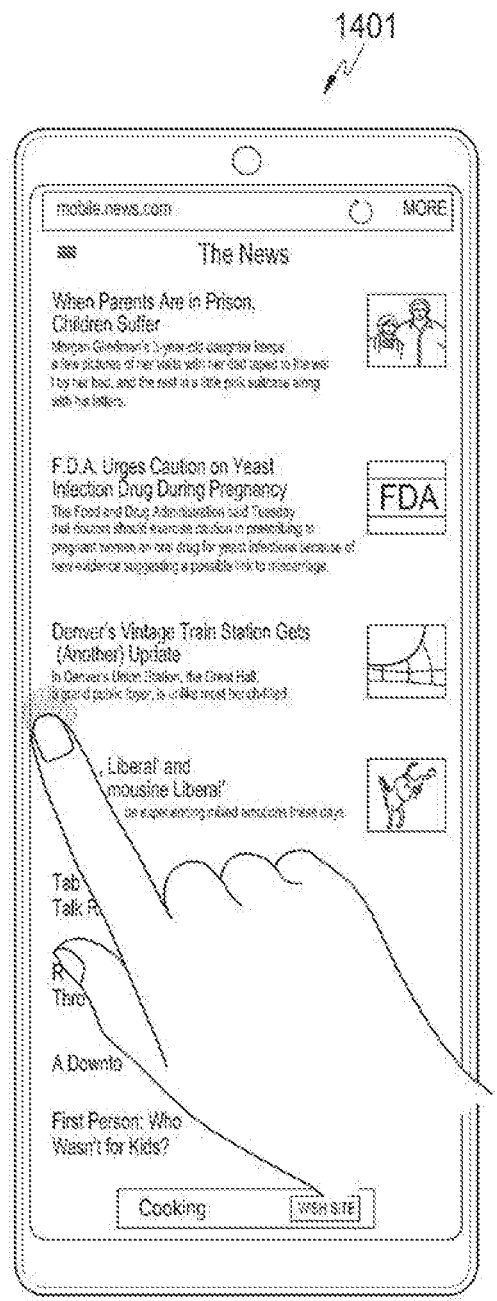
FIGS. 14A, 14B, and 14C are views illustrating an example of a second screen split as per a touch input point on a display according to an embodiment of the present disclosure.
Figure 14B:
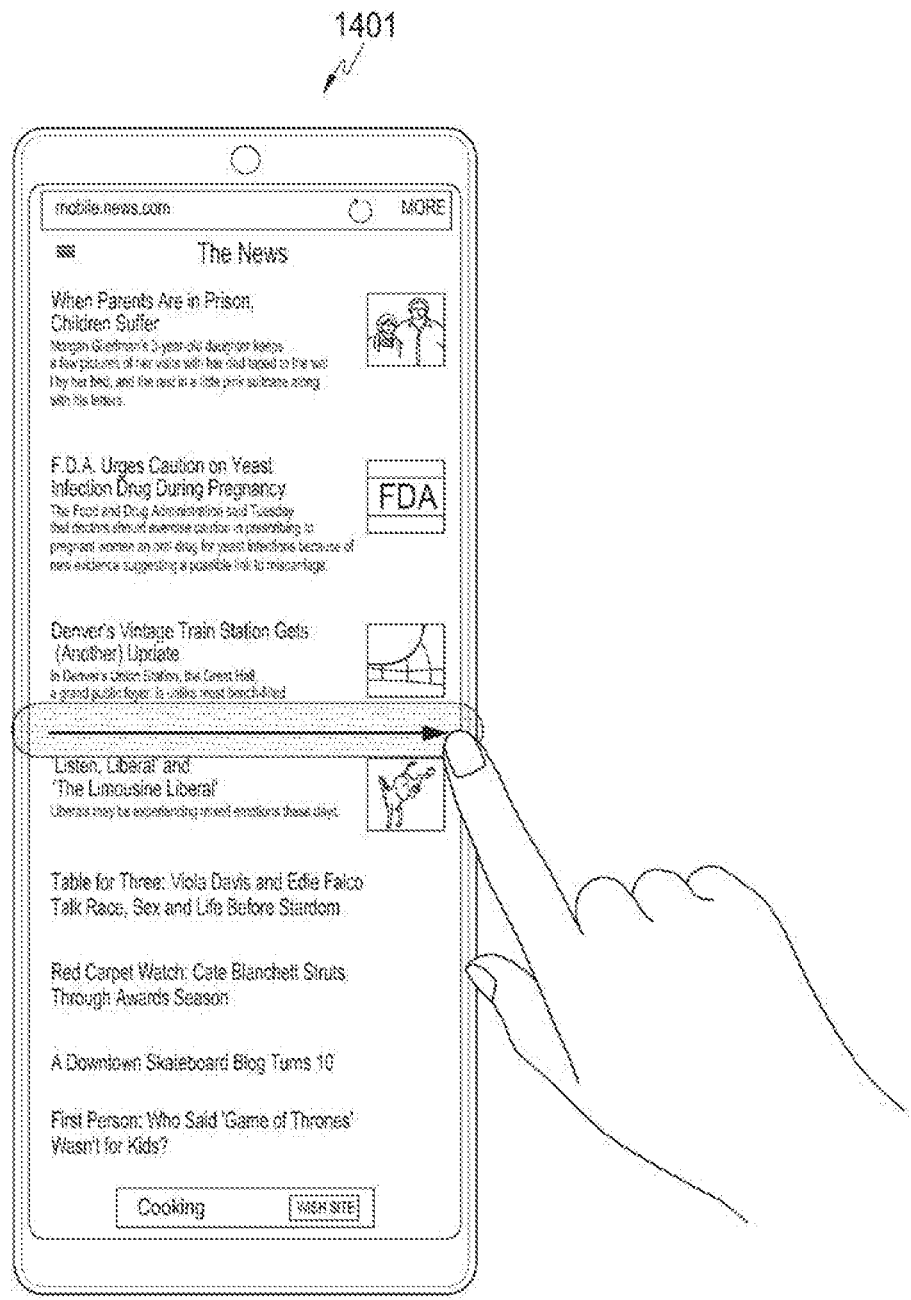
Figure 14C:
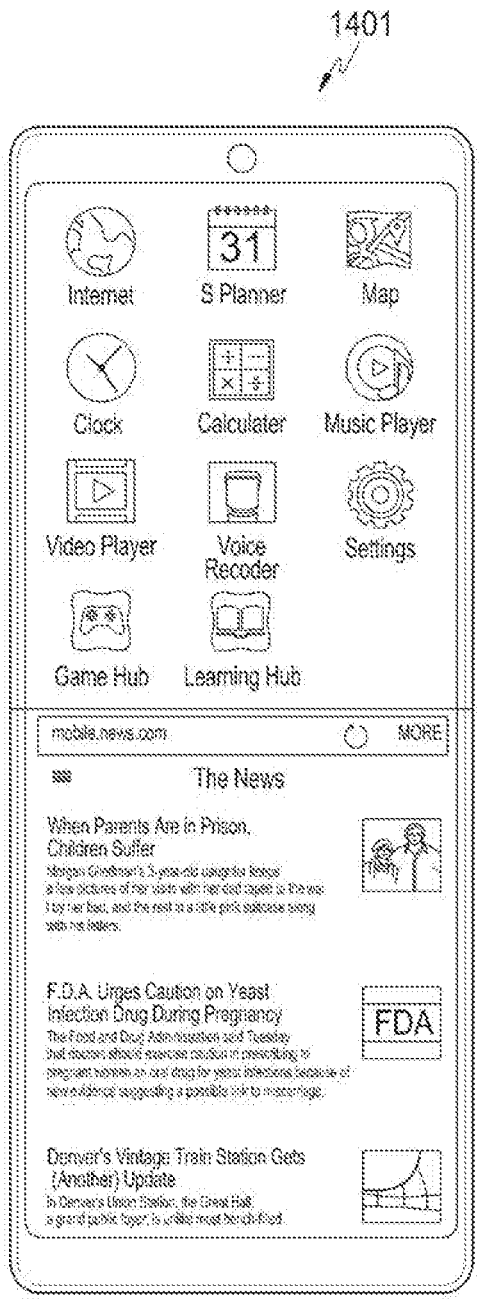

FIGS. 14A, 14B, and 14C are views illustrating an example of a second screen split as per a touch input point on a display according to an embodiment of the present disclosure.

In contrast, where the detected position falls within the first area, the electronic device in operation 1225 may display the context recognition-related first window and third window on the areas, respectively, which split in half the display. When a touch input starts in the predetermined size of first area including the boundary splitting in half the display of the electronic device 1401 as shown in FIG. 14A, and an input of at least partially traversing the display is made as shown in FIG. 14B, at least two windows split with respect to the folded portion of the display may be displayed as shown in FIG. 14C.

Figure 15:
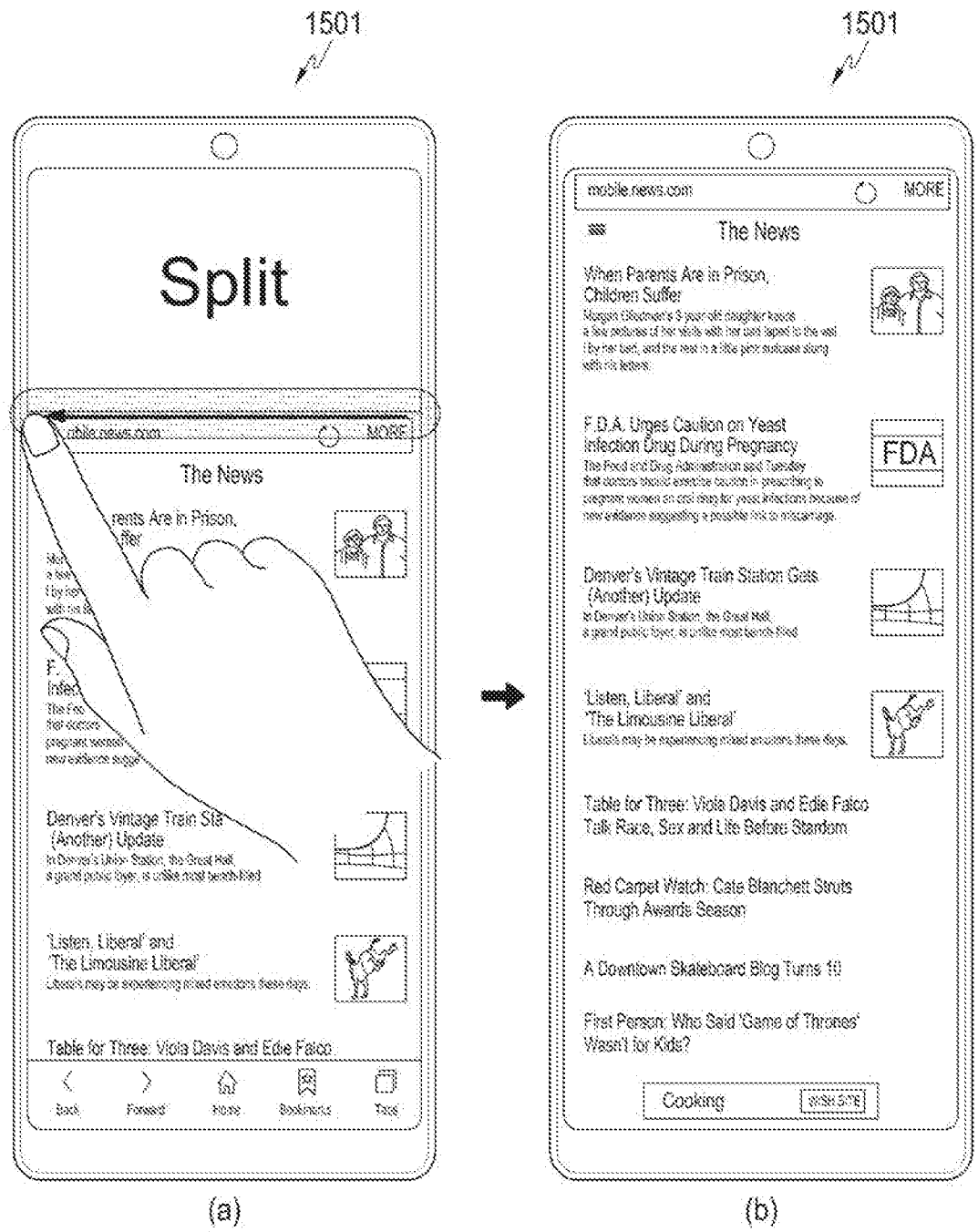
FIGS. 15 and 16 are views illustrating a method for returning to a previous screen on a display according to an embodiment of the present disclosure.
Figure 16:
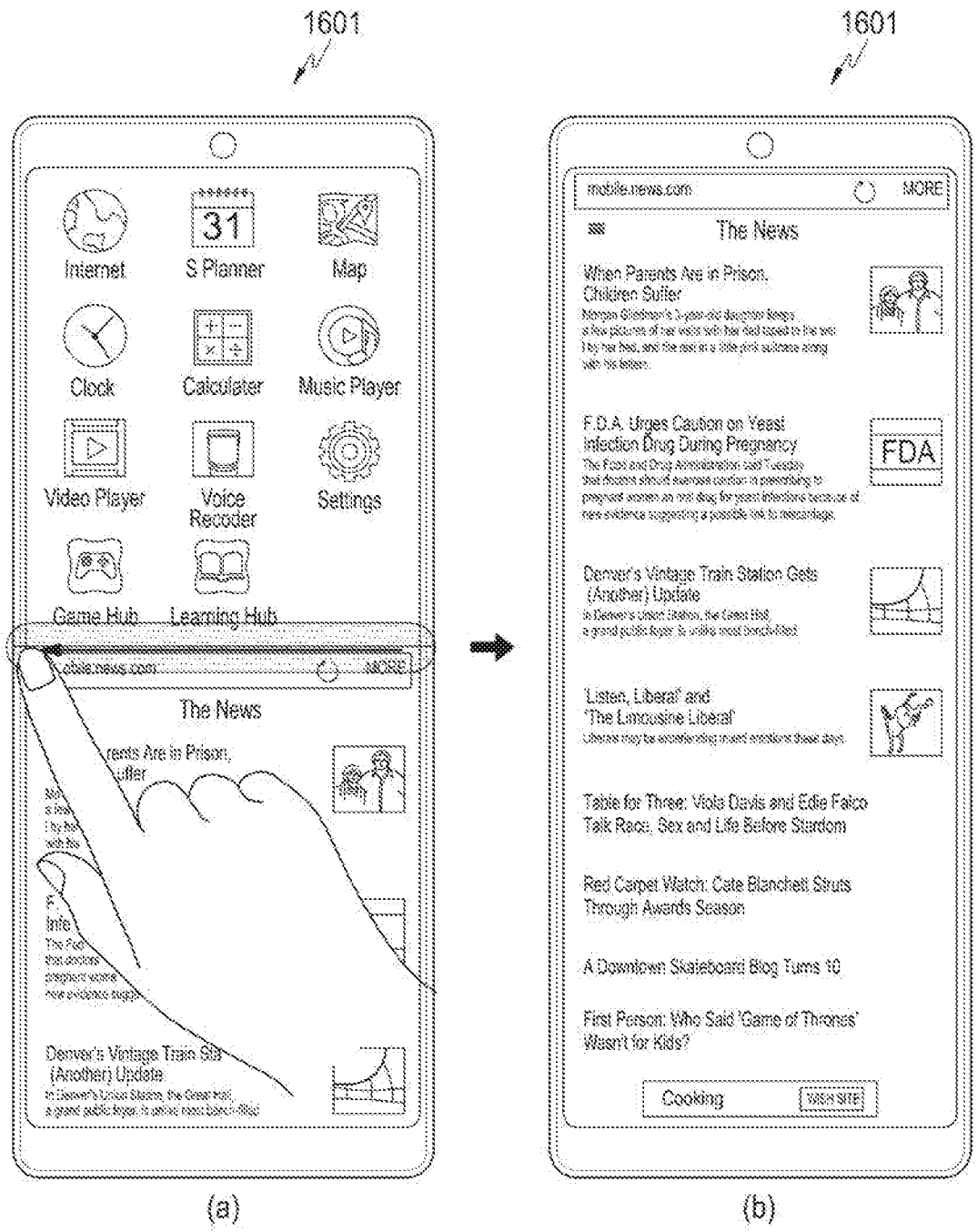

FIGS. 15 and 16 are views illustrating a method for returning to a previous screen on a display according to an embodiment of the present disclosure.

FIG. 15(*a*) shows the same screen 1501 as that shown in FIG. 13C and exemplifies a switchback to the whole screen of FIG. 15(*b*), corresponding to, e.g., an input (or touch/hovering/swipe input) of at least partially traversing in an opposite direction of the one direction on the display 460 or an input of moving from the second end positioned opposite the first end along the width direction of the display 460 to the first end or its proximate position. FIG. 16(*a*) also exemplifies a switchback to the whole screen 1601 of FIG. 16(*b*), corresponding to the user's gesture in an opposite direction, e.g., an input of moving from the second end positioned opposite the first end along the width direction of the display 460 to the first end or its proximate position. At this time, a screen related to an application that is in an active state may be recovered into the size of the whole screen.

A method for controlling a display by an electronic device is described below in detail. Corresponding to a user input, the electronic device may place a window in at least a portion of the display. Various user interfaces may be implemented on the window. For example, content as per the state (e.g., a running application or an environment) of the electronic device or the user's environment (e.g., location, weather, or time) may be displayed on the user interface (or an alpha screen) that is implemented on the window. Various examples of such user interface are described below in greater detail.

FIGS. 17A to 17H are views illustrating a user interface displayed on a window overlaid on a display according to an embodiment of the present disclosure. FIGS. 17A to 17H illustrate that a window is displayed on at least a portion of the display with the electronic device positioned folded. However, since the window is displayed corresponding to a folding interaction, it may be appreciated that the electronic device is in a state of being folded at a predetermined angle or more. In the state of the electronic device being unfolded, the window may be displayed on at least a portion of the display corresponding to a screen splitting event, and such event may be denoted an area.

First, the processor of the electronic device may display a graphic element (e.g., a shopping webpage) related to an application (e.g., a shopping application or shopping web browser) on a whole screen of the display.

Figure 17A:
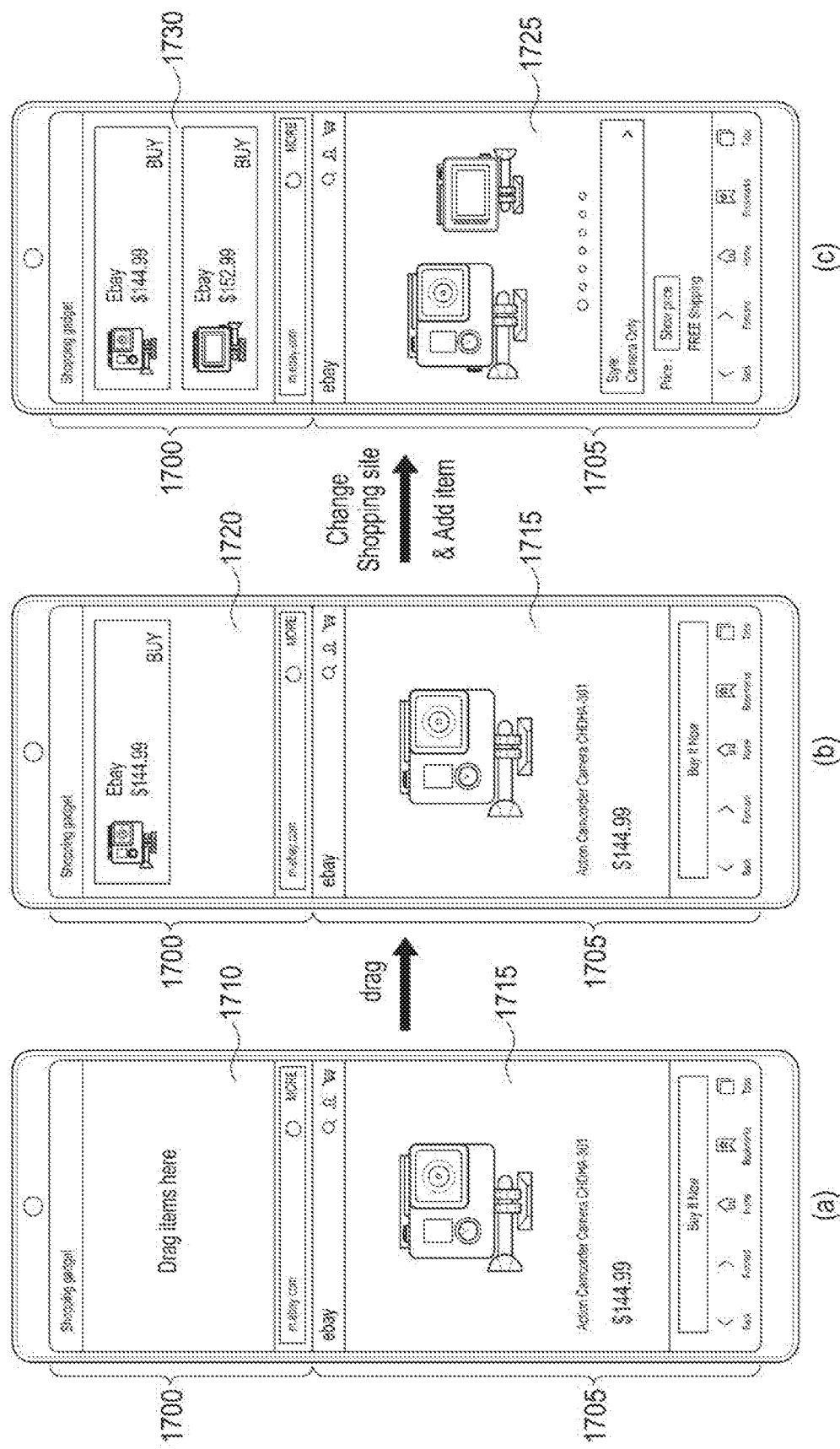
FIGS. 17A, 17B, 17C, 17D, 17E, 17F, 17G, and 17H are views illustrating a user interface displayed on a window overlaid on a display according to an embodiment of the present disclosure.

According to the user selection (e.g., the operation of bending the electronic device) or an automatic/default setting while the graphic element related to the first application is displayed on the whole screen, a first area 1705 and a second area 1700 may be set as shown in FIG. 17A(a). Here, the second area 1700 may be separated from the first area 1705 with respect to an arbitrary reference axis or may be displayed in an overlay type.

Referring to FIG. 17A(a), part of the graphic element 1715 (e.g., a shopping webpage) related to the application (e.g., a shopping application or shopping web browser) may be outputted on the first area 1705, and an empty space area (e.g., a shopping gadget) 1710 enabling the graphic element (e.g., a shopping webpage) to be dragged and dropped may be outputted on the second area 1700. When the user drags a certain object (e.g., a shopping item) on the first area 1705 to the second area 1700, the dragged object (e.g., a shopping item) may be moved to the second area 1700 as shown in FIG. 17A(b).

When the user changes the shopping website or adds shopping items, a shopping webpage 1725 corresponding to the changed shopping website may be displayed on the first area 1705, and the objects (e.g., shopping items) 1730 added by the user may be displayed on the second area 1700 as shown in FIG. 17A(c). As such, upon entry into the shopping website, a shopping gadget may be provided manually or automatically, and such shopping gadget may be utilized as a cabinet that allows for comparison on each item.

Figure 17B:
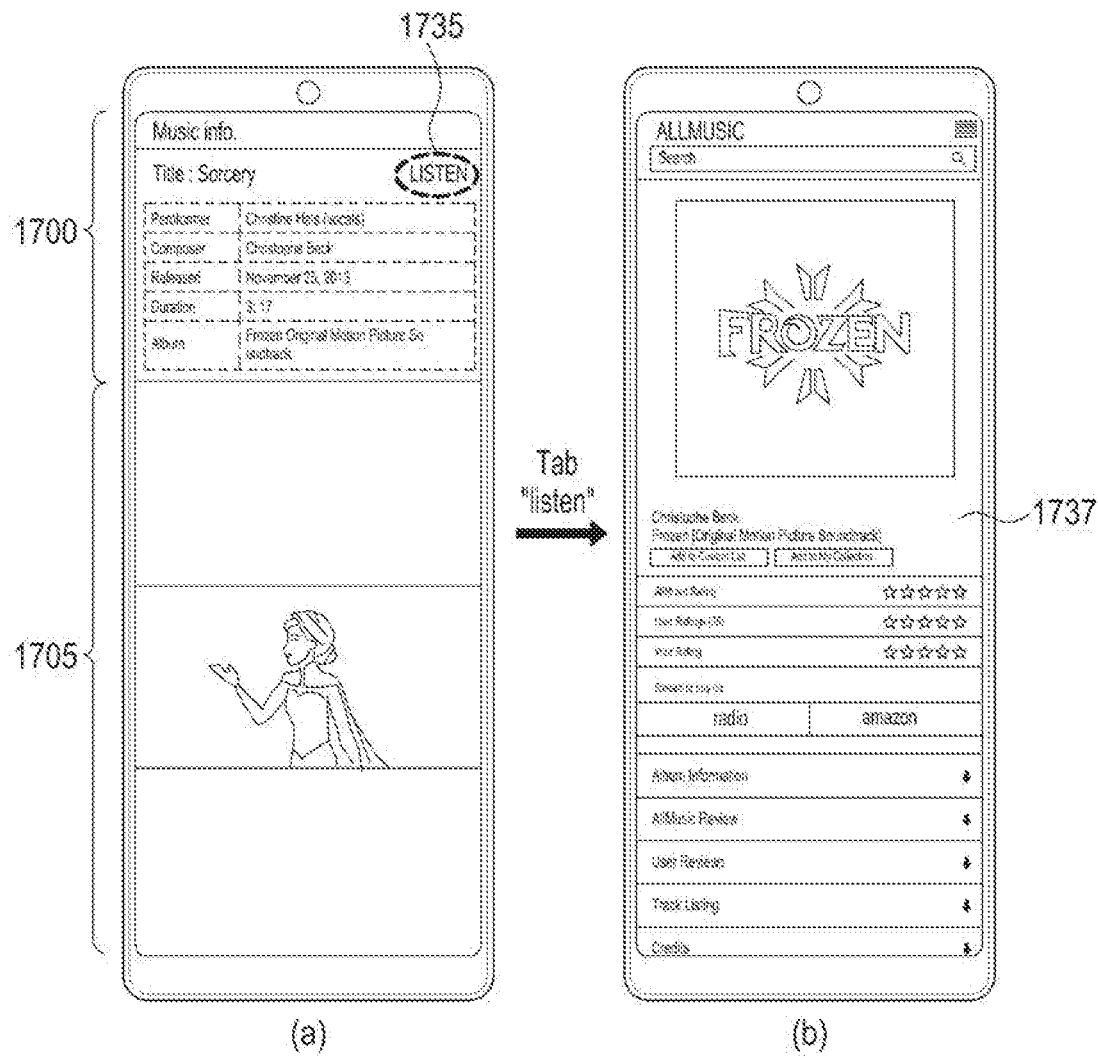

Referring to FIG. 17B, part of a graphic element (e.g., a music video, drama, or game) related to an application (e.g., a music application, video application, or video providing web browser) may be played on the first area 1705, and brief information about the playing graphic element (e.g., a music video, drama, or game) may be outputted on the second area 1700 as shown in FIG. 17B(a). When the user desires additional information, detailed analysis information 1737 about the graphic element (e.g., a music video, drama, or game) being currently played may be outputted corresponding to the selection of an item 1735 displayed on the second area 1700 as shown in FIG. 17B(b). For example, the alpha screen may be used for the purpose of analyzing and providing all the information about various reproducible multimedia contents, such as movie, drama, or game, as well as music played on the electronic device, such as YouTube™ or movie. Accordingly, the alpha screen may analyze and provide, in real-time, information about the music being currently played and allows for direct connection to the music website, offering a purchase and music listening service.

Figure 17C:
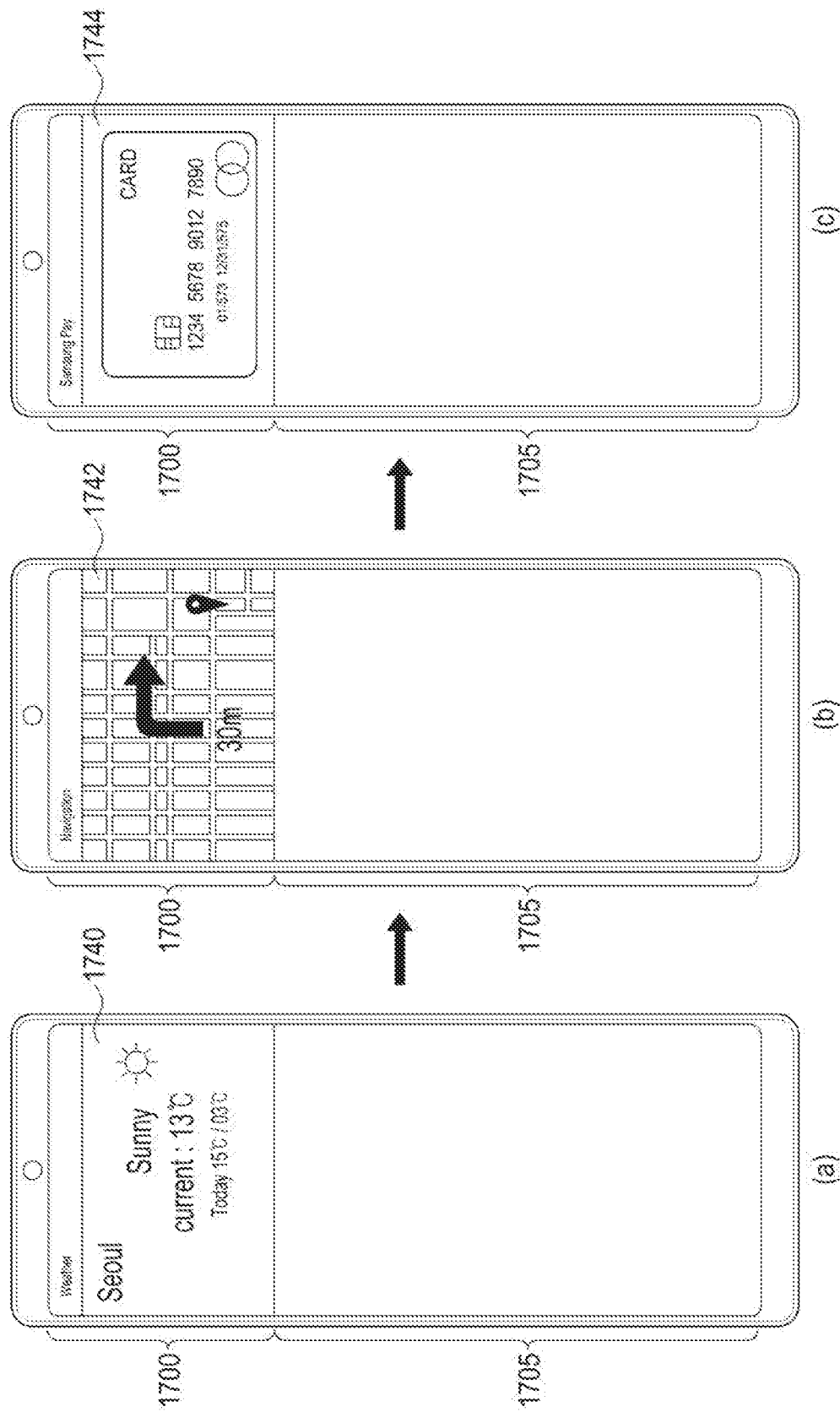

Referring to FIG. 17C, an alpha screen may automatically be provided on a location basis. For example, weather information 1740 in the current location may automatically be outputted based on the current location of the electronic device as shown in FIG. 17C(a). While on the move to a place designated by a scheduler application, navigation directing information 1742 may automatically be outputted as shown in FIG. 17C(b). Upon arriving at a reserved place, a pay gadget 1744 may be invoked in which case it may be used by fingerprint recognition shown in FIG. 17C(c).

Figure 17D:
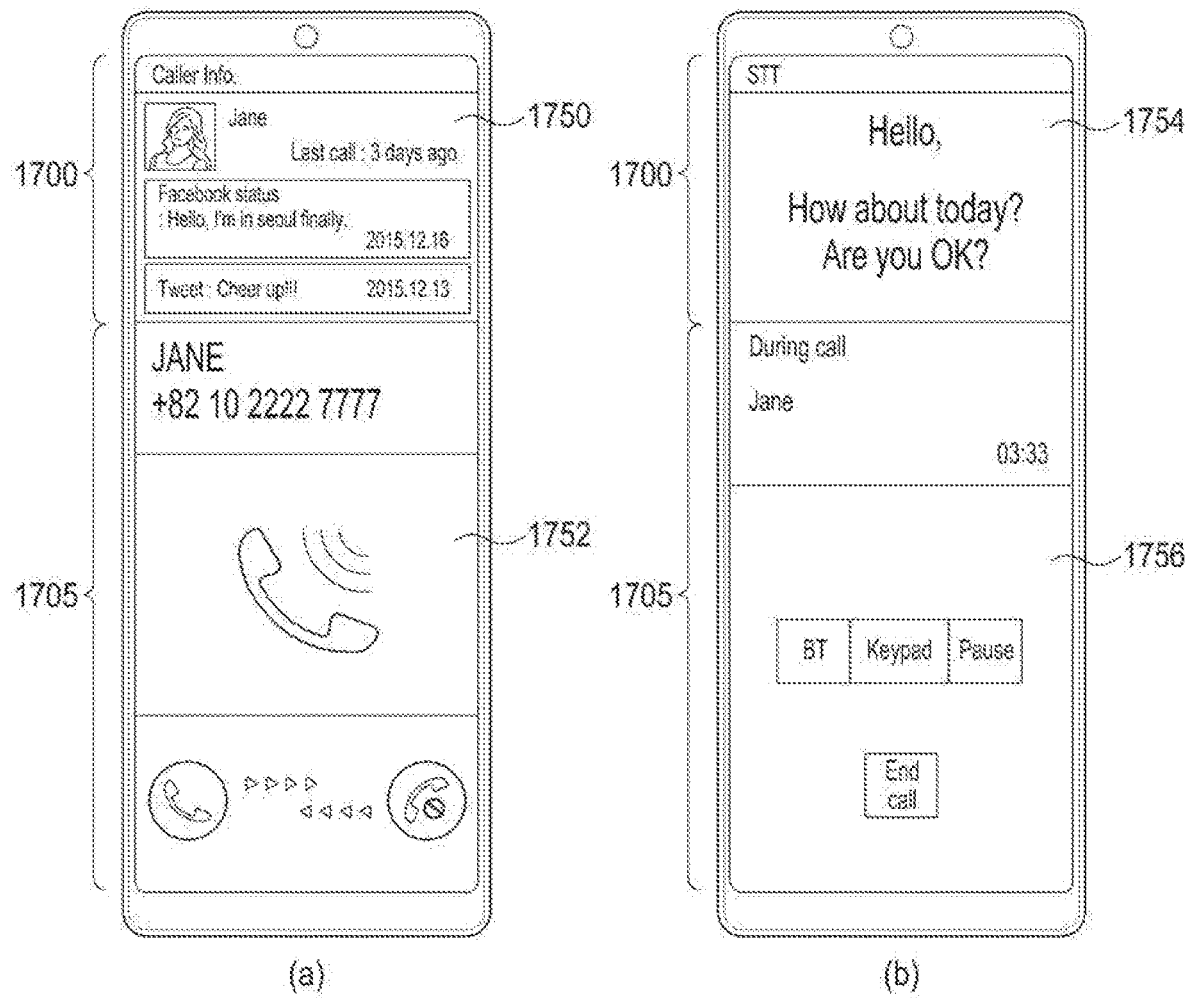

Referring to FIG. 17D, an alpha screen may be outputted when a call is received. For example, when a call is received, the first area 1705 may output a call reception screen 1752, and the second area 1700 may output information 1750 about the opposite party (e.g., the opposite party's picture, call history information, or information about a social network to which the opposite party has subscribed) related to the call reception as shown in FIG. 17D(a). Upon talking on the speaker phone, the first area 1705 may output call-related functions 1756, and the second area 1700 may display the conversation with the opposite party in text (or a translation made through a translation function) 1754 as shown in FIG. 17D(b).

Figure 17E:
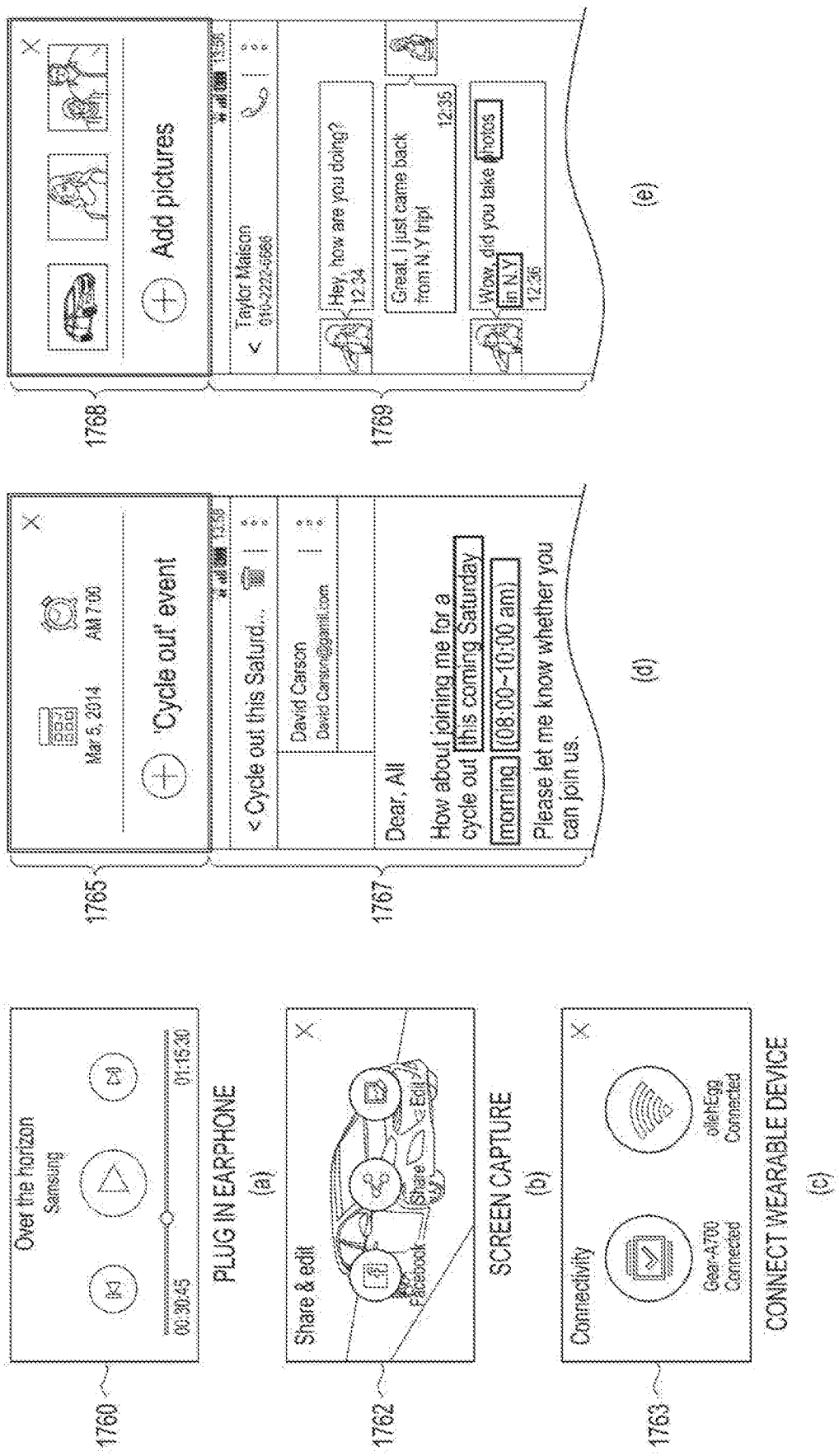

Other various alpha screens than those described above may also be provided as shown in FIG. 17E. Corresponding to an operation event (e.g., plugging in an earphone, screen capturing, or connecting a wearable device) on the electronic device as shown in FIG. 17E(c) to (e), graphic elements related to operation control may be displayed in the form of an alpha screen (e.g., plug in earphone 1760, screen capture 1762, or connect wearable device 1763). Items for recommending a subsequent task may be displayed on the second area 1765 and 1768 based on a result of analysis of the text outputted on the first area 1767 and 1769 as shown in FIG. 17E(d) and (e).

Figure 17F:
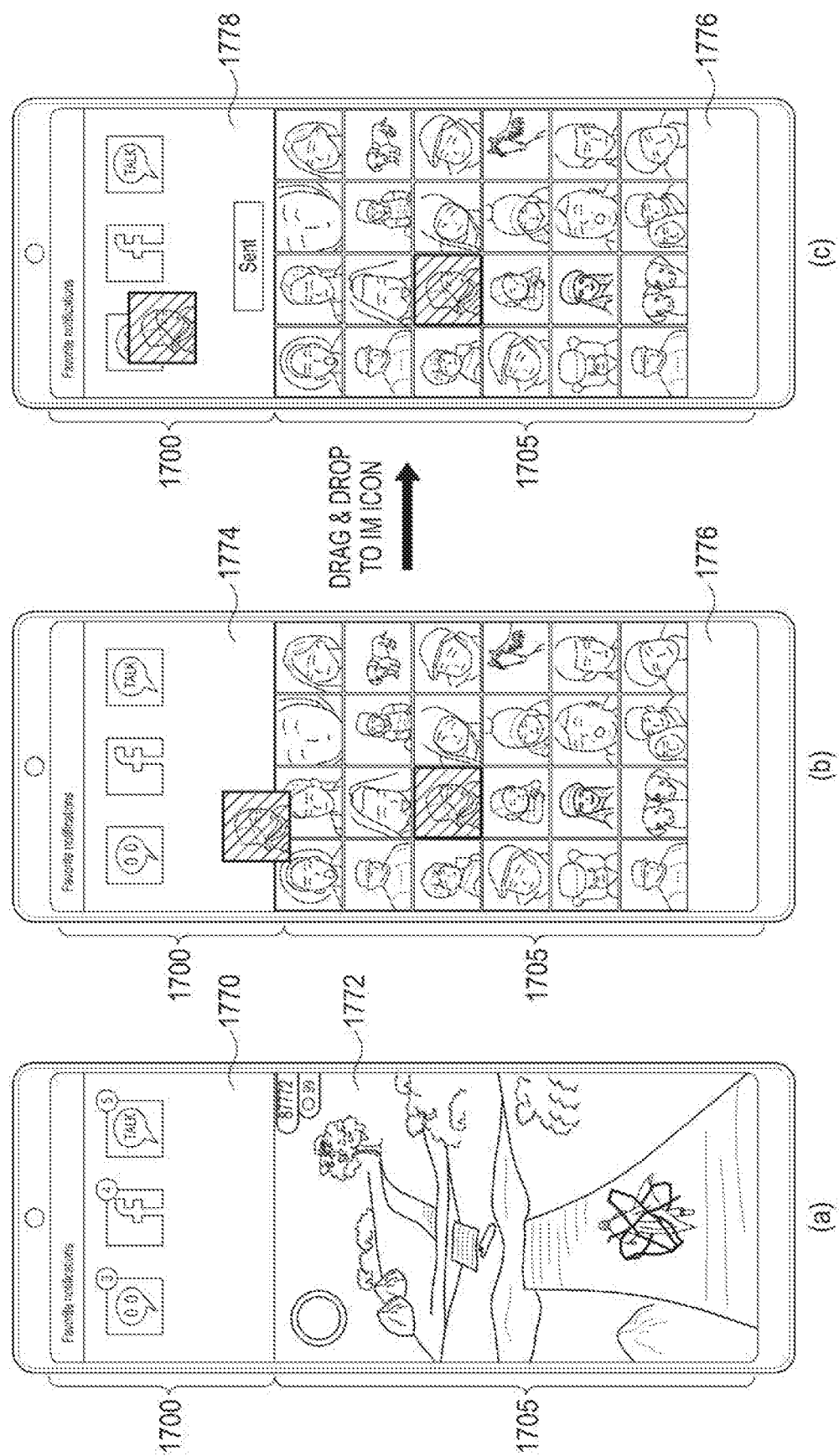

Referring to FIG. 17F, while a running application (e.g., view video or play game) 1772 is displayed on the first area 1705 as shown in FIG. 17F(a), notification information 1770, such as a text reception notification or social network service (SNS) notification, may be outputted on the second area 1700 without stopping the running application.

Referring to FIG. 17F(b), the electronic device may display a graphic element (e.g., videos) 1776 related to an application (e.g., a picture application or camera application) on the first area 1705 and may display, on the second area 1700, social network service applications 1774 that enable transmission of at least one object included in the graphic element 1776 through a social network service.

Referring to FIG. 17F(c), the electronic device may transmit the selected object through the social network service 1778 in response to an input (e.g., a drag-and-drop, long-process, or other transmission commands) related to at least one object included in the graphic element 1776 in the first area 1705. As such, the user may simply check and easily share the content of the social network service through the alpha screen.

Figure 17G:
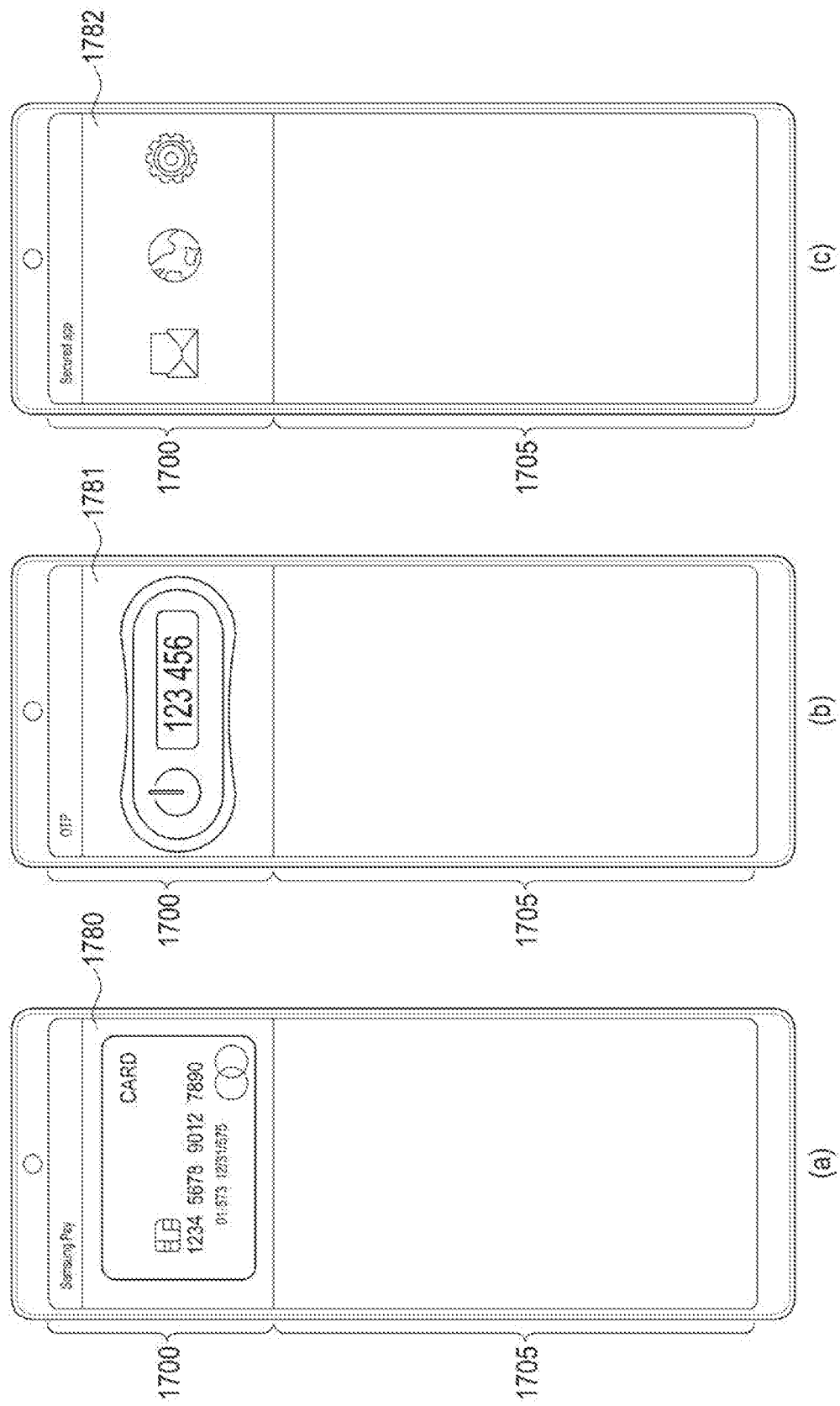

Referring to FIG. 17G, the electronic device may display a security-related graphic element (e.g., pay information 1780 or one time password (OTP) information 1781) on the second area 1700 as shown in FIG. 17G(a) and (b), corresponding to a folding interaction. Although security authentication or user authentication is required to be passed, the electronic device may display an executable application 1782 as shown in FIG. 17G(c).

Figure 17H:
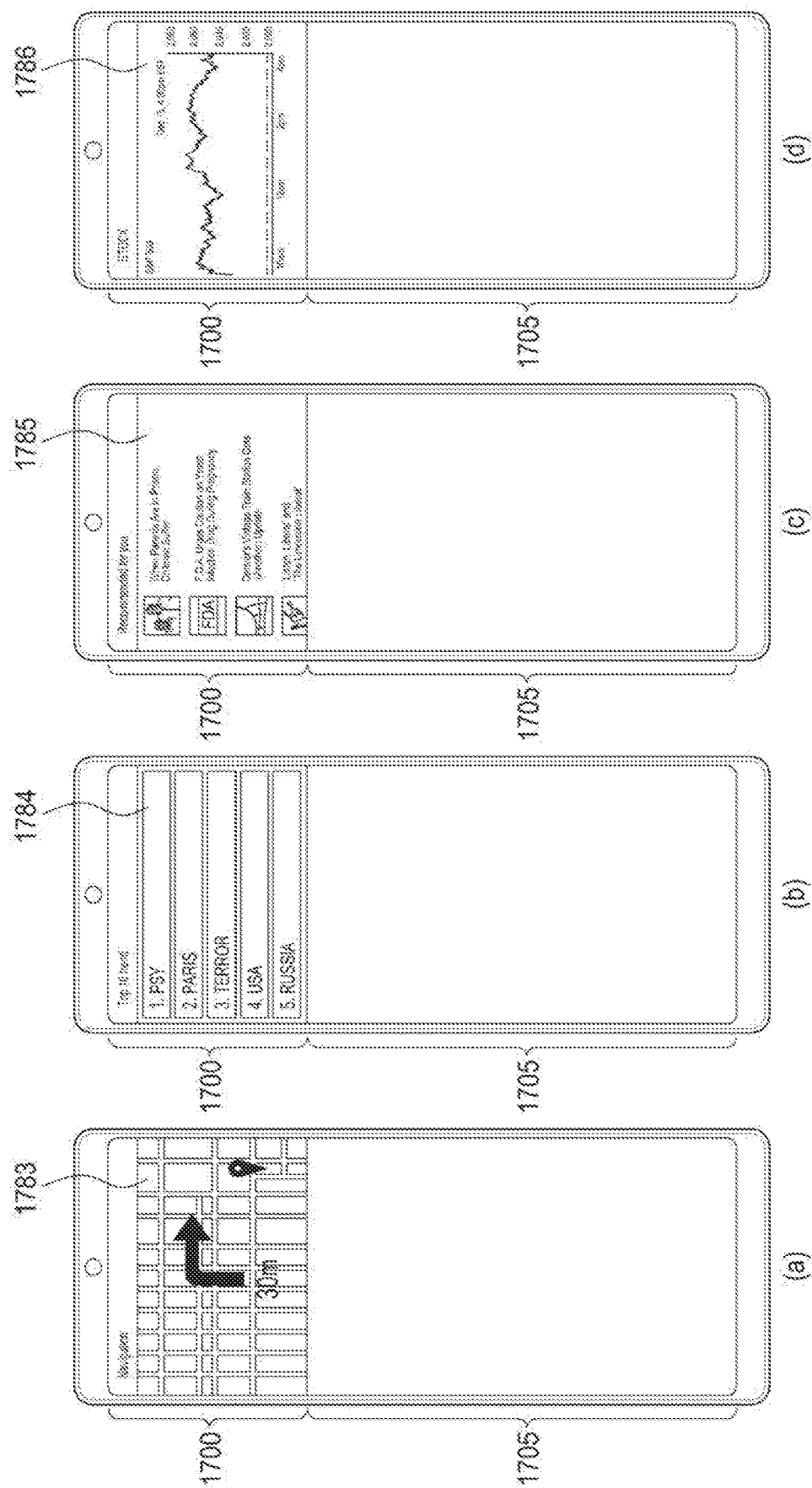

The electronic device may also display other various alpha screens (e.g., a screen 1783 for directing to a parkable space upon entering a parking site, a web search ranking, a real-time trend reflecting screen 1784, such as that of tweeter, a real-time news-of-interest screen 1785, or a stock market screen 1786) as shown in FIG. 17H(a) to (d).

Figure 18:
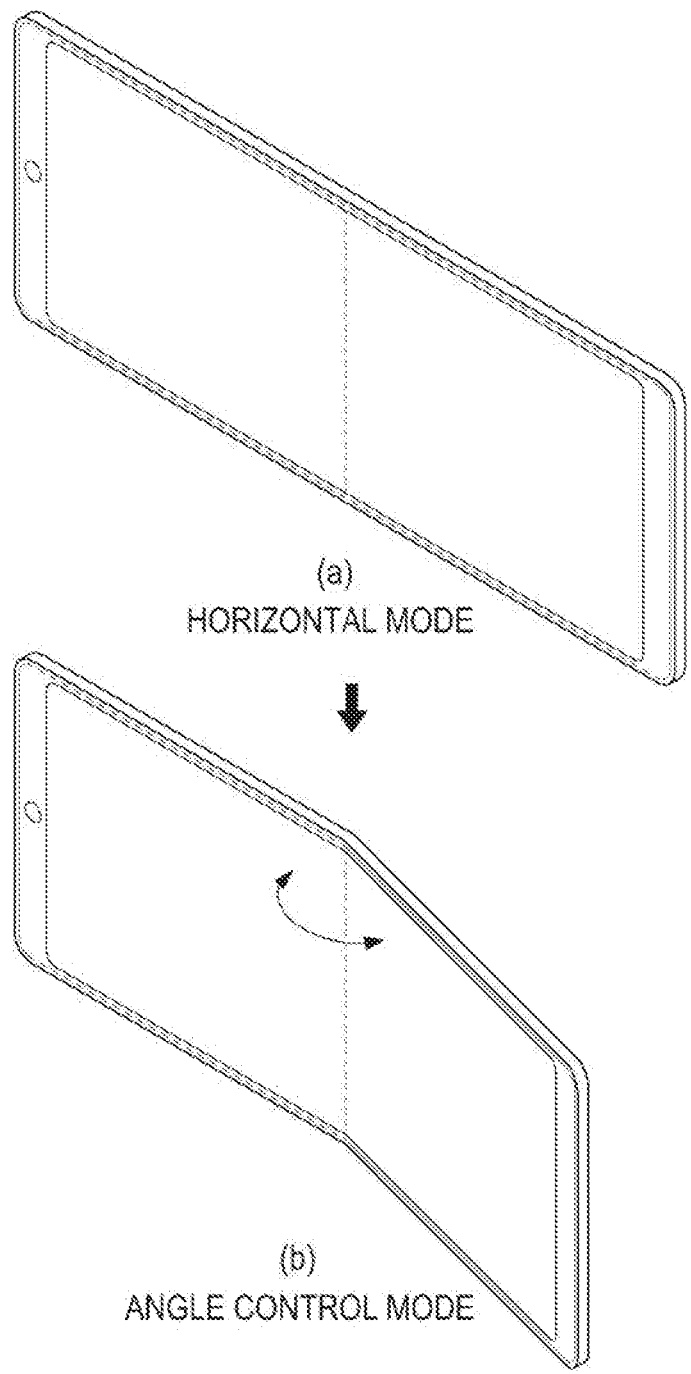
FIG. 18 is a view illustrating an electronic device folded in a horizontal mode according to an embodiment of the present disclosure.

FIG. 18 is a view illustrating an electronic device folded in a horizontal mode according to an embodiment of the present disclosure.

Referring to FIG. 18(*a*), one area of a flexible display separated by an axis passing through a center of an electronic device is denoted a first area, and another area of the flexible display separated by the axis is denoted a second area. In other words, the first area and the second area may mean two areas that are arranged in different orientations as the flexible display is bent as shown in FIG. 18(*b*). The electronic device may detect a variation in the angle between the first area and the second area and may detect a folding of one of the first area and the second area, i.e., a left/right folding of the display.

For example, the angle between the first area and the second area may be 180 degrees in the unfolding state of the electronic device as shown in FIG. 18(*a*). For example, the angle between the first area and the second area may be θ1 in FIG. 18(*b*). The electronic device may detect the angle between the first area and the second area depending on the degree of bending of a portion where the display is bent, i.e., an area including the axis. As such, where a folding interaction occurs in the horizontal mode, the electronic device may use the angle between the first area and the second area or the folding interaction as an input for controlling the operation of the electronic device.

Figure 19:
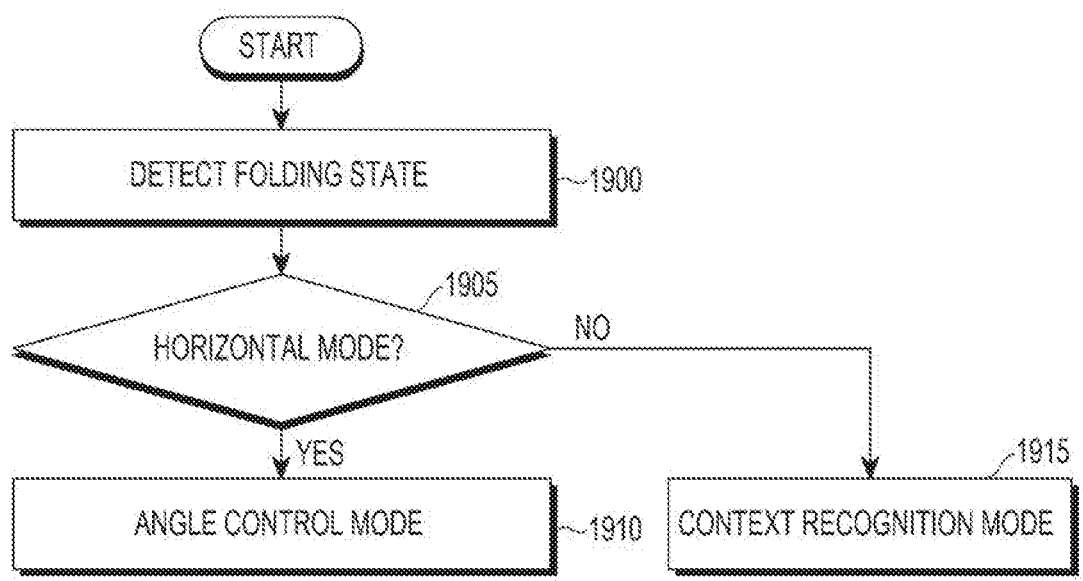
FIG. 19 is a flowchart illustrating a method for controlling a display of an electronic device in a horizontal mode according to an embodiment of the present disclosure.

FIG. 19 is a flowchart illustrating a method for controlling a display of an electronic device in a horizontal mode according to an embodiment of the present disclosure.

Referring to FIG. 19, the electronic device, upon detecting a folding state in operation 1900, may determine whether it is in the horizontal mode (or landscape mode) in operation 1905. When the electronic device is in the horizontal mode, the electronic device may make a switch in operation 1910 to an angle control mode for using the folding interaction detected in the horizontal mode as an input for controlling the operation of the electronic device. In contrast, unless the electronic device is in the horizontal mode, the electronic device may make a switch to a context recognition mode for displaying an alpha screen corresponding to the folding interaction in operation 1915. The electronic device may use at least one of the folding interaction in the horizontal mode and the angle between the first area and the second area as an input for controlling the operation. Here, since the flexible electronic device is formed so that a portion of the display is folded by an external force from the user, the folding interaction may include at least of where the first area and second area of the display are simultaneously folded to face each other and where one of the first area and second area of the display is fixed while the other area is folded.

As such, the electronic device in the horizontal mode may differentiate a left/right simultaneous folding of the display or a folding of one of the left and right side and run various functions of the electronic device based on a result of the differentiation. Embodiments of the various functions are described below with reference to FIGS. 20A to 22B.

Figure 20A:
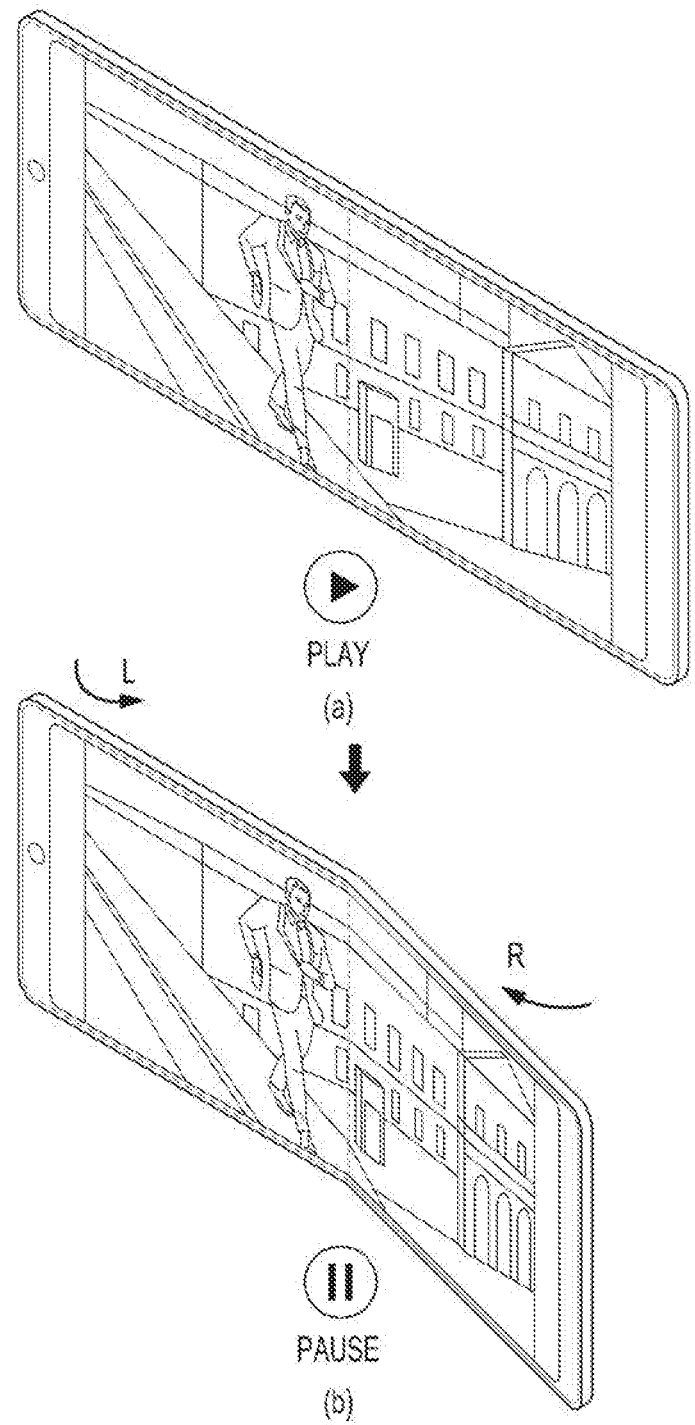
FIGS. 20A and 20B are views illustrating an example of a playback-related operation as per folding and unfolding according to an embodiment of the present disclosure.
Figure 20B:
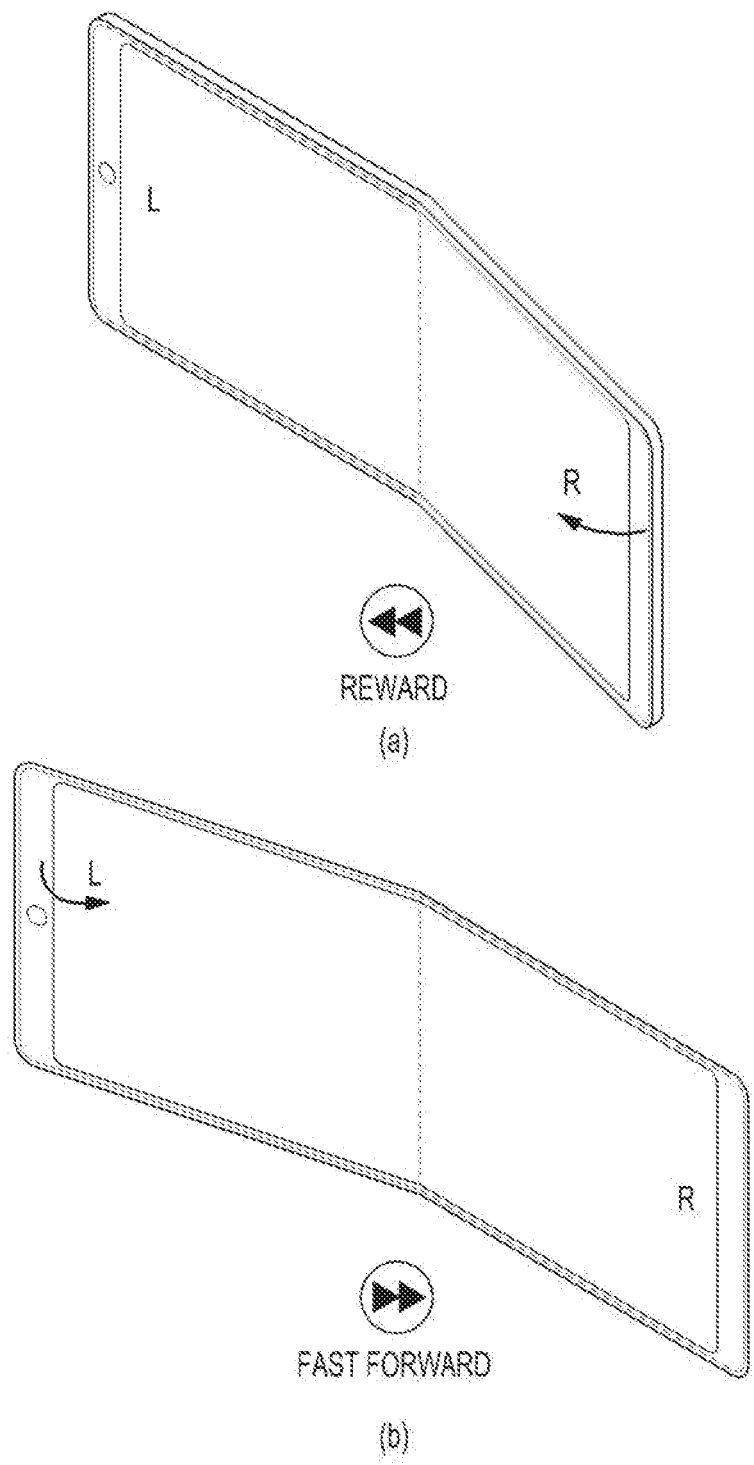

FIGS. 20A and 20B are views illustrating an example of a playback-related operation as per folding and unfolding according to an embodiment of the present disclosure.

While the electronic device plays a video on the unfolded screen in the horizontal mode as shown in FIG. 20A(a), the electronic device may perform a pause operation corresponding to a folding interaction by which a first and second area of the display are simultaneously folded to face each other as shown in FIG. 20A(b). While the electronic device plays a video on the unfolded screen in the horizontal mode as shown in FIG. 20A(a), the electronic device may perform a reward or fast forward operation corresponding to a folding interaction by which one of the first and second area of the display is fixed while the other area is folded as shown in FIG. 20B(a) and (b).

Figure 21A:
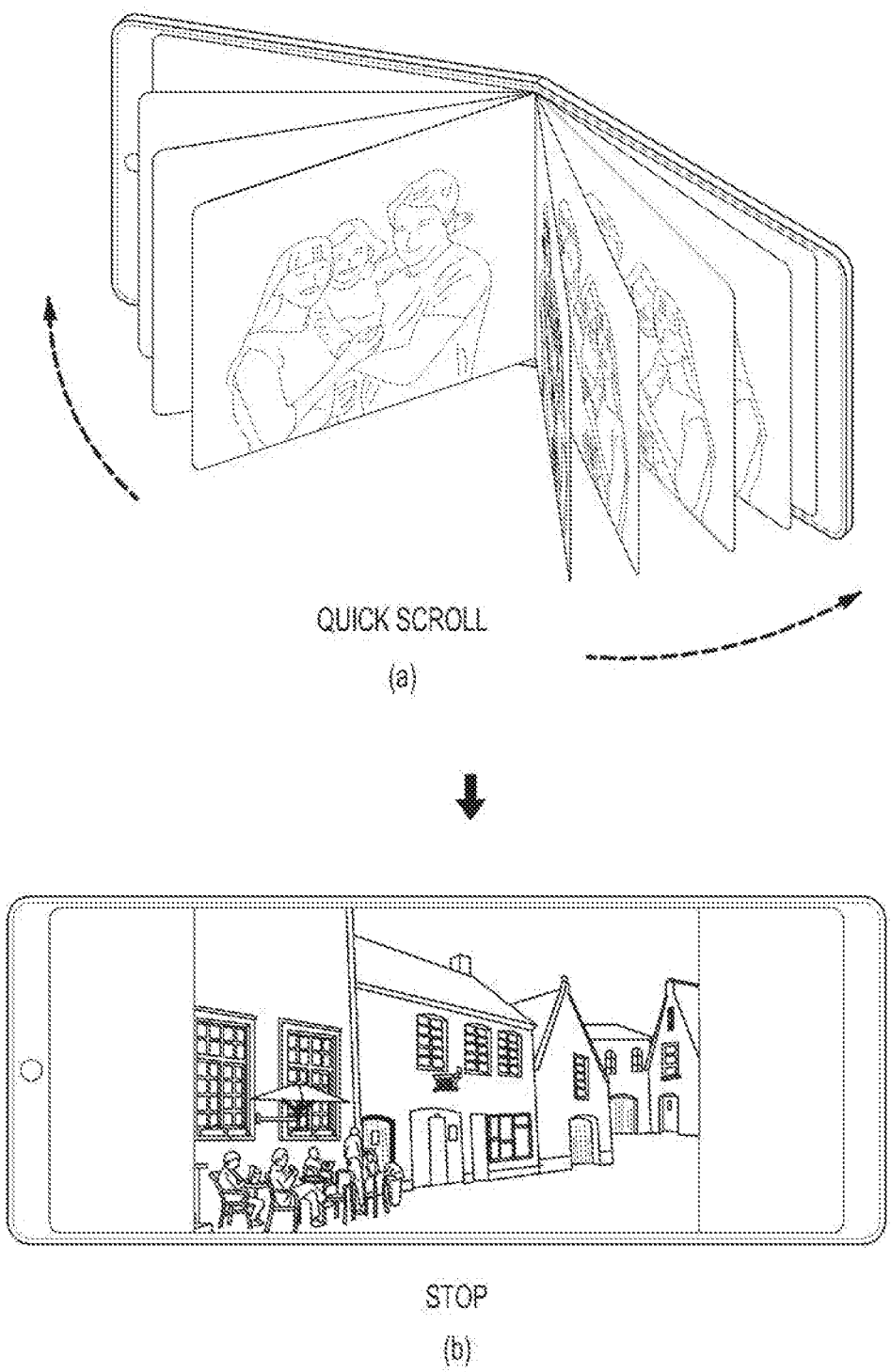
FIGS. 21A, 21B, and 21C are views illustrating an example of a page turning operation as per folding or unfolding according to an embodiment of the present disclosure.
Figure 21B:
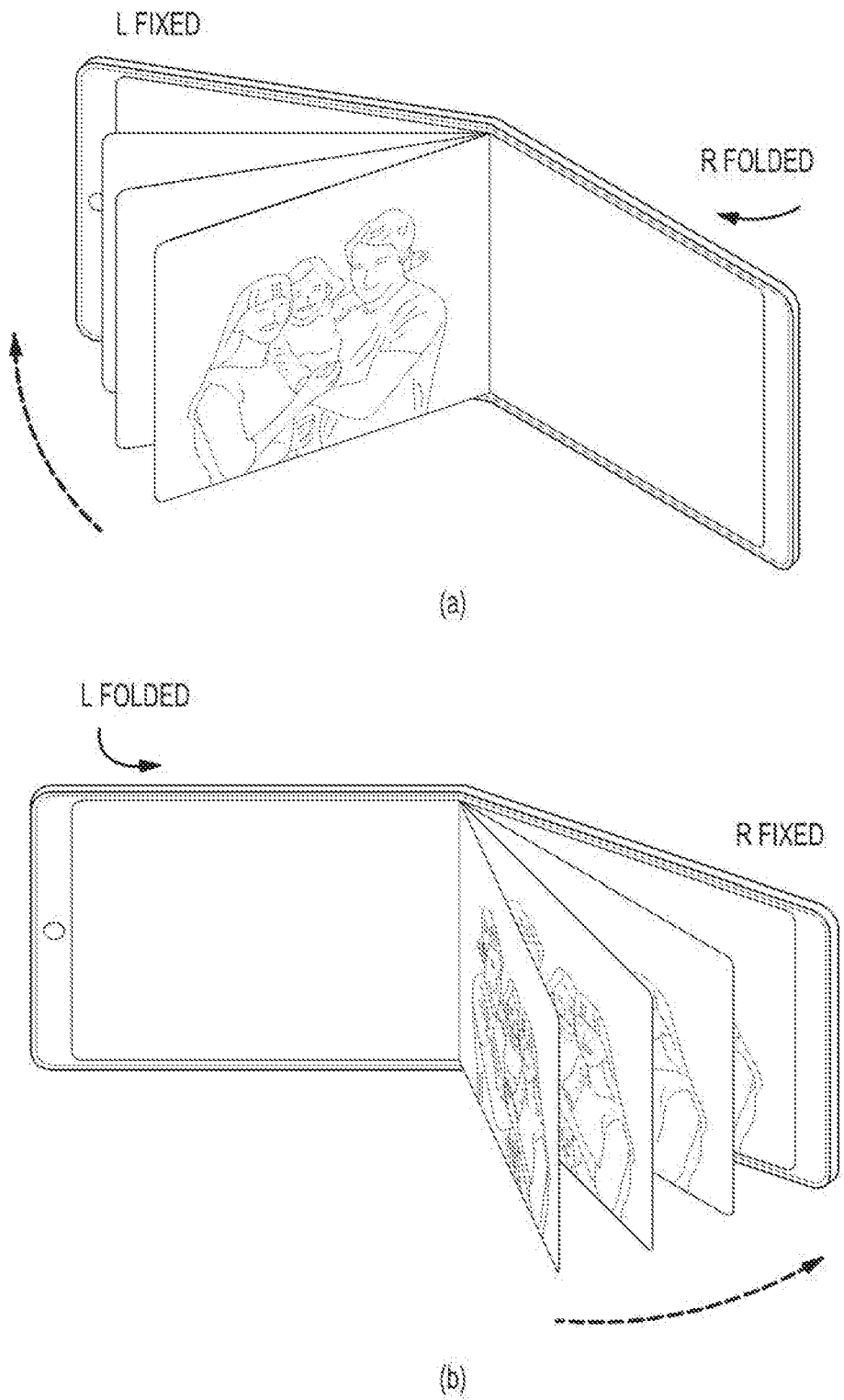
Figure 21C:
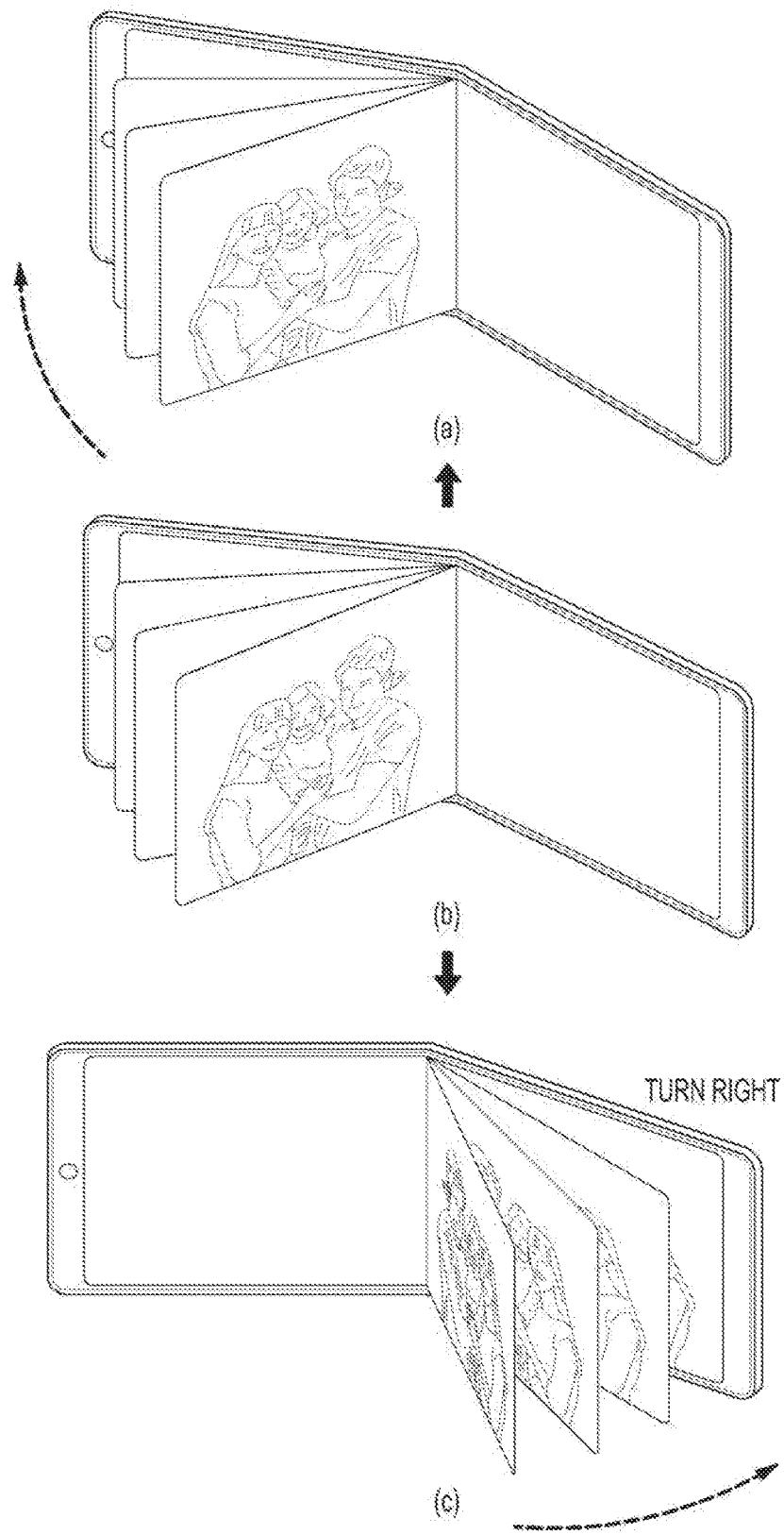

FIGS. 21A to 21C are views illustrating an example of a page turning operation as per folding or unfolding according to an embodiment of the present disclosure.

Referring to FIGS. 21A to 21C, the electronic device may perform a page turning function corresponding to a folding interaction. The electronic device may perform a scroll function for quickly turning pages corresponding to a folding interaction by which the first and second area of the display are simultaneously folded to face each other as shown in FIG. 21A(a) and may stop the page turning function corresponding to an unfolding interaction as shown in FIG. 21A(b). Referring to FIG. 21B(a) and FIG. 21B(b), the electronic device may perform a scroll operation corresponding to a folding interaction by which one of the first and second area of the display is fixed while the other area is folded. Here, the reference for the direction of the scrolling may be the fixed area. Referring to FIG. 21C(a) to (c), the electronic device may determine the direction of scrolling corresponding to the direction in which the display tilts and performs the operation.

Figure 22A:
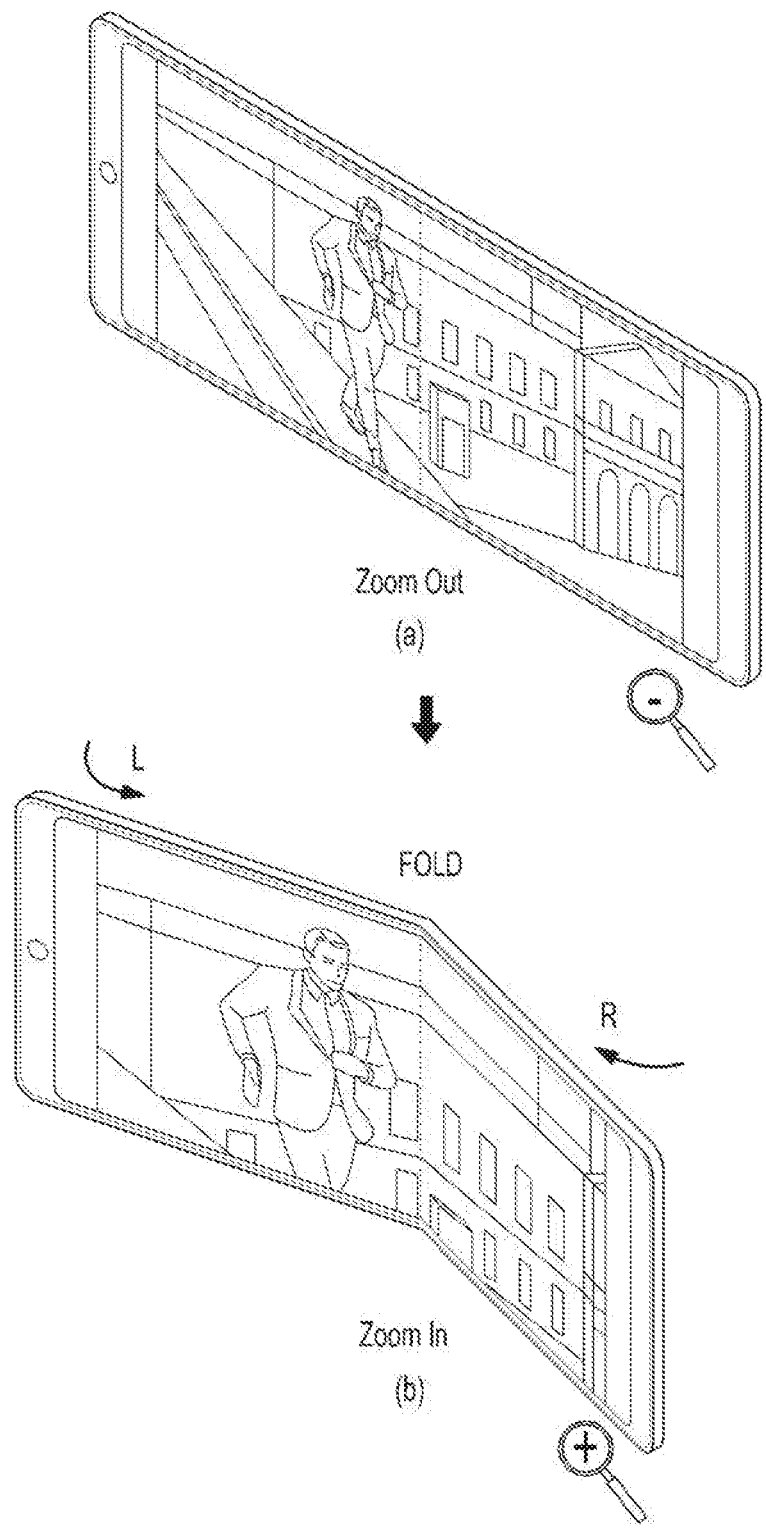
FIGS. 22A and 22B are views illustrating various examples of an operation as per folding or unfolding according to an embodiment of the present disclosure.
Figure 22B:
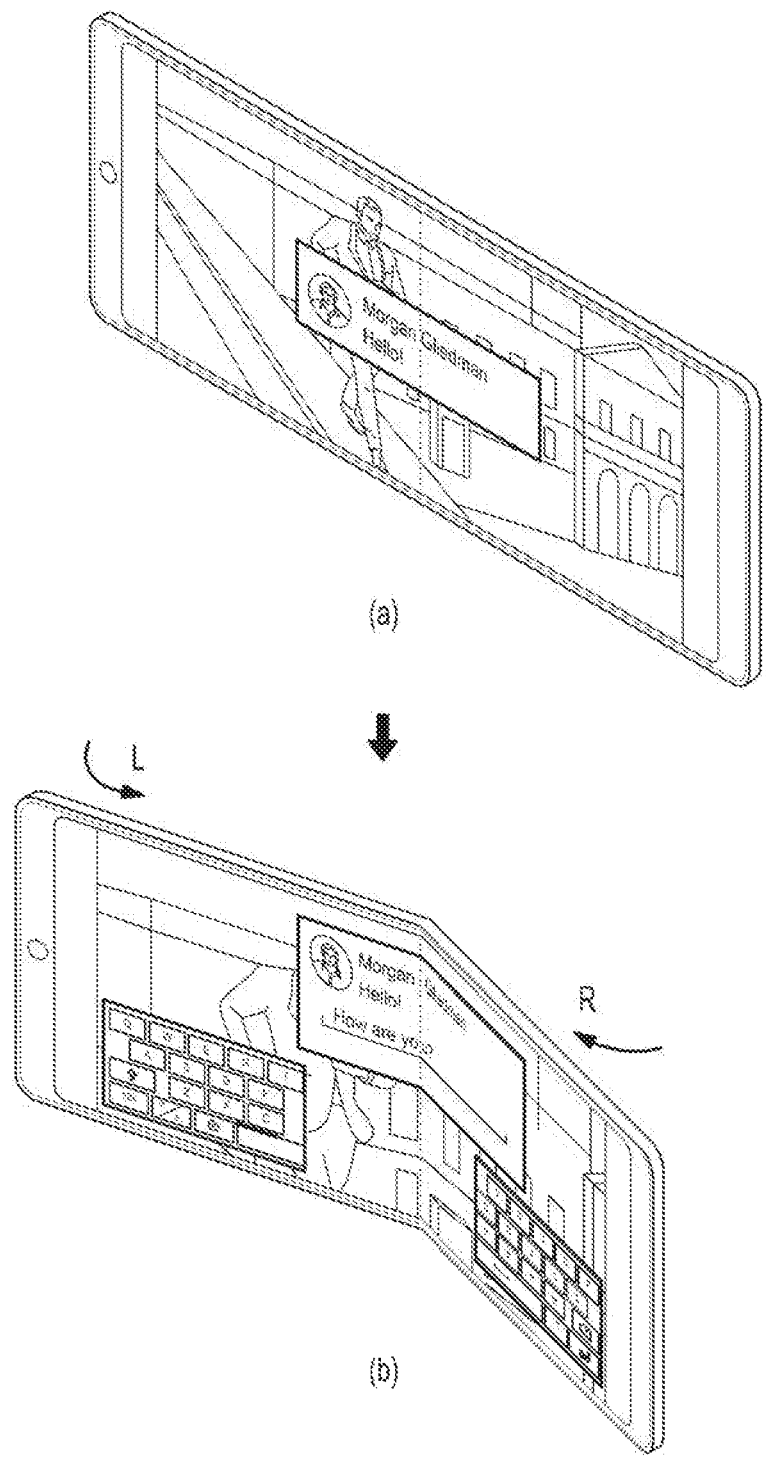

FIGS. 22A and 22B are views illustrating various examples of an operation as per folding or unfolding according to an embodiment of the present disclosure. Referring to FIG. 22A(a) and (b), the electronic device may perform a zoom-in or zoom-out function corresponding to an unfolding interaction or folding interaction. Referring to FIG. 22B(a) and (b), the electronic device, upon receiving a message, e.g., while playing a video in the horizontal mode, may output the content of the message in a popup window and display a graphic user interface (e.g., a keyboard) corresponding to the folding interaction.

As described above, the electronic device may select a graphic user interface corresponding to the folding interaction. The electronic device may previously store information about the relationship between the graphic user interface and the angle between the first and second area of the display. The electronic device may select the graphic user interface corresponding to the angle between the first and second area of the display using the relationship information previously stored.

Figure 23:
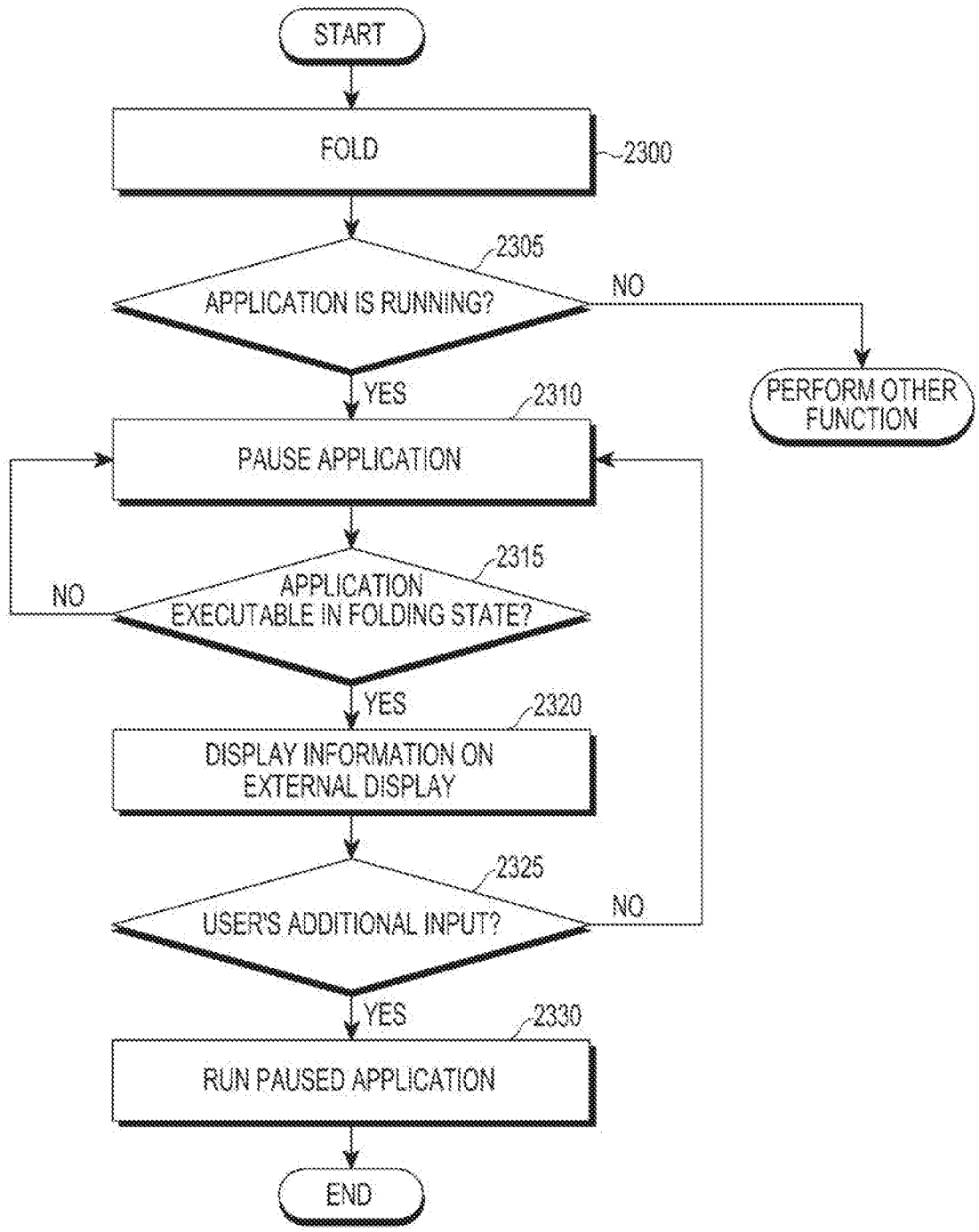
FIG. 23 is a flowchart illustrating a method for controlling a display of an electronic device as per folding of the electronic device while an application runs according to an embodiment of the present disclosure.

FIG. 23 is a flowchart illustrating a method for controlling a display of an electronic device as per folding of the electronic device while an application runs according to an embodiment of the present disclosure.

Figure 24:
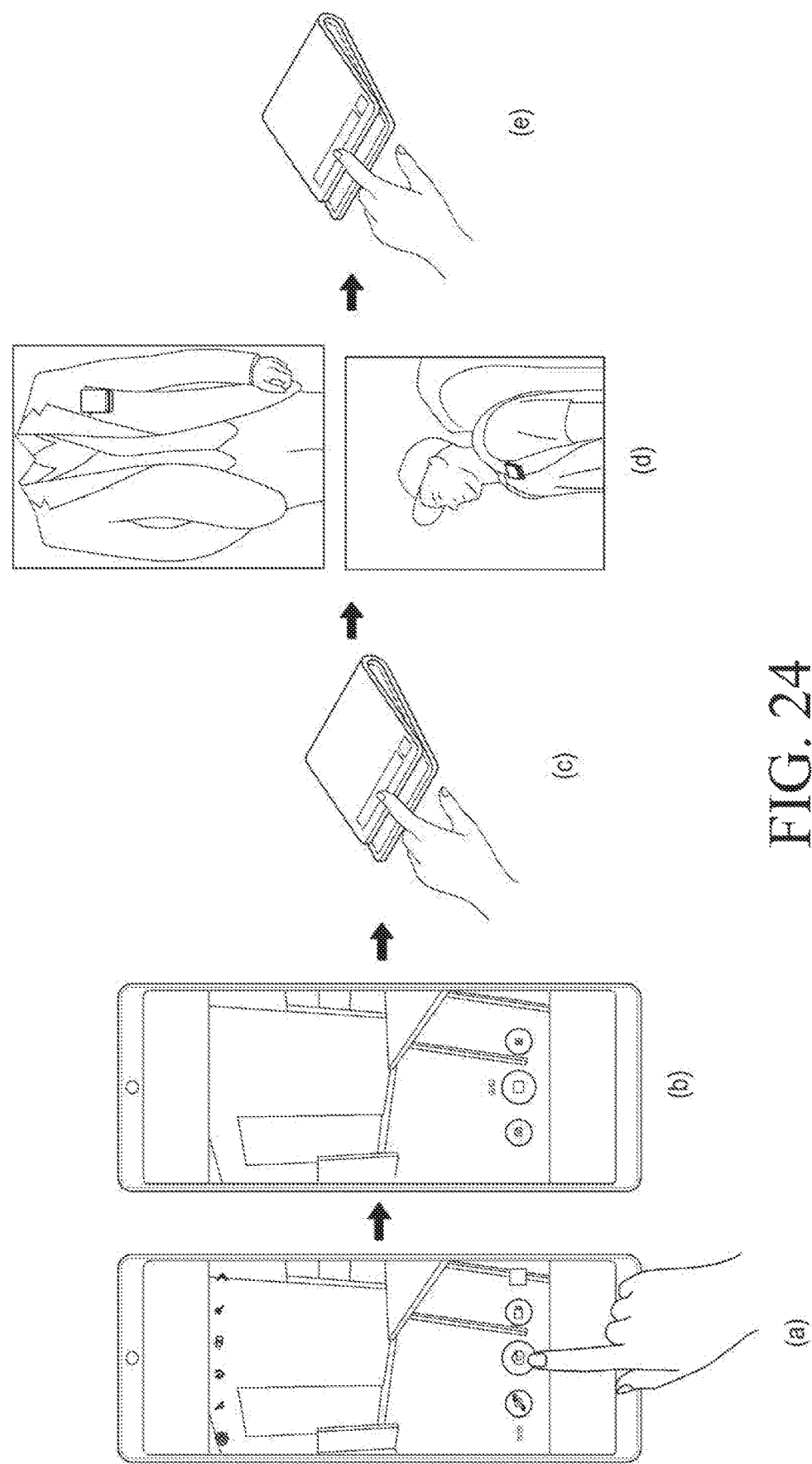
FIG. 24 is a view illustrating an example of an operation as per folding of an electronic device while an application runs according to an embodiment of the present disclosure.

FIG. 24 is a view illustrating an example of an operation as per folding of an electronic device while an application runs according to an embodiment of the present disclosure.

Figure 25:
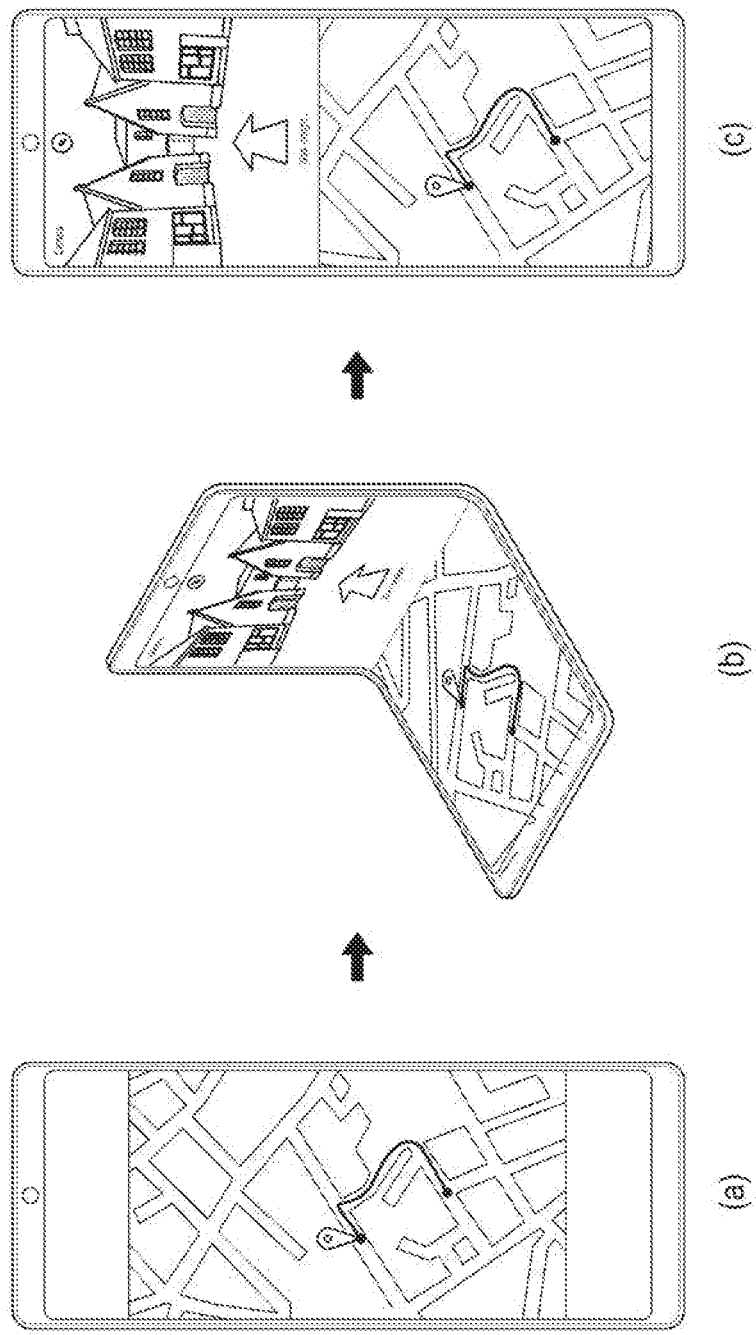
FIG. 25 is a view illustrating an example of a screen as per folding while a navigation runs according to an embodiment of the present disclosure.

FIG. 25 is a view illustrating an example of a screen as per folding while a navigation runs according to an embodiment of the present disclosure.

Referring to FIG. 23, the electronic device, upon detecting a folding in operation 2300, may determine whether an application is running in operation 2305. Where the application is not running, the electronic device may perform another function. Where the application is running, the electronic device may pause the application in operation 2310 and may then determine whether it is an application executable in a folding state in operation 2315. Unless the application is one executable in the folding state, the electronic device may go back to operation 2310 to maintain the state of the application pausing.

For example, the electronic device may run a video capture as shown in FIG. 24(b) corresponding to a user input for selecting a video capture as shown in FIG. 24(a). When both ends of the display are folded to face each other while video-capturing, the electronic device may pause the video capture.

Where the application is one executable in the folding state, the electronic device may display, on an external display, information related to the executable application in operation 2320. For example, the electronic device may pause the video capture simultaneously with being in the folding state and may then display an inquiry about whether to continue the automatic video capturing function on the external display. Corresponding to this, the electronic device may determine whether the user's additional input occurs in operation 2325, and unless there is an additional input, the electronic device may return to operation 2310 to maintain the paused state of the application. In contrast, where there is the user's additional input in operation 2325, the electronic device may run the paused application in operation 2330. For example, the electronic device may run the video capturing function, which has been paused, corresponding to the user's selection of continuing to proceed, as shown in FIG. 24(c), in response to the inquiry about whether to continue the automatic video capturing function on the external display. In such case, the video capturing function may be performed even in the folding state. Thus, the user may utilize it as an action camera in a clip type as shown in FIG. 24(d). At this time, pausing the capture in the folding state may be done by a touch input on the external display as shown in FIG. 24(e).

The electronic device may continuously run other various functions in the folding state as well. For example, corresponding to a folding interaction while performing a navigation mode on a whole screen as shown in FIG. 25(a), the electronic device may provide a forward road view in real-time on a first area with respect to the folded axis while outputting a navigation screen on a second area as shown in FIG. 25(b). The electronic device may also provide a navigation screen that is separated into a first area and a second area as shown in FIG. 25(c). Thus, in such a state that the electronic device stands folded inward in half as if a compact does, the electronic device may reset and display the current location on the navigation screen with respect to the forward road view that is captured through a camera in which case the electronic device may not only identify the location but also enhance accuracy and reduce errors through comparison with the road view image.

As used herein, the term "module" includes a unit configured in hardware, software, or firmware and may be interchangeably used with other term, e.g., a logic, logic block, part, or circuit. The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations.

According to an embodiment of the present disclosure, at least a part of the device (e.g., modules or their functions) or method (e.g., operations) may be implemented as instructions stored in a computer-readable storage medium (e.g., the memory 430), e.g., in the form of a program module. The instructions, when executed by a processor (e.g., the processor 420), may enable the processor to carry out a corresponding function. The computer-readable medium may include, e.g., a hard disk, a floppy disc, a magnetic medium (e.g., magnetic tape), an optical recording medium (e.g., compact disc read-only memory (CD-ROM), DVD, magnetic-optical medium (e.g., floptical disk), or an embedded memory. The instruction may include a code created by a compiler or a code executable by an interpreter.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

According to an embodiment of the present disclosure, there is provided a non-transitory computer-readable storage medium having instructions thereon, when executed, may cause a processor to set a first area and a second area on a display, display a first graphic element related to a first application on the first area of the display, display a second graphic element related to the control of the first application on the second area, and control the first application in response to an input related to the second graphic element.

As is apparent from the foregoing description, according to an embodiment of the present disclosure, a foldable flexible electronic device may quickly split and run a display screen by a simplified user interface and efficiently control the split screens.

According to an embodiment of the present disclosure, there may be provided an intuitive screen splitting method that fits for each operation characteristic in the electronic device.

According to an embodiment of the present disclosure, one screen may be split into a plurality of areas that may then be used. Thus, one screen may efficiently be used in various ratios or sizes.

According to an embodiment of the present disclosure, it is possible to implement screen splitting ratios and layout types according to the user's needs and intention to use departing from existing stereotypes of screen splitting.

According to an embodiment of the present disclosure, it may be possible to provide display effects, invoke or run functions through bending interactions of bending the flexible electronic device, and maximize the use of contents actually provided on the display.

While the present disclosure has been shown and described with reference to various embodiments thereof, it will be understood by those skilled in the art that various changes in form and details may be made therein without departing from the spirit and scope of the present disclosure as defined by the appended claims and their equivalents

What is claimed is:

1. An electronic device, comprising:
   a display; and
   a processor configured to:
   control the display to display a first window in full width,
   control the display to display a second window providing recommended items based on context awareness on a portion of the first window according to a predefined first layout in response to a first folded angle of the electronic device being identified, and
   control the display to display at least two windows separated with respect to a folded portion of the display according to a predefined second layout in response to a second folded angle of the electronic device being identified.

2. The electronic device of claim 1, further comprising a sensor module detecting a folding and unfolding of the electronic device.

3. The electronic device of claim 2,
   wherein the first folded angle of the electronic device is within a first threshold angle, and
   wherein the second folded angle of the electronic device is within a second threshold angle that exceeds the first threshold angle.

4. The electronic device of claim 3,
   wherein the predefined first layout is an overlay mode, and
   wherein the processor is further configured to, upon detecting the first folded angle of the electronic device within the first threshold angle, control the display to display the second window on the portion of the first window in an overlay type.

5. The electronic device of claim 3,
   wherein the predefined second layout is a split mode, and
   wherein the processor is further configured to, upon detecting the second folded angle of the electronic device within the second threshold angle that exceeds the first threshold angle, control the display to display the at least two windows while sharing a common boundary.

6. The electronic device of claim 1, wherein the second window includes objects corresponding to recommended user profile-based customized items.

7. The electronic device of claim 1, wherein the processor is further configured to:
control the display to display the second window on the portion of the first window in response to a first touch input of at least partially traversing in a first direction on a first area of the display, and
control the display to display the at least two windows separated with respect to the folded portion of the display in response to a second touch input of at least partially traversing in the first direction on a second area of the display.

8. The electronic device of claim 7,
wherein the second area of the display includes a predetermined size of area including a boundary splitting the display in half, and
wherein the first area includes a remaining area other than the second area.

9. The electronic device of claim 7, wherein the processor is further configured to, upon detecting the first touch input, control the overlay to display the second window on the portion of the first window.

10. A method for controlling a display by an electronic device, the method comprising:
displaying a first window in full width;
detecting a folded angle of the electronic device;
displaying a second window providing recommended items based on context awareness on a portion of the first window according to a predefined first layout in response to a first folded angle of the electronic device being identified; and
displaying at least two windows separated with respect to a folded portion of the display according to a predefined second layout in response to a second folded angle of the electronic device being identified.

11. The method of claim 10,
wherein the predefined first layout is an overlay mode, and
wherein the predefined second layout is a split mode.

12. The method of claim 10, wherein the second window includes objects corresponding to recommended user profile-based customized items.

13. A non-transitory computer-readable storage medium having instructions thereon, when executed, cause a processor to:
display a first window in full width;
detect a folded angle of an electronic device;
display a second window providing recommended items based on context awareness on a portion of the first window according to a predefined first layout in response to a first folded angle of the electronic device being identified; and
display at least two windows separated with respect to a folded portion of a display according to a predefined second layout in response to a second folded angle of the electronic device being identified.

14. The non-transitory computer-readable storage medium of claim 13,
wherein the first folded angle of the electronic device is within a first threshold angle, and
wherein the second folded angle of the electronic device is within a second threshold angle that exceeds the first threshold angle.

15. The non-transitory computer-readable storage medium of claim 13,
wherein the predefined first layout is an overlay mode, and
wherein the displaying of the second window on the portion of the first window according to the predefined first layout includes, upon detecting the first folded angle of the electronic device within the first threshold angle, overlaying the second window on the portion of the first window.

16. The non-transitory computer-readable storage medium of claim 13,
wherein the predefined second layout is a split mode, and
wherein the displaying of the at least two windows split with respect to the folded portion of the display according to the predefined second layout includes, upon detecting the second folded angle of the electronic device within the second threshold angle that exceeds the first threshold angle, displaying the at least two windows on the display while the at least two windows share a common boundary.

17. The non-transitory computer-readable storage medium of claim 13, wherein the second window includes objects corresponding to recommended user profile-based customized items.

18. The non-transitory computer-readable storage medium of claim 13, wherein the instructions, when executed, further cause the processor to:
display the second window on the portion of the first window in response to a first touch input of at least partially traversing in a first direction on a first area of the display, and
display the at least two windows separated with respect to the folded portion of the display in response to a second touch input of at least partially traversing in the first direction on a second area of the display.

19. The non-transitory computer-readable storage medium of claim 18,
wherein the second area of the display includes a predetermined size of area including a boundary splitting the display in half, and
wherein the first area includes a remaining area other than the second area.

* * * * *